United States Patent
Yamazaki et al.

(10) Patent No.: US 6,280,323 B1
(45) Date of Patent: Aug. 28, 2001

(54) DEVICE, METHOD AND STORAGE MEDIUM FOR DISPLAYING PENALTY KICK MATCH CURSORS IN A VIDEO SOCCER GAME

(75) Inventors: Toru Yamazaki, Nishinomiya; Fumimasa Katakami, Amagasaki; Yasuo Okuda, Moriguchi; Eiji Nakagawa, Kakogawa; Koji Kuri, Kobe, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 08/972,170

(22) Filed: Nov. 17, 1997

(30) Foreign Application Priority Data

| Nov. 21, 1996 | (JP) | 8-311123 |
| Nov. 21, 1996 | (JP) | 8-311124 |
| Nov. 21, 1996 | (JP) | 8-311125 |
| Nov. 21, 1996 | (JP) | 8-311126 |
| Nov. 21, 1996 | (JP) | 8-311127 |

(51) Int. Cl.$^7$ .................................................. A63F 13/00
(52) U.S. Cl. .................................................. 463/4; 463/31
(58) Field of Search ........................ 463/4, 1, 2, 3, 463/5, 7, 30, 31, 32, 33, 34, 49

(56) References Cited

U.S. PATENT DOCUMENTS

| 4,249,734 | 2/1981 | Bromley. | |
| 4,342,454 | 8/1982 | Baer et al. . | |
| 4,357,014 | * 11/1982 | Baer et al. | 463/4 |
| 4,552,360 | * 11/1985 | Bromley et al. | 463/4 |
| 4,918,603 | 4/1990 | Hughes et al. . | |
| 5,067,079 | 11/1991 | Smith, III et al. . | |
| 5,342,054 | 8/1994 | Chang et al. . | |
| 5,435,554 | * 7/1995 | Lipson | 273/88 |
| 5,462,275 | 10/1995 | Lowe et al. . | |
| 5,601,487 | * 2/1997 | Oshima et al. | 463/4 |
| 5,636,920 | * 6/1997 | Shur et al. | 364/410 |
| 5,695,401 | * 12/1997 | Lowe et al. | 463/4 |
| 5,772,512 | * 6/1998 | Chichester | 463/40 |
| 5,779,548 | * 7/1998 | Asai et al. | 463/31 |
| 5,863,248 | * 1/1999 | Mine et al. | 463/4 |
| 5,890,906 | * 4/1999 | Marci et al. | 463/4 |

FOREIGN PATENT DOCUMENTS

| 686944 | 12/1995 | (EP) . |
| 070010 | 3/1996 | (EP) . |

(List continued on next page.)

OTHER PUBLICATIONS

Monthly Magazine "Game Walker", vol. 3–11, Serial No. 25, Published on Nov. 1, 1996 by Kabushiki Kaisha Kadokawa shoten, p. 135.

(List continued on next page.)

Primary Examiner—Valencia Martin-Wallace
Assistant Examiner—Julie Kasick
(74) Attorney, Agent, or Firm—Jordan and Hamburg LLP

(57) ABSTRACT

A video game system directed, for example, to a soccer game, employs opposing teams each having a plurality of players. At least one of the teams is under the control of a game player through a controller, while the other team is commanded by the system CPU or another game player. A mode of game play permits the carrying out of a penalty kick match, in which a monitor screen depicts, at least, characters representing the goal, a player acting as the kicker, a ball, and the player acting as the goalkeeper. A kicker cursor indicative of a shoot position to which the ball is to be kicked by the character representing the kicker is movably displayed on the monitor screen. In addition, a keeper cursor indicative of an area covered by the character representing the goalkeeper for checking the ball is movable displayed said monitor screen, the keeper cursor being movable on the monitor screen independently from the character representing the goalkeeper.

13 Claims, 35 Drawing Sheets

FOREIGN PATENT DOCUMENTS

| | | |
|---|---|---|
| 0715869 | 6/1996 | (EP) . |
| 2283302 | 5/1995 | (GB) . |
| 6-304336 | 11/1994 | (JP) . |
| 7178246 | 7/1995 | (JP) . |
| 8-047582 | 2/1996 | (JP) . |
| 8-168544 | 7/1996 | (JP) . |
| WO9416426 | 7/1994 | (WO) . |
| 9622581 | 7/1996 | (WO) . |
| 9634364 | 10/1996 | (WO) . |

OTHER PUBLICATIONS

Magazine "Dengeki Nintendo 64", vol. 1–6, Serial No. 6, Published on Nov. 1, 1996 by Kabushiki Kaisha Media Works, p. 35 (Laid–Open for the public by the National Diet Library on Sep. 20, 1996).

Monthly Magazine "Game Walker", vol. 1–1, Serial No. 1, Published on Nov. 1, 1994 by Kabushiki Kaisha Kadokawa Shoten, p. 63.

Monthly Magazine "Game Walker", vol. 2–2, Serial No. 4, Published on Feb. 1, 1995 by Kabushiki Kaisha Kadokawa Shoten, p. 135.

Magazine "Dengeki Nintendo 64", vol. 1–7, Serial No. 7, Published on Dec. 1, 1996 by Kabushiki Kaisha Media Works, p. 35 (Laid–Open for the public by the National Diet Library on Oct. 21, 1996).

Weekly Game Walker, vol. 2, No. 10 (Serial No. 12), published on Oct. 1, 1995, by Kadokawa Shoten Inc., p 125.

Maikon Basic Magazine, vol. 8, No. 10 (Serial. No. 88), published on Oct. 1, 1989, by Denpa Shinbunsha, pp. 262–265.

* cited by examiner

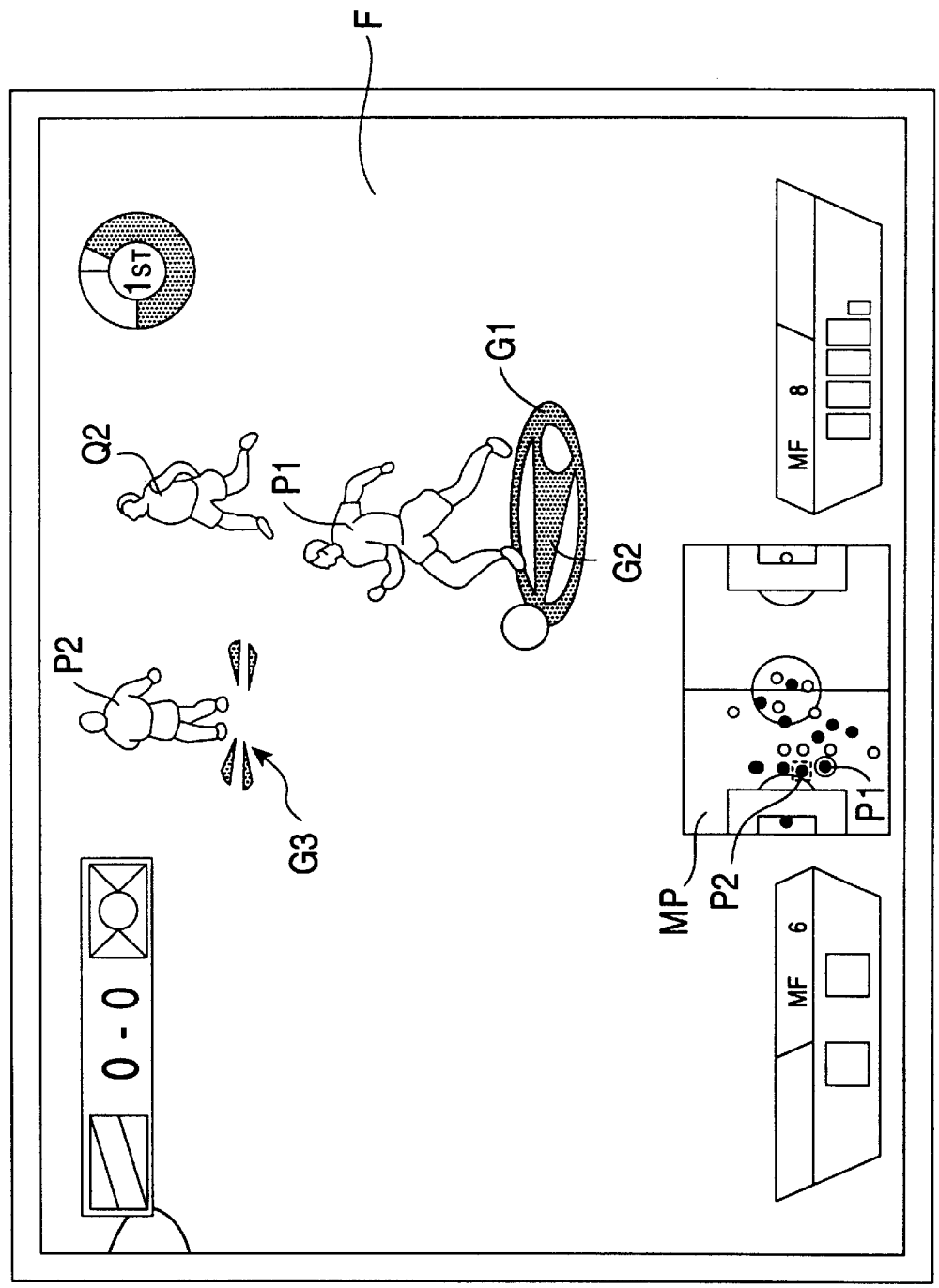

DEVICE, METHOD AND STORAGE MEDIUM FOR DISPLAYING PENALTY KICK MATCH CURSORS IN A VIDEO SOCCER GAME

BACKGROUND OF THE INVENTION

1. Field of the Invention

The present invention broadly relates to a video game system which employs a cassette-type recording medium such as an optical disk, magnetic disk or a semiconductor memory, and more particularly to a device and a method for setting a command in the video game system, as well as to a storage medium storing a command setting program. The present invention also pertains to a device and method for displaying a guide in a video game, as well as to a storage medium storing a program for displaying such a guide. The invention further concerns a device and a method for replaying a scoring scene in a video game, as well as a storage medium storing a replay program. The present invention also is concerned with a device and a method for setting character data on player characters involved in a video game, as well as a storage medium storing a program for setting character data. The invention further relates to a device and a method for displaying cursors used in a PK match game mode of a soccer game, as well as a storage medium storing a program for implementing such a method.

2. Description of the Related Art

Hitherto, various types of video game systems have been proposed, such as a system composed of a family-use game machine and a television monitor, a complete video game system for use in game business and a system which uses a personal computer or a work station together with a display and an acoustic output device. Such a video game system is basically composed of a controller to be operated by the player, a storage medium which stores the game program data, a CPU which performs various types of controls for the purpose of generating voices and images, a processor for generating the images, a processor for generating the sounds, a CRT for displaying the images, and a speaker for producing voices. CD-ROMs, semiconductor memories, cassettes incorporating semiconductor memories, and so forth are major media which are used in this type of video game system.

Various kinds of video games have been known among which notable are games of the type in which a multiplicity of player characters appear on the CRT to participate in a game on the screen, e.g., a soccer game. In this game, the game player, i.e., the user of the video game, personates himself on a player character, such that the player character on the screen dribbles, passes and shoots in accordance with instructions given by the user through the controller so as to get points to win the game by obtaining higher score. Thus, video soccer game is an exciting television game which is full of fun in terms of game and competition.

Hitherto, in the video game in which the game proceeds with a plurality of character players as in a soccer game, the game player can control only one player character at a time, e.g., the player which keeps the ball. In the meantime, positions of other player characters are moved and controlled in accordance with a gram program which has been determined to meet the rule of soccer. Consequently, the pattern of behaviors of other player characters is always the same, which makes the game monotonous and less exciting.

Under this circumstance, the present invention is aimed at providing a video game system in which commands for ruling different motions are registered beforehand so that, when the game player appoints a command, a control is performed to realize a different real-time motion of a player character other than the player character keeping the ball, thus enhancing variation and fun of the video game.

Thus, an object of the present invention is to provide a device and a method for setting character data in such a video game system, as well as a storage medium storing a program for setting the character data.

To these ends, according to one aspect of the present invention, there is provided a command setting device for use in a video game system of the type in which a couple of teams, each having a plurality of player characters displayed on a monitor screen, compete with each other on a single game medium, at least one of the teams being under the control of a game player through a controller, the command setting device comprising: registration picture displaying means for enabling, prior to the start of the same, the monitor screen to display a registration picture including a plurality of commands of different contents which can be given to the team under the control through the controller, together with signs of command inputting members which are to be used for inputting the commands to the video game system; and command setting means which registers, by means of the controller, the commands displayed in the registration picture in relation to the signs of command inputting members so that the video game system executes each registered command in response to an operation of the associated command inputting member by the game player after the start of the game.

In the command setting device stated above, the commands may include a full-member attack command which causes the full member of the team to participate in the attack.

The invention also provides a command setting method for use in a video game system of the type in which a couple of teams, each having a plurality of player characters displayed on a monitor screen, compete with each other on a single game medium, at least one of the teams being under the control of a game player through a controller, the command setting method comprising: displaying, prior to the start of the same, a registration picture on the monitor screen including a plurality of commands of different contents which can be given to the team under the control through the controller, together with signs of command inputting members which are to be used for inputting the commands to the video game system; and registering, by means of the controller, on the monitor screen the commands displayed in the registration picture in relation to the signs of command inputting members so that the video game system executes each registered command in response to an operation of the associated command inputting member by the game player after the start of the game.

In the command setting method set forth above, the commands may include a full-member attack command which causes the full member of the team to participate in the attack.

The invention further provides a storage medium which stores a command setting program for use in a video game system of the type in which a couple of teams, each having a plurality of player characters displayed on a monitor screen, compete with each other on a single game medium, at least one of the teams being under the control of a game player through a controller, the command setting program comprising: displaying, prior to the start of the same, a registration picture on the monitor screen including a plurality of commands of different contents which can be given to the team under the control through the controller, together with signs of command inputting members which are to be used for inputting the commands to the video game system; and registering, by means of the controller, on the monitor screen the commands displayed in the registration picture in relation to the signs of command inputting members so that the video game system executes each registered command in response to an operation of the associated command inputting member by the game player after the start of the game.

In the storage medium set forth above, the commands may include a full-member attack command which causes the full member of the team to participate in the attack.

The command setting device, command setting method and the storage medium set forth above enable required commands to be registered on the player characters in relation to the command inputting members of the controller. By suitably operating the command inputting members, the game player can manage the motions and actions of the player characters in accordance with the commands. Thus, the game player can give specific instructions also to the player characters other than the player character which keeps the ball, so that the game player can enjoy a variety of developments of the game. It is therefore possible to provide a game which is full of fun.

When the commands displayed in the command registration picture include the full-member attack command, all the player characters of a team can be moved by a simple operation of a command inputting means, which diversifies the development of the game so as to realize a more complicated progress of the game. It is also possible to prepare a variety of commands for different types of games, so that the game player can proceed with the game at his discretion extensively.

Where a large number of player characters of similar appearances exist on a field as in the case of a soccer game, the game player may some times be confused because of difficulty in discriminating the player character under the control of the game player from other player characters on the display. In such cases, the game player cannot timely decide the direction of movement of the player character under his control relative to the field. In addition, quick and consecutive control of the player character is essentially required due to the nature of the game. It is therefore desirable that a suitable indication or guides are displayed so as to identify the player character or characters.

It is therefore another object of the present invention to provide a guide display device and a guide display method which provide guiding information in regard to identification of the player character, direction of movement of the player character, and so forth, so as to enhance the operability of the video game system, as well as a storage medium storing a program for implementing such a guide display.

To this end, according to another aspect of the present invention, there is provided a guide display device for use in a video game system of the type in which a couple of teams, each having a plurality of player characters displayed on a monitor screen, compete with each other on a single game medium, at least one of the teams being under the control of a game player through a controller, the guide display device comprising: monitoring means for identifying the player character which keeps the game medium; and guide displaying means for displaying a guide mark which accompanies the player character identified by the monitoring means and which indicates that the game medium is kept by the player character identified by the monitoring means.

According to this arrangement, the monitoring means always monitors the player character keeping the game medium, and a guide mark is displayed so as to accompany the monitored player character. The game player therefore can easily distinguish such a player character from among many player characters displayed on the monitor screen, thus facilitating the decision to be made by the game player.

The guide displaying means may display, as the guide mark, a direction mark indicative of the direction of movement of the player character. In such a case, the game player can easily make decision as to the direction of movement of the player character, since the direction of movement of the player character is shown by the direction mark. This direction mark may be a mark which indicates the direction in which the game medium is to be passed to another player character. Thus, the direction mark assists the game player in making a subsequent action such as passing of the game medium.

Preferably, the guide mark is displayed on the image of the field at a location near a foot of the player character. This feature minimizes the risk of the guide mark from hiding behind the image of the player character, thus enabling the game player to recognize the guide mark as possible.

It is also preferred that the guide displaying means further displays a pass guide mark accompanying another player character which belongs to the same team as the player character keeping the game medium and to which the game medium can most easily be passed from the player character keeping the game medium. This feature permits the game operator to easily decide the direction in which the game medium is to be passed, by a glance of the pass guide mark, without grasping the states of other player characters, whereby the operability of the game system is enhanced.

It is also preferred that the guide displaying means further displays a caution guide mark accompanying an enemy player character which is nearby the player character keeping the game medium. By this feature, the game player can enable the player character to keep the game medium more safely, because the game player can be aware of any nearby enemy player character.

The video game may be a soccer game. In such a case, the game medium is a pseudo ball displayed on the monitor screen. In such a case, the game player can enjoy the video game by suitably operating the controller, with enhanced feel of presence and improved operability of the game system.

The present invention also provides a guide displaying method for use in a video game system of the type in which a couple of teams, each having a plurality of player characters displayed on a monitor screen, compete with each other on a single game medium, at least one of the teams being under the control of a game player through a controller, the guide displaying method comprising: identifying the player character which keeps the game medium; and displaying a guide mark which accompanies the identified player character and which indicates that the game medium is kept by the identified player character. According to these features, the player character keeping the game medium is always monitored and identified, and a guide mark is displayed so as to accompany the monitored player character. The game player therefore can easily distinguish such a player character from among many player characters displayed on the monitor screen, thus facilitating the decision to be made by the game player.

The guide mark may include a direction mark indicative of the direction of movement of the player character. In such a case, the game player can easily make decision as to the direction of movement of the player character, since the direction of movement of the player character is shown by the direction mark. This direction mark may be a mark which indicates the direction in which the game medium is to be passed to another player character. Thus, the direction mark assists the game player in making a subsequent action such as passing of the game medium.

Preferably, the guide mark is displayed on the image of the field at a location near a foot of the player character.

Preferably, the displaying step further displays a pass guide mark accompanying another player character which belongs to the same team as the player character keeping the game medium and to which the game medium can most easily be passed from the player character keeping the game medium. This feature permits the game player to easily decide the direction in which the game medium is to be passed, by a glance of the pass guide mark, without grasping the states of other player characters, whereby the operability of the game system is enhanced.

It is also preferred that the displaying step further displays a caution guide mark accompanying an enemy player character which is nearby the player character keeping the game medium. By this feature, the game player can enable the player character to keep the game medium more safely, because the game player can be aware of any nearby enemy player character.

The present invention further provides a storage medium storing a guide displaying program for use in a video game system of the type in which a couple of teams, each having a plurality of player characters displayed on a monitor screen, compete with each other on a single game medium, at least one of the teams being under the control of a game player through a controller, the guide displaying program comprising: identifying the player character which keeps the game medium; and displaying a guide mark which accompanies the identified player character and which indicates that the game medium is kept by the identified player character. According to these features, the player character keeping the game medium is always monitored and identified, and a guide mark is displayed so as to accompany the monitored player character. The game player therefore can easily distinguish such a player character from among many player characters displayed on the monitor screen, thus facilitating the decision to be made by the game player.

The guide mark may include a direction mark indicative of the direction of movement of the player character.

Preferably, the guide mark is displayed on the image of the field at a location near a foot of the player character.

Preferably, the displaying step further displays a pass guide mark accompanying another player character which belongs to the same team as the player character keeping the game medium and to which the game medium can most easily be passed from the player character keeping the game medium.

It is also preferred that the displaying step further displays a caution guide mark accompanying an enemy player character which is nearby the player character keeping the game medium.

It would not be too much to say that the charm of a soccer game resides in a scene of scoring, i.e., the scene in which a ball shot by a player character has hit the goal. Known soccer video game, however, is constructed such that only a point 1 (one) is given to the game player who has scored and the scene of scoring is merely replayed automatically only once, without giving any specific award to the game player who has succeeded in the shoot. Thus, the known video soccer game is still unsatisfactory in regard to fun and enthusiasm. In addition, known soccer video games are not designed to enable the scoring scene a plurality of times as viewed from different viewing positions. Namely, the game player is obliged to view exactly the same display content of the scoring scene which may no more be interesting.

Accordingly, it is still another object of the present invention to provide a scoring scene replaying device, scoring scene replaying method and a storage medium storing a scoring scene replaying program, which are to be used in a video game system and which allows only the game player of the team which has scored to replay the scoring scenery. Thus, a kind of award is given to the team which has scored, over the competitor team, thus enhancing the fun of the video game.

To this end, according to still another aspect of the present invention, there is provided a scoring scene replaying device for use in a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the device comprising: storage means for storing a series of successive scenes of the game which lasts for a predetermined period of time; replay instructing means for giving replay instructions for replaying a scoring scene in response to an operation of the controller; replaying means for replaying the image of the scoring scene stored in the storage means, in response to the replay instructions; and replay permitting means for permitting the replaying means to replay only when the replay instructions are given through the controller which commands the player character which has scored. According to this arrangement, a series of successive game scenes spanning a predetermined length of time back from the instant moment is stored in the storage means and, when replay instructions are given to request a replay of a scoring scene, the images of the series of scenes spanning the predetermined time length stored in the storage means, including the scoring scene, is played back on the monitor screen. The replaying instructions are accepted only when given through the controller which is commanding the player character which scored, whereas any replaying instructions given through the controller of the competing team are not accepted. Thus, the game player commanding the player character which scored is awarded a chance of seeing the scoring scene once again. Similarly, request for stopping the replay is rejected when such a request is input through the controller of the competing team.

The invention also provides a scoring scene replaying device for use in a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the device comprising: storage means for storing the content of at least one single frame of display of the game; replay instructing means for giving replay instructions for replaying a scoring scene; replaying means for replaying the image of the scoring scene stored in the storage means, in response to the replay instructions; viewpoint change instructing means for giving instructions for changing the viewpoint of the scene which is being replayed; and image rewriting means for rewriting the image of the scene into an image as viewed from a viewpoint designated by the viewpoint change instructing means. According to these features, the scoring scene can be viewed, from any desired viewpoint for a reviewing purpose, so that the game player can acquire information as to how to proceed with the game.

The present invention also provides a scoring scene replaying device for use in a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the device comprising: storage means for storing a series of successive scenes of the game which lasts for a predetermined period of time; replay instructing means for giving replay instructions for replaying a scoring scene; replaying means for replaying the image of the scoring scene stored in the storage means, in response to the replay instructions; display pause instructing means for giving instructions to cause the display of the scene under the replay to pause; viewpoint change instructing means for giving instructions for changing the viewpoint of the pausing scene; and image rewriting means for rewriting the image of the scene into an image as viewed from a viewpoint designated by the viewpoint change instructing means. According to these features, the position of the view points, as well as the direction of viewing, of the scene which is in pause can be varied, so that the game player can review and study the scoring scene, thus obtaining credible information.

In each of these scoring scene replaying device, the viewpoint change instructions may include at least one of instructions for turning the viewpoint around the displayed object and instructions for changing the zooming ratio of the object image. According to these features, the game player can review the scoring scene in any desired viewing direction and/or at a desired zooming ratio. In particular, the game medium, even when it is hidden behind the image of a player character on display, becomes visible as a result of turning of the viewing direction. It is thus possible to review the scoring scene from a viewing position which would provide best view of the scoring scene.

The replaying means may include replaying speed setting means for giving instructions for changing the speed of the replay. This feature enables the game player to set a desired speed of replay of the scoring scene, so that he can precisely confirm the level of his controlling skill.

The replaying means also may include reversing replay instructing means for giving instructions for replaying the scene backward with respect to time. This arrangement permits the game player to reverse the display back to a scene in which he is interested. The game payer therefore can easily go back to the scenery which he would like to see and start the replay in forward direction therefrom. Thus, the game player can see concentrically only the scene in which he is most interested.

The present invention also provides a scoring scene replaying method for a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the method comprising: storing a series of successive scenes of the game which lasts for a predetermined period of time; and replaying the image of a stored scoring scene in response to replay instructions only when the instructions are been given through the controller which commands the player character which has scored.

The present invention further provides a scoring scene replaying method for a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the method comprising: storing the content of at least one single frame of display of the game; replaying the image of a stored scoring scene in response to instructions for replaying the scoring scene; rewriting, in response to viewpoint change instructions, the image of the scene which is being displayed into a new image of the same scene as viewed from a different viewpoint; and sending the new image to the monitor so that the scene as viewed from the new viewpoint is displayed on the monitor screen.

The present invention further provides a scoring scene replaying method for a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the method comprising: storing a series of successive scenes of the game which lasts for a predetermined period of time; replaying the image of a stored scoring scene in response to replay instructions; giving pause instructions to cause the display of the scene under the replay to pause; and giving viewpoint change instructions to rewrite the image of the pausing scene into a new image of the same scene as viewed from a different viewpoint and sending the new image to the monitor so that the new image is displayed on the monitor screen.

The present invention further provides a storage medium storing a scoring scene replaying program for a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the program comprising: storing a series of successive scenes of the game which lasts for a predetermined period of time; and replaying the image of a stored scoring scene in response to replay instructions only when the instructions are been given through the controller which commands the player character which has scored.

The present invention further provides a storage medium storing a scoring scene replaying program for a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the program comprising: storing the content of at least one single frame of display of the game; replaying the image of a stored scoring scene in response to instructions for replaying the scoring scene; rewriting, in response to viewpoint change instructions, the image of the scene which is being displayed into a new image of the same scene as viewed from a different viewpoint; and sending the new image to the monitor so that the scene as viewed from the new viewpoint is displayed on the monitor screen.

The invention still further provides a storage medium storing a scoring scene replaying program for a video game system of the type which has display means for displaying, on a monitor screen, a plurality of player characters of alliance and enemy teams, and a controller for giving instructions to the player characters of at least one of the two teams so that the game player can give instructions through the controller to the player characters to enable the player characters to perform specific motions for scoring, the program comprising: storing a series of successive scenes of the game which lasts for a predetermined period of time; replaying the image of a stored scoring scene in response to replay instructions; giving pause instructions to cause the display of the scene under the replay to pause; and giving viewpoint change instructions to rewrite the image of the pausing scene into a new image of the same scene as viewed from a different viewpoint and sending the new image to the monitor so that the new image is displayed on the monitor screen.

The progress of a game widely varies depending on the ability or capability of individual player characters, particularly when the game involves many player characters as in the case of a soccer game. Known soccer games do not have means to permit game players to characterize individual player characters by the levels of skills and abilities. Such means, if available, will widen the variation of the game development so as to enhance the fun of the game.

Accordingly, it is still another object of the present invention to provide a device and a method for setting character data in a video game system, as well as a storage medium storing a character data setting program, which enables the game player to register character data for each of the individual player characters or for a group of a plurality of player characters collectively, so as to widen the variation of progress of the video game, thus enhancing the fun of the game.

To this end, according to a yet further aspect of the present invention, there is provided a character data setting device for use in a video game system of the type in which a couple of teams, each having a plurality of player characters displayed on a monitor screen, compete with each other on a single game medium, at least one of the teams being under the control of a game player through a controller, the character data setting device comprising: registration picture displaying means for displaying on the monitor screen a registration picture which enables a game player to register player characters of both teams prior to the start of the game; and data setting means for enabling the game player to selectively set, through an operation of the controller, character data on each of the player characters shown in the registration picture. According to these features, a registration picture is displayed prior to the start of the game, so as to enable the game player to selectively set character data on individual player characters or on all the player characters in a specified zone. During playing the game, therefore, the same operation of the controller produces different motions of different player characters if different character data have been set on these player characters. Thus, the game progress is widely varied to enhance the fun of the game, by virtue of the character data set on the player characters.

The character data may include data concerning abilities of the player character to be registered. Various types of abilities can be used, depending on the kind of the game. For instance, in case of a soccer game, abilities may include an ability to make decision, ability to shoot a ball, ability to curve the shot ball, speed, dash, stamina, jump, ability to keep the ball, ability to defend, and so forth. The levels of abilities are represented by numerical values. The game player can set the levels of abilities on the player characters from a strategic point of view, depending on the positions of the player characters, in such a manner as to give weight to certain types of abilities in relation to the positions of the player characters.

The character data also may include data concerning an attack pattern employed in the game. The attack pattern includes, for example, whether or not the player character participates in the attack, whether the type of the attack is center breakthrough or side breakthrough.

The present invention also provides a character data setting method for use in a video game system of the type in which a couple of teams, each having a plurality of player characters displayed on a monitor screen, compete with each other on a single game medium, at least one of the teams being under the control of a game player through a controller, the character data setting method comprising: displaying on the monitor screen a registration picture which enables a game player to register player characters of both teams prior to the start of the game; and selectively setting, through an operation of the controller, character data on each of the player characters shown in the registration picture.

As in the case of the character data setting device, the character data to be set by the setting method may include data concerning abilities of the player characters to be registered and/or an attack pattern employed in the game.

The present invention also provides a storage medium storing character data setting program for a video game system of the type in which a couple of teams, each having a plurality of player characters displayed on a monitor screen, compete with each other on a single game medium, at least one of the teams being under the control of a game player through a controller, wherein the character data setting program comprises: displaying on the monitor screen a registration picture which enables a game player to register player characters of both teams prior to the start of the game; and selectively setting, through an operation of the controller, character data on each of the player characters shown in the registration picture.

In the program stored in this storage medium, the character data may include data concerning abilities of the player character to be registered and/or data concerning an attack pattern employed in the game.

A soccer game has a peculiar feature: namely, a specific mode of match known as a penalty kick match, referred to herein also by the abbreviated term "PK MATCH". Conventional video soccer game, however, merely simulates this mode in the same manner as that for ordinary scoring by a shoot.

It is highly desired that a PK MATCH, which is a feature peculiar to soccer game, is simulated as an independent mode of the soccer game so that the game is rendered much more interesting and competitive. Display of a PK match simulated in the video game has to be made such that the image of the player character acting as a kicker is not superposed on the image of the goal and the image of the goalkeeper, because such superposition makes it impossible for the game player to grasp the distance to the goal. Thus, the game player cannot obtain information as to the length of time taken for the shot ball to reach the goal, and information concerning the horizontal and vertical angles at which the ball should be directed in order that the kicked ball hits the goal while rubbing the goal post. Such types of information are highly important in the PK-MATCH.

Accordingly, it is a yet further object of the present invention to provide a PK MATCH cursor displaying device and method, as well as a storage medium storing a program for displaying cursors for PK-MATCH, which make it possible to kinematically display a kicker cursor indicative of the shoot position to which the ball is to be kicked by a kicker and a keeper cursor indicative of the area covered by the goalkeeper, thus enhancing the fun of the video soccer game.

To this end, according to a still further aspect of the present invention, there is provided a device for displaying PK match cursors in a video soccer game in which a monitor screen displays, at least, characters representing the goal, a player acting as a kicker, a ball, and a player acting as the goalkeeper, so that a PK match is simulated by the characters in accordance with kicking instructions and checking instructions given by a game player through a controller, the device comprising: kicker cursor displaying means for displaying a kicker cursor on the monitor screen, the kicker cursor being indicative of a shoot position to which the ball is to be kicked by the kicker character; kicker cursor movement commanding means for moving the position of the kicker cursor displayed on the monitor screen; keeper cursor displaying means for displaying a keeper cursor on the monitor screen, the keeper cursor being indicative of an area covered by the goalkeeper character for checking the ball; and keeper cursor movement commanding means for moving the position of the keeper cursor displayed on the monitor screen. According to these features, the game player can determine the timing of shooting while confirming both the kicker cursor indicative of the area to which the ball is kicked by the kicker player character is directed and the keeper cursor indicative of the area covered and protected by the goalkeeper character displayed on the monitor screen. When the game player commands the kicker of the PK match, he is required to control the kicking action while moving the kicker cursor in the direction reverse to that of the moving keeper cursor, so as to aim at a point which is not covered by the keeper cursor indicative of the area covered by the goalkeeper character. Conversely, when the game player commands the goalkeeper player character, he has to move the keeper cursor while watching delicate movement of the kicker cursor, such that the keeper cursor follows up and traps the kicker cursor. The game player therefore can enjoy the PK match mode of the game which is full of fun and excitement.

Preferably, at least one of the kicker cursor movement commanding means and the keeper cursor movement commanding means is controllable by the game player through the associated controller. With these features, the video game system can be enjoyed in various manner. For instance, in the single-player mode of the game, a single game player can command one of the kicker player character and the goalkeeper player character, while the computer of the system commands the other. In the couple-player mode in which a couple of game players compete with each other, one of the game players commands the kicker player character, while the other game player commands the goalkeeper player character.

Preferably, the device further comprises goal control means which conduct judgement between success and failure of goal depending on the positions of the kicker cursor and keeper cursor relative to each other. For instance, the goal control means judges that the shoot was unsuccessful, if the kicker cursor and the keeper cursor at least partially overlap each other on the display, whereas, if the kicker cursor and the keeper cursor do not overlap, the goal control means determines that the goal has been made successfully to score.

The device may further comprise strong kick instructing means for giving strong kick instructions and weak kick instructing means for giving weak kick instructions, wherein the kicker cursor has an outer peripheral strong kick guide region and an inner weak kick guide region, and wherein the ball when kicked in accordance with the strong kick instructions hits a point within the strong kick guide region, whereas, when kicked in accordance with the weak kick instructions, the ball hits a point within the weak kick guide region. Thus, the game player can command the kicking operation while selectively using one of the strong kick instructing means and the weak kick instructing means. When the strong kick instruction means has been selected, the ball hits the kicker cursor at a point in the strong guide region, whereas, if the weak kick instruction means has been selected, the ball hits the kicker cursor at a point in the weak guide region.

The kicker cursor displaying means displays, after the kick, a shoot position guide indicative of the shoot position. At the same time, the keeper cursor may have an outer peripheral punch cursor region for checking the ball by punching and an inner catch cursor region for checking the ball by catching, so that, when the position of the shoot position guide falls within the punch cursor region, a judgement is made that the ball has been checked by punching, whereas, when the position of the shoot position guide falls within the catch cursor region, a judgement is made that the ball has been checked by catching. Thus, the manner in which the goalkeeper character checks the kicked ball is sorted into two types of actions: namely, checking by punching which is accomplished when the shoot position guide indicative of the position of arrival of the ball is trapped in the area of the punch cursor, and checking by catching which is accomplished when the shoot position guide is in the area of the catch cursor. This provides a more complicated simulation of the action of the goalkeeper player character, thus presenting feel of presence or participation in the game.

The present invention also provides a method for displaying PK match cursors in a video soccer game in which a monitor screen displays, at least, characters representing the goal, a player acting as a kicker, a ball, and a player acting as the goalkeeper, so that a PK match is simulated by the characters in accordance with kicking instructions and checking instructions given by a game player through a controller, the method comprising: movably displaying a kicker cursor on the monitor screen, the kicker cursor being indicative of a shoot position to which the ball is to be kicked by the kicker character; and movably displaying a keeper cursor on the monitor screen, the keeper cursor being indicative of an area covered by the goalkeeper character for checking the ball.

Preferably, a judgement between success and failure of goal is made depending on the positions of the kicker cursor and keeper cursor relative to each other.

It is also preferred that the kicker cursor has an outer peripheral strong kick guide region and an inner weak kick guide region, and the ball when kicked in accordance with strong kick instructions hits a point within the strong kick guide region, whereas, when kicked in accordance with the weak kick instructions, the ball hits a point within the weak kick guide region.

It is also preferred that the kicker cursor is changed, after the kick, into a shoot position guide indicative of the shoot position, and the keeper cursor has an outer peripheral punch cursor region for checking the ball by punching and an inner catch cursor region for checking the ball by catching, so that, when the position of the shoot position guide falls within the punch cursor region, a judgement is made that the ball has been checked by punching, whereas, when the position of the shoot position guide falls within the catch cursor region, a judgement is made that the ball has been checked by catching.

The present invention also provides a storage medium storing a program for displaying PK match cursors in a video soccer game in which a monitor screen displays, at least, characters representing the goal, a player acting as a kicker, a ball, and a player acting as the goalkeeper, so that a PK match is simulated by the characters in accordance with kicking instructions and checking instructions given by a game player through a controller, wherein the program comprises: movably displaying a kicker cursor on the monitor screen, the kicker cursor being indicative of a shoot position to which the ball is to be kicked by the kicker character; and movably displaying a keeper cursor on the monitor screen, the keeper cursor being indicative of an area covered by the goalkeeper character for checking the ball.

Preferably, in the above-mentioned program, a judgement between success and failure of goal is made depending on the positions of the kicker cursor and keeper cursor relative to each other.

It is also preferred that the kicker cursor has an outer peripheral strong kick guide region and an inner weak kick guide region, and the ball when kicked in accordance with strong kick instructions hits a point within the strong kick guide region, whereas, when kicked in accordance with the weak kick instructions, the ball hits a point within the weak kick guide region.

The program also is preferably such that the kicker cursor is changed, after the kick, into a shoot position guide indicative of the shoot position, and the keeper cursor has an outer peripheral punch cursor region for checking the ball by punching and an inner catch cursor region for checking the ball by catching, so that, when the position of the shoot position guide falls within the punch cursor region, a judgement is made that the ball has been checked by punching, whereas, when the position of the shoot position guide falls within the catch cursor region, a judgement is made that the ball has been checked by catching.

The above and other objects, features and advantages of the present invention will become clear from the following description of the preferred embodiments when the same is read in conjunction with the accompanying drawings.

BRIEF DESCRIPTION OF THE DRAWINGS

FIG. 7 is an illustration of the content displayed on the screen at another phase of a game;

FIGS. 8A to 8C are illustrations of an instruction set, wherein FIG. 5A is a flow chart illustrative of a formation manager, FIG. 8B is a flow chart illustrative of a team manager and FIG. 8C is a flow chart illustrative of a CPU manager;

DESCRIPTION OF THE PREFERRED EMBODIMENTS

Figure 1:
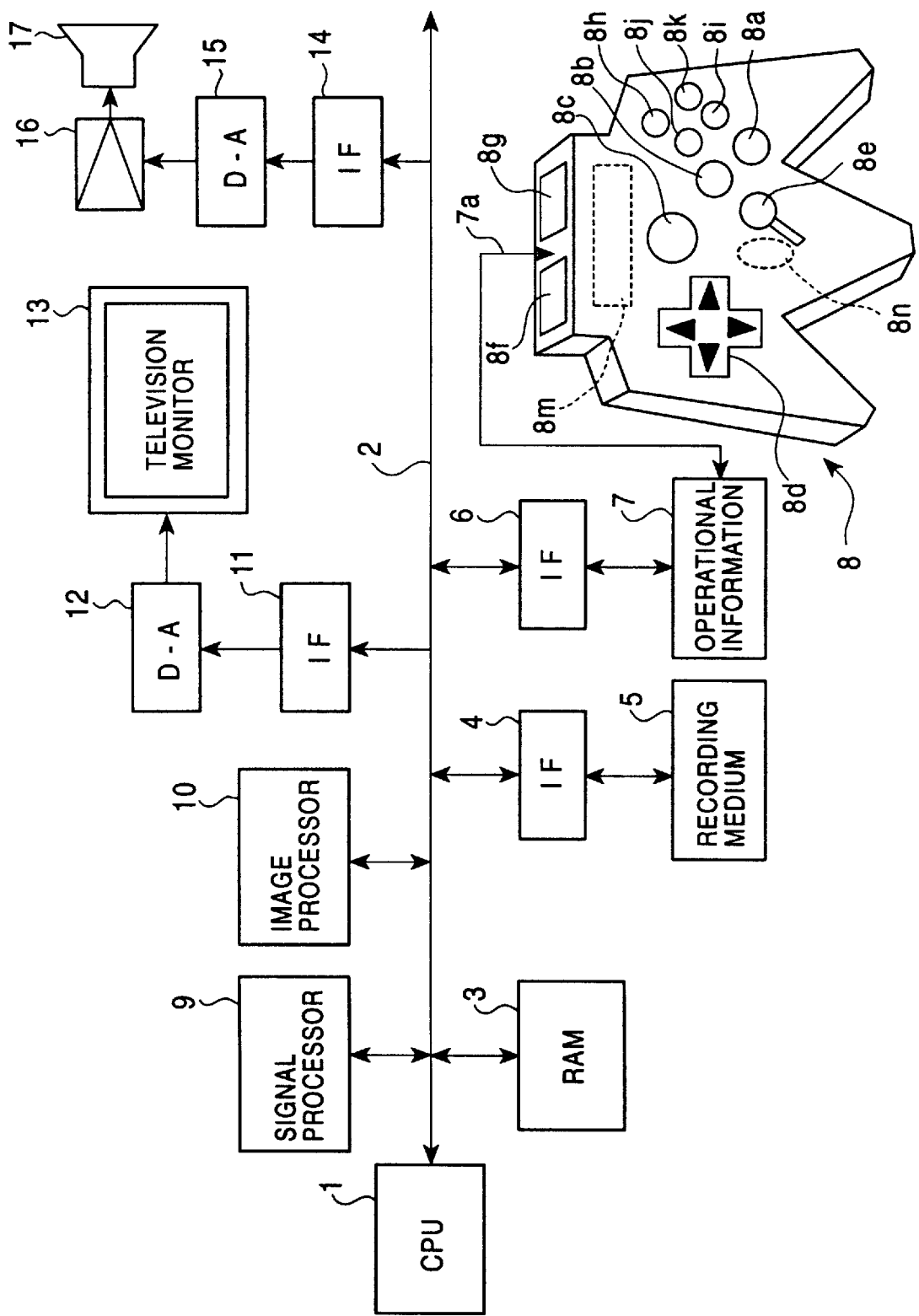
FIG. 1 is a block diagram showing the structure of a game system which is an embodiment of the present invention.

FIG. 1 shows the structure of a game system incorporating the present invention.

The game system shown in FIG. 1 has a game machine which constitutes the main part of the system, a television monitor 13 which outputs the image of the game, a pre-main amplifier 16 and a speaker which produce voices during the game, and a recording medium 5 which 5 which stores game data including image, voice and program data. The recording medium 5 may be a so-called ROM cassette having a plastics case accommodating a ROM storing the game data and operating system program data, an optical disk, a flexible disk, and so forth. Obviously, the recording medium may be of the type which is directly mounted on the game circuit board.

The game machine has a CPU 1 to which is connected a BUS 2 including data BUS and controller BUS. Components such as a RAM 3, interface circuit 4, interface circuit 6, signal processor 9, image scribing processor 10, interface circuit 11 and another interface circuit 14. A controller 8 is connected to the interface circuit 6 through an operational information interface circuit 7. A D-A converter 12 is connected to the interface circuit 11. A D-A converter 15 is connected to the interface circuit 14.

The game system can be implemented in various forms adapting to various uses. For instance, the game system may be constructed such that the game machine is built up as a machine separate from other components such as the television monitor 13, pre-main amplifier 16 and the speaker 17, so as to be adapted for use individual homes. When the game system is intended for game businesses, all the components of the system shown in FIG. 1 are consolidated into one unit housed in a single housing. When the game system is designed as a system implemented by a personal computer or a work station, the computer display serves as the television monitor 13. Similarly, the image scribing processor 10 is implemented by part of the game program data recorded in the recording medium 5 or by a hardware built on an expansion board mounted in an expansion slot of the computer. Other components such as the interface circuits 4, 6, 11 and 14, the D-A converters 12, 15 and the operational information interface circuit 7 are also implemented by the hardware on the expansion card mounted in the expansion slot of the computer. The RAM 3 is implemented by using an area in the main memory of the computer or an expansion memory of the same. Thus, the game system of the present invention can be implemented in various forms, although the following description of embodiments specifically mentions to a game system intended for home uses.

A detailed description will now be given of each of the components shown in FIG. 1. The signal processor 9 performs processings of various signals used mainly for computation of the viewing positions (as will be described later, this embodiment produces the images of the game in the same way as a television camera, with various heights, direction and zooming), computation of three-dimensional coordinates of the viewing points, and computation for converting the three-dimensional positions into positions in a pseudo-three-dimensional space. The signal processor 9 also performs light source computing processing, as well as generation and processing of voice data.

The image scribing processor 10 operates based on the results of computation performed by the signal processor 9 so as to perform various processings such as a processing for writing in the RAM 3 of image data to be scribed, e.g., writing (pasting) of texture data in areas of the RAM 3 in accordance with instructions given in the form of polygons.

A controller 8 has an "A" button 8a, "B" button 8b, start button 8c, a cross key 8d, a stick-type controller 8e, a left trigger button 8f, a right trigger button 8g, a C1 button 8h, a C2 button 8i, a C3 button 8j, a C4 button 8k, a connector 8m and a depthwise (direction perpendicular to two-dimensional display) trigger button 8n. A memory or an equivalent means can detachably be connected to the connector 8m. The stick-type controller 8e is operable not only in four directions, i.e., up, down, left and right directions, but is tiltable in full 360 direction. Thus, the stick-type controller 8e has a function substantially the same as that of a joy stick. The C1 button 8h, C2 button 8i, C3 button 8j and the C4 button 8k will also be referred inclusively as "C" buttons. The functions of these buttons will be explained when these buttons are mentioned in the course of the following description.

A description will now be given of the operation.

A power switch (not shown) is turned on, so that power is supplied to the game system. As a result, the CPU 1 reads from the recording medium 5 data such as image, voice and game program data. Part or whole of the thus read image, voice and game program data are held on the RAM 3. Thereafter, the CPU 1 proceeds with the game in accordance with the game programs and data including image data composed of polygons and textures of objects to be displayed and voice data, and also in accordance with instructions given by the game player through the controller 8. More specifically, the CPU 1 serves to generate various commands of tasks for scribing images and outputting voices, in accordance with instructions given by the game player through the controller 8. The signal processor 9 operates in Accordance with these commands so as to perform computation of the viewing position, computation of positions of character players on a three-dimensional space and in a two-dimensional plane as viewed from the viewing position, and computation of light source, as well as generation and processing of voice data.

Based on the results of these computations, the image scribing processor 10 performs processings such as writing of image data to be scribed, in a display area of the RAM 3. The image data written in the display area of the RAM 3 is supplied to the D-A converter 12 through the interface circuit 11. The D-A converter 12 converts the image data into analog video signals which are delivered to the television monitor 13 so as to be displayed thereon. In the meantime, the voice data output from the signal processor 9 is supplied to the D-A converter 15 through the interface circuit 14. The voice data converted into analog voice signals is supplied through the pre-main amplifier 16 to the speaker 17 so as to be output therefrom.

Image scribing commands are sorted into two types: image scribing commands for scribing three-dimensional images by using polygons, and image scribing commands for scribing ordinary two-dimensional images. The term "polygon" is used to mean an elementary two-dimensional image which is, in this embodiment, a triangle or a rectangle.

The scribing command for scribing a three-dimensional image by using polygons comprises polygon apex address data showing address in the RAM 3, texture address data showing the storage positions in a buffer 11 of texture data to be pasted to the polygons, color pallet address data showing storage positions on the RAM 3 of color pallet data indicative of the colors of the texture data, and luminance data showing luminance levels of the textures.

The polygon apex address data is obtained through a coordinate conversion of coordinate data of apex of each polygon on a three-dimensional space into two-dimensional coordinate data indicative of the apex of each polygon in a two-dimensional plane. This coordinate conversion is performed by the image scribing processor 9 in accordance with data such as data indicative of the amount of scrolling and rotation of the display. The image scribing processor 10 writes texture data corresponding to 3 to 4 polygons in the display area of the RAM 3 designated by the apex address data of these polygons.

Each object is built up from a multiplicity of polygons. The CPU 1 stores in the RAM the three-dimensional coordinate data of each polygon. The following processing is performed when moving the player character on the display through the operation of the controller 8, i.e., when the action or motion of the player is expressed or when the viewing position from which the game player views the player is changed.

The CPU 1 successively determines the three-dimensional coordinates data of the successive polygons after movement and rotation, based on the moving amount data and rotation data of the respective polygons. Horizontal and vertical coordinate data among the thus obtained three-dimensional coordinate data are supplied to the image scribing processor 10, as the address data identifying the addressed in the display area of the RAM 3, i.e., as the polygon apex address data. The image scribing processor 10 then operates so as to write, in a triangular or a rectangular display area identified by three or four pieces of polygon address data, the texture data identified by texture address data which are given beforehand. Consequently, objects such as the player characters of both teams, judge, field, goal net, stadium stand and audience are displayed on the screen of the monitor 13, in the form of a numerous polygons with texture data pasted thereto.

The image scribing command for scribing ordinary two-dimensional image comprises apex address data, texture address data, color pallet address data indicative of the position on the RAM 3 where color pallet data showing colors of the texture data are stored, and luminance data showing the levels of luminance of the textures. The apex address data contained in the scribing command thus formed are coordinate data which are obtained through a coordinate conversion from the apex coordinate data on the two-dimensional plane as derived from the CPU 1. This coordinate conversion is performed by the image scribing processor 10 in accordance with the moving amount data and rotation amount data which also are derived from the CPU 1. The image scribing processing will be briefly stated as "issue scribing command", hereinafter.

The signal processor 9 operates to store the ADPCM data read from the recording medium 5 in the RAM 3. The ADPCM data thus stored in the RAM 3 is used as the acoustic source. The signal processor 13 reads the ADPCM data cyclically at a clock frequency of, for example, 44.1 KHz. The signal processor performs various kinds of processings on the ADPCM data read from the RAM 3, such as conversion of pitch, addition of noise, setting of envelope, setting of level and reverberation. When the voice data read from the recording medium 5 is PCM data such as CD-DA (Compact Disk Digital Audio), the data is converted into ADPCM data by the signal processor 9. The processing of the PCM data in accordance with the program data is conducted directly in the RAM 3. The PCM data processed in the RAM 3 is supplied to the signal processing circuit 9 so as to be changed into ADPCM data and, after being subjected to various types of processing, outputted from the speaker 16 as voice signals.

The data contained in the recording medium 5 are read by a driver which may be, for example, a hard disk drive, an optical disk drive, a flexible disk drive, a silicon disk drive, or a cassette medium reading device. Thus, the recording medium 5 may be, for example, a hard disk, an optical disk, a flexible disk, a semiconductor memory, or the like. The driver reads the image data, voice data and program data from the recording medium 5, and delivers the read data to the interface circuit 4. The interface circuit 4 executes an error correction processing on the data reproduced by the driver in accordance with ECC (Error Correction Code), and delivers the data after the error correction to the RAM 3 or to the signal processor 9.

Figure 2:
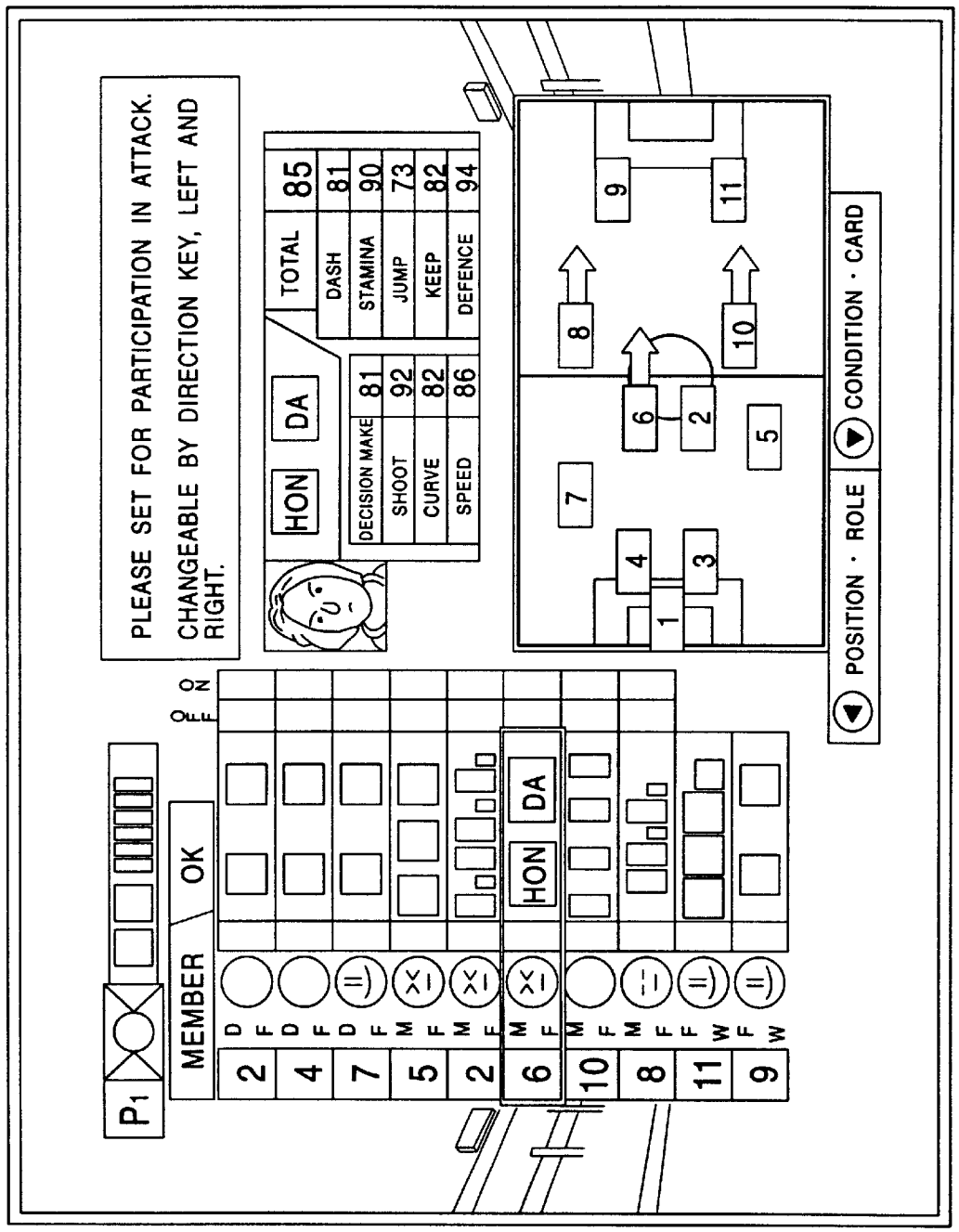
FIG. 2 is an illustration of the content displayed on a screen when an "attack participation" function has been selected.
Figure 3:
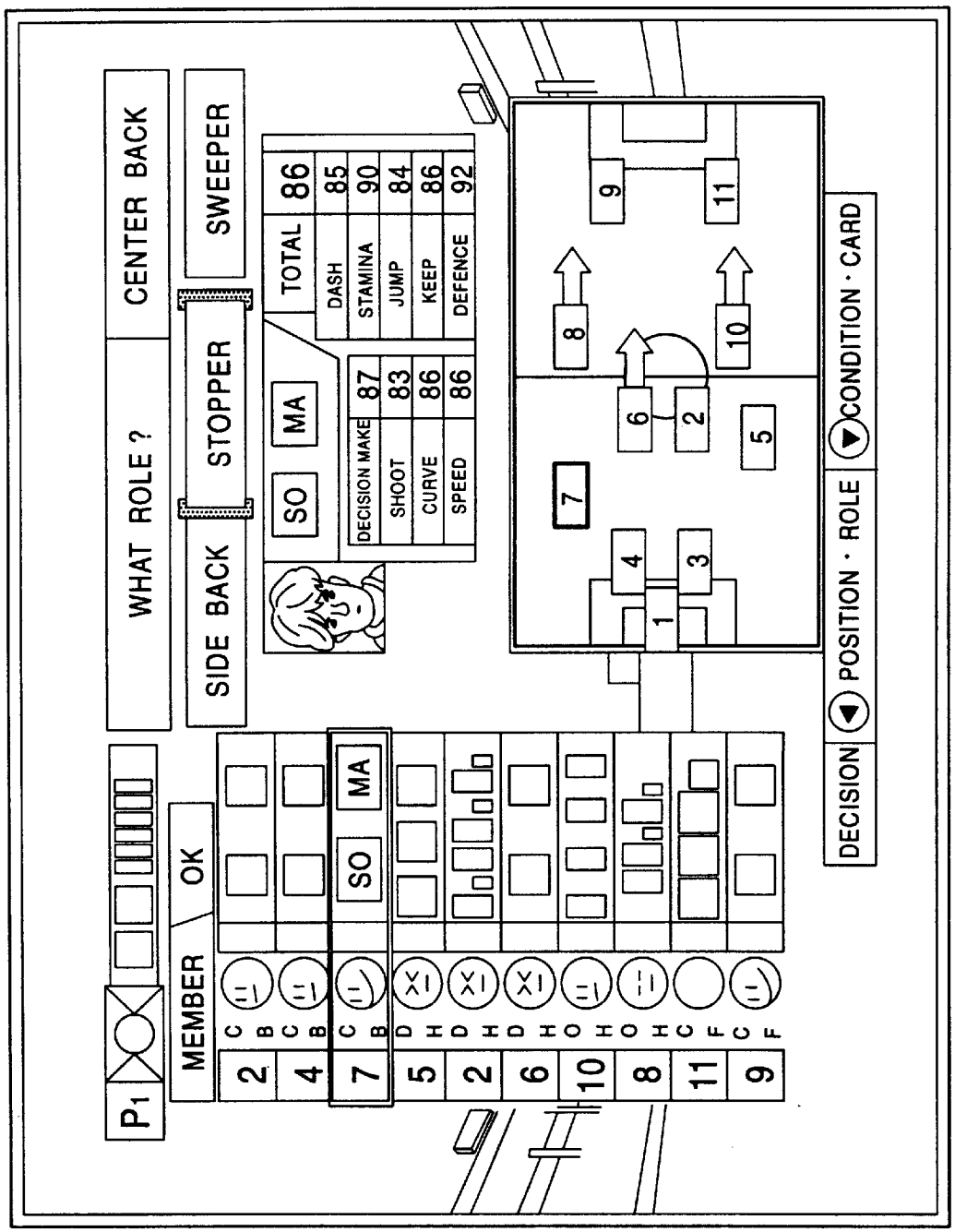
FIG. 3 is an illustration of the content displayed on the screen when a "role selection" function has been selected.
Figure 4:
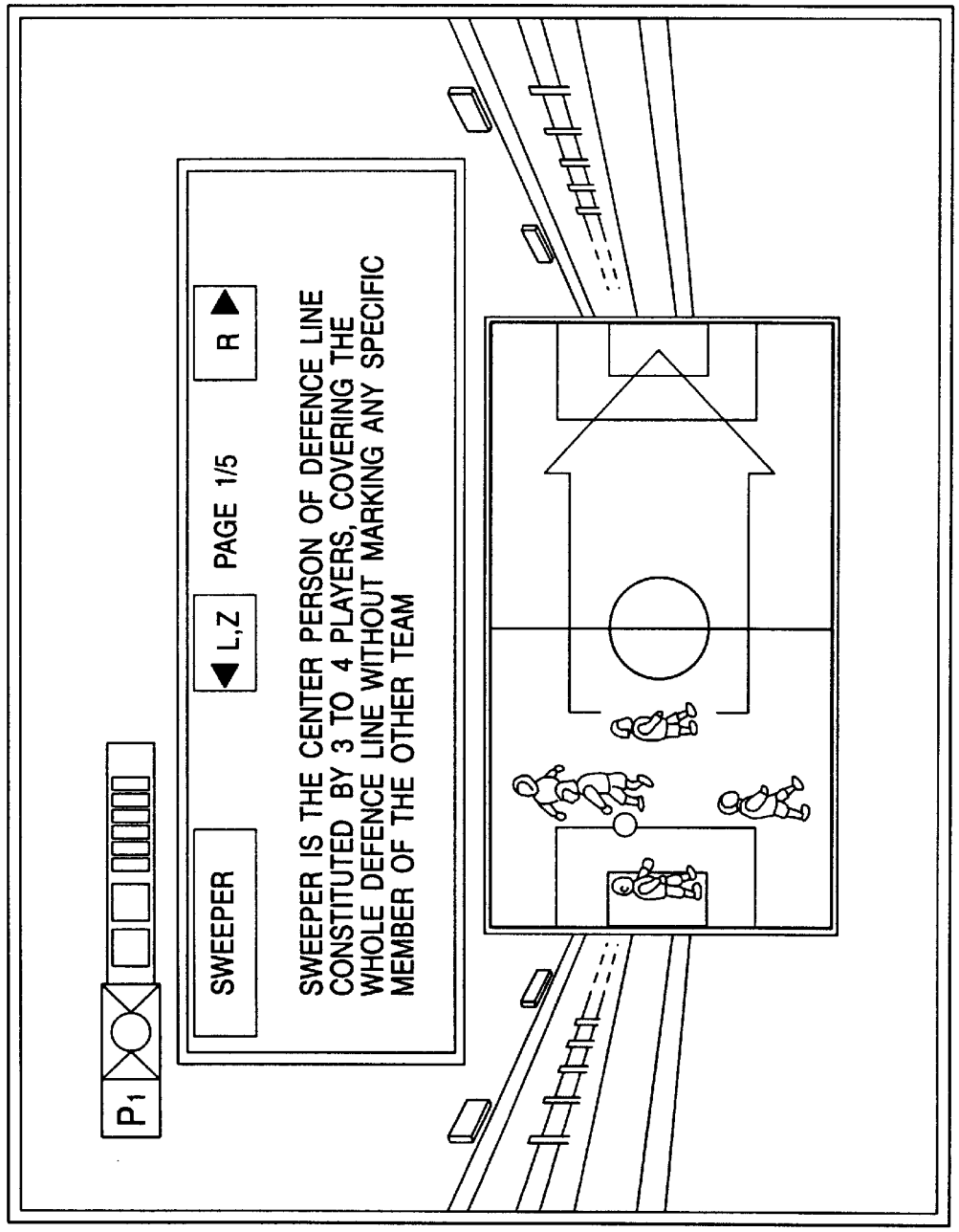
FIG. 4 is an illustration of the content displayed on the screen when an "role explanation" function has been selected.

FIGS. 2 to 4 show examples of contents displayed. More specifically, FIGS. 2, 3 and 4 show the contents displayed on the screen when an "attack participation" function, a "role selection" function and an "role explanation" function are selected, respectively.

The soccer video game system incorporating the present invention has a registration picture display function which is implemented by the CPU 1 and which enables the game player to conduct various kinds of registration prior to the start of the game. A game mode setting display is put on the display first, in the form of icons indicative of various game modes such as "league match", "tournament" and later-mentioned "PK match". The game player can select displays of any desired game mode by placing a cursor on the icon of the desired game mode by means of the cross key 8d and then pushing the "A" button 8a. For instance, when the game player has selected the "tournament"mode, menu for "match setting" appears on the display to permit the opposite team of the match. When selection of modes and conditions through these displays is finished, a "formation edit" panel is displayed in the form of icons. This panel includes icons such as "EXIT" which is one of game setting elements and which permits the game player to exit from the "formation edit" panel, "FORMATION CHANGE" which enables the formation (positions and links of the player characters), "POSITION CHANGE" for adjusting positions of the player characters in each area, "ZONE POSITION CHANGE" which permits a change of positions of all the players in a zone inclusively at once, "ATTACK PARTICIPATION" which permits setting of MF (midfielder) and DF (defender) characters who are to be bound for attack. "ROLE" which permits change of the role of each player character, and "ROLE EXPLANATION" for explaining or describing each role.

The "FORMATION CHANGE" enables allocation of player characters to three zones of DF, MF and FW (forward). The allocation can be made by appointing, by means of the "A" button 8a, the desired type of formation among a plurality of types displayed in the form of a menu.

When the "POSITION CHANGE" is selected, a content substantially the same as a later-mentioned content shown in FIG. 3 is displayed by the registration picture display function, wherein player characters and their positions are shown in the form of vertical columns of lists. The characteristics of each player character, e.g., ability of the player in terms of decision making, shooting, shoot curving, speed, dash, stamina, jump, ball keeping and defence, are displayed when the game player appoints the player by locating the cursor by the cross key 8d and then pushing the "A" button 8a. Thus, the game player can set the positions of the player characters taking into consideration the characteristics of the player characters. More specifically, when the game player appoints a player character by locating the cursor by means of the cross key 8d and then pressing the "A" button 8a, the data setting function of the CPU 1 enables registration of data for each player character, while altering the contents of the display correspondingly. The characteristics or levels of ability are represented numerically employing numerals from 1 to 99, thus facilitating the determination. A lower right area of the display screen displays the field of the soccer game, together with the position of the appointed player character. This position is adjustable by means of the cross key 8d within the same area. The term "area" in this case is used to beam a region which is basically set around each position and which does not interfere with the position of other player character.

When the "ZONE POSITION CHANGE" function has been selected, the game player can effect an inclusive of change of positions of the player characters for each of the zones DF, MF and FW, by moving the zone position by means of the cross key 8d to a desired position and then pressing the "A" button 8a. In this operation, the display is switched so that the whole area of the screen is occupied by the image of the field, thus facilitating the operation. In addition, the zone appointed by the game player is highlighted so as to be more easily discriminated from other zones.

When the "ATTACK PARTICIPATION" function is selected, the image as shown in FIG. 2 under the registration picture display function of the CPU 1 is displayed in which the player characters of a team and their positions are listed. The game player can select the player characters which the game player would like to employ in the attack, by using the stick-type controller 8e or the cross key 8d. In the display contents as shown in FIG. 2, Mr. HON-DA, the No. 6 player character, has been selected and the frame of the list indicating Mr. HON-DA is suitably demarcated for distinction. At the same time, an image of the face of Mr. HON-DA and his characteristics or ability are shown in the right upper part of the display screen. The lower right part of the display screen displays the field of the soccer play in which are shown positions of the player characters. Arrow marks are attached to the positions of the player who have been selected as the attackers, for easy recognition of the attackers and their positions. After the selection of the player characters, the game player presses the "A" button 8a, whereby the selected player characters are determined as being the attackers. The series of processings starting from the selection of the player characters to the determination of the player characters, as well as change in the registered data and display content in accordance with the determination, is performed by the data setting function of the CPU 1. It is possible to conduct the setting of the attackers on the zone basis.

When the "ROLE" is selected by the game player, the display contents are changed into those shown in FIG. 3 in which the names of the player characters and their positions are listed. The game player can select any player character whose role is to be changed, by using the stick-type controller 8a or the cross key 8d, and can determine the role of the player by means of the "A" button 8a. In the case of the display as shown in FIG. 3, Mr. SO-MA, the No. 7 player character, has been selected. (The frame of Mr. SO-MA, is suitably demarcated in the player's list for distinction.) At the same time, an image of the face of Mr. SO-MA and his characteristics or ability are shown in the right upper part of the display screen. The lower right part of the display screen displays the field of the soccer play in which are shown positions of the player characters. The positions of the player who have been selected are displayed at different levels of luminance or in a different color from those of other player characters for the purpose of easier recognition.

A display image as shown in FIG. 4 appears on the display screen when the game player has selected the "ROLE EXPLANATION". In this case, the role "SWEEPER" has been appointed by way of example. A description of the role of a sweeper is displayed at the center of the display screen. At the same time, an example of the motion or action of a sweeper is dynamically shown by a kinematic image on the field which is displayed below the description of the sweeper's role. If the description of the role extends over several pages, the game player an see the next page by pressing the right trigger button 8g and the preceding page by pressing the trigger button 8n or the left trigger button 8f.

Figure 5:
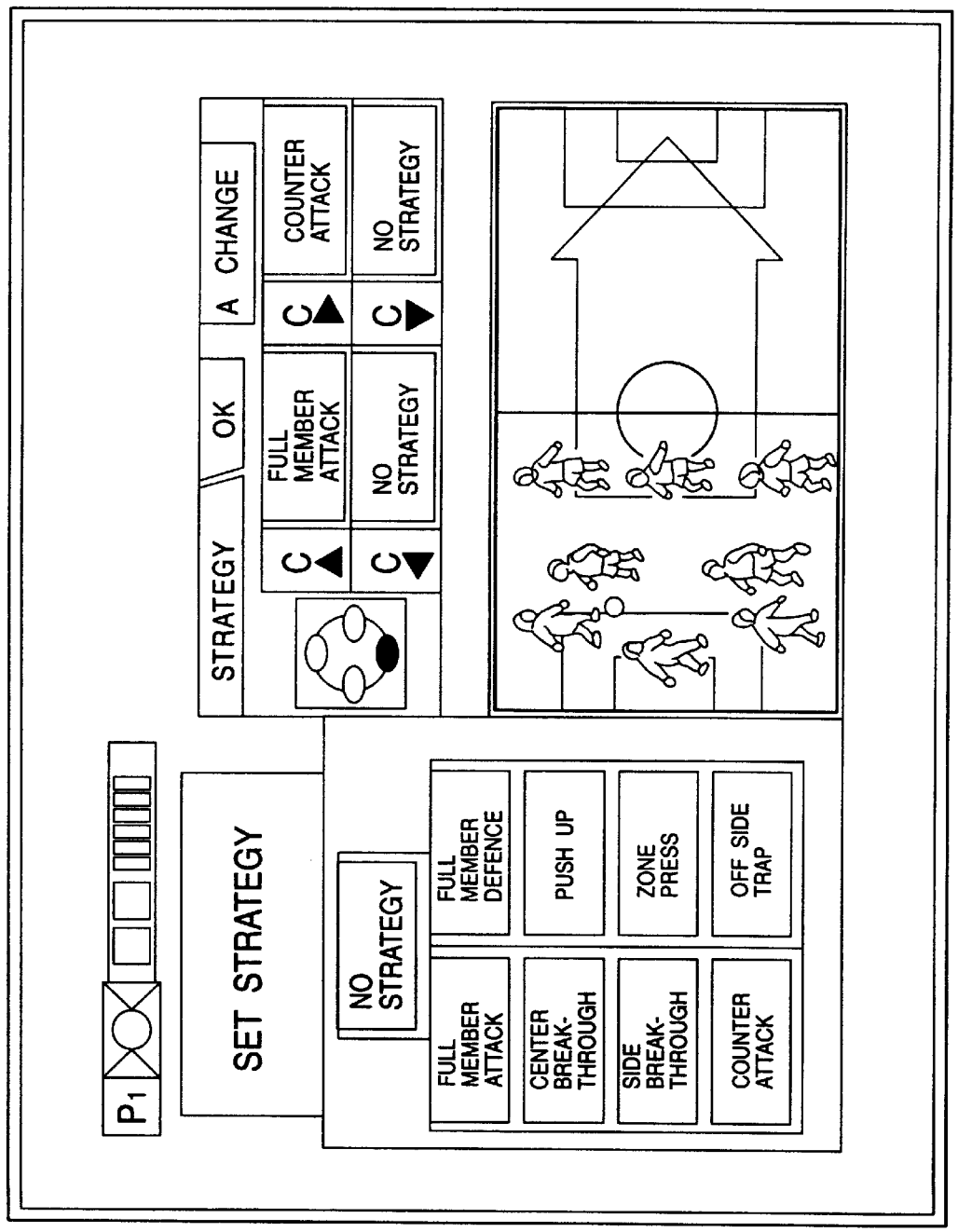
FIG. 5 is an illustration of the content displayed on the screen when a "strategy change," function has been selected.

FIG. 5 shows the contents displayed when "STRATEGY CHANGE" has been selected from among the items shown in the strategy setting panel. More specifically, functions such as "STRATEGY CHANGE", "STRATEGY NUMBER", "STRATEGY EXPLANATION" and so forth are set in the form of icons in the strategy setting panel on the display, in accordance with the registration picture display function of the CPU 1, for selection by the cursor and the "A" button 8a.

The "STRATEGY CHANGE" display as shown in FIG. 5 enables the player characters of the alliance team, except for the player character which is under the control of the game player, to execute a set strategy, on condition that a predetermined event has occurred during the playing and that a preselected C button (correlated to a strategy at the time of change of the strategy) has been pressed. A plurality of strategies can be dealt with by use of the left trigger button 8f or the trigger button 8n simultaneously with the use of the C button. Various types of strategies are shown in the form of icons for selection by the game player, such as "FULL MEMBER ATTACK", "FULL MEMBER DEFENCE", "CENTER BREAKTHROUGH", "PUSH UP", "SIDE BREAKTHROUGH", "COUNTER ATTACK" and so forth, as shown in FIG. 5. For the purpose of changing the strategy, the game player selects, by means of the stick-type controller 8e or the cross key 8d, one of the C keys corresponding to the strategy which the game player wishes to newly employ. The game player then presses the "A" button 8a, whereby the new strategy is determined and registered. The upper right portion of the display screen displays correlations between the types of the strategies and the buttons for appointing such strategies. In the case of the display as shown in FIG. 1, the "FULL MEMBER ATTACK" strategy is registered in relation to the C2 button 8i, while the "COUNTER ATTACK" strategy has been registered in relation to the C4 button 8k. Other types of strategies have not been registered, as the other C2 buttons correspond to "NO STRATEGY". A schematic image of the "C" buttons is displayed substantially at the central portion of the display screen. Among the four "C" buttons of this schematic image, the buttons which have been correlated to strategies are highlighted, thus enabling the game player to easily recognize the "C" buttons which have been used for the setting of the strategies. The processings for setting the strategies, registering the strategies and changing the display contents in accordance with the newly set strategies are executed by a command setting function possessed by the CPU 1.

Figure 6:
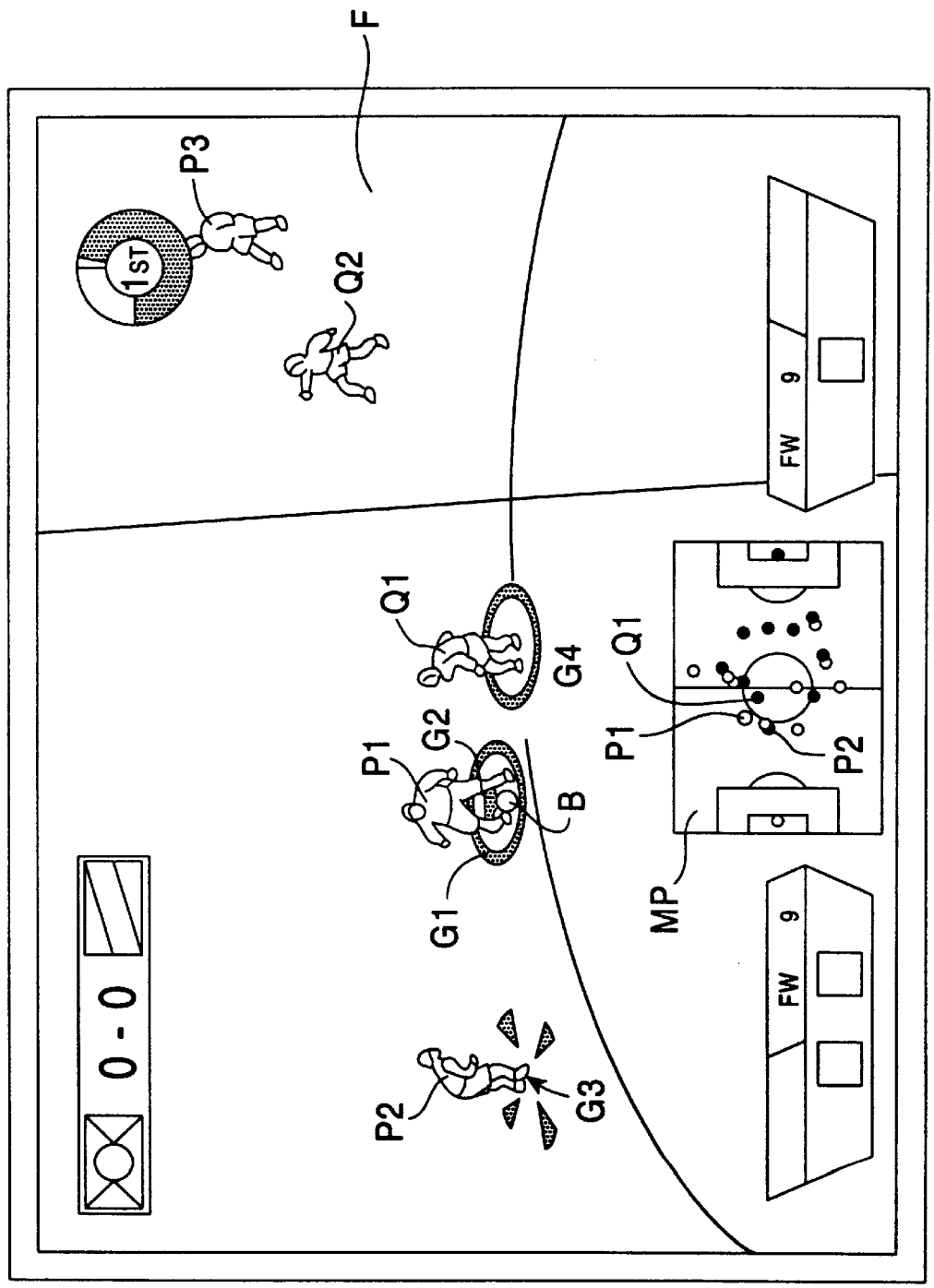
FIG. 6 is an illustration of the content displayed on the screen at a certain phase of a game.

FIGS. 6 and 7 show contents displayed in certain phases of the soccer play. Pressing of the start button 8c during the playing causes the display to pause so as to enable setting of environmental conditions. More specifically, various modes as "CHANGE PLAYER", "REPLAY", "CAMERA ZOOMING", "CAMERA HEIGHT", "CONTINUE THE PLAY" and so forth are displayed in the form of icons in response to the pressing of the start button 8c. Selection of the "CAMERA ZOOM" changes the display from the menu display to the pause display so as to enable the user to change size of the television camera image, i.e., zoom-in or zoom-out, to selectively obtain views from a near viewing position, an intermediate viewing position or a far viewing position, by using the stick-type controller 8e or the cross key 8d. When the "CAMERA HEIGHT" is selected, the display is changed from the menu display to the pause display so that the game player can set the height of the viewing position, i.e., the camera position, to obtain views at a low camera angle, intermediate camera angle and high camera angle, by operating the stick type controller 8e or the cross key 8d. A subsequent pressing of the start button 8c resets the display so that the soccer play is displayed again on the screen. The lateral or horizontal movement of the camera is automatically controlled in such a manner that the camera chases the ball, so that the ball is displayed as possible at the center of the display screen.

As will be sen from FIGS. 6 and 7, the math card is shown at the left upper corner of the display screen. Scores are shown immediately on the right side of the card. Remaining time is shown at the right upper corner of the display screen. The name of the player character under the control of the game player is shown at the left lower corner, while the name of the enemy nearby player character is shown at the lower left corner of the display screen.

Referring specifically to FIG. 6, the field F is shown over the entire area of the screen in the central area of which are displayed a player character P1 who keeps the ball and who is under the control of the game player, a nearby enemy player character Q1 and a nearby alliance player character P2. Another enemy player character Q2 is shown in a right area of the field, together with another alliance player character P3 behind the enemy player character Q2. Basically, the player character under the control of the game player is the player character which keeps the ball. For an easier recognition of the player character P1 keeping the ball, there are provided a monitoring function which monitors and identifies the player character P1 holding the ball, a guide display function for displaying a ring-shaped guide G1 on the field plane around the player character P1, and a direction guide display function for displaying, in a color different from that of the guide G1, a guide G2 which indicates the direction of movement of the player character P1 or the direction of the ball as viewed from a foot of the player character P1 so as to facilitate recognition of the direction.

A guide G3 radially extends in four directions from the position where the nearby alliance player character P2 which basically is a player to whom the ball can be passed. The guide G3 is displayed by a second guide display function of the CPU 1 in the same color as the first-mentioned guide G1. The second guide display function is designed such that, even when the player character P2 has come out of the area of display so that the guide G3 has become invisible, a portion of the guide G3 is displayed on the end of the display area so as to properly indicate the direction in which the ball is to be passed by the player character P1.

Referring to FIG. 6, a ring-shaped guide G4 of a color different from that of the player character P1 is displayed around the nearby enemy player Q1, by the third guide display function of the CPU 1. In FIG. 7, there is shown no enemy player character Q1 having the guide G4. This suggest that the enemy player character Q2 is not the enemy player character which is the nearest to the player character P1, but another enemy player character, which is closer to the player character P1 than the enemy player character Q2 is, exists although such an enemy player is out of the area of the display and, hence, invisible.

A brief description will be made here as to the operational instructions for implementing the motion or action of the player P1. The player character P1 is moved in accordance with instructions given through the buttons of the controller 8. It is possible that the game player sets an operation pattern which suits to the game player. For instance, the game player can give instructions as to the direction in which the player character dribbles the ball, by means of the stick-type controller 8e. Other motions can be implemented by using buttons together with the stick-type controller 8e. For instance, the "A" button 8a is used for a "pass" and the "B" button 8b is used for a "shoot". Among the "C" buttons, the C1 button 8h is used for a "through-pass", a C2 button 8i is used for a "dash", a C3 button 8j is used for a "fly ball", and the C4 button is used for "one-two pass". In the defence mode of operation, the game player can set a desired motion of the player character Q1 by using these buttons in the same way as that for the player character.

There are two modes of enjoying this game. One is a single-player game mode in which a single game player competes with a team which is commanded by the computer, while the other is a couple-player game mode in which two game players compete with each other. In each mode, positions of the player characters other than the player character P1 (both P1 and Q1 in double game mode) are computed and administrated by the computer in accordance with a game program which simulates as possible the rules of the soccer game.

The CPU 1 has a map display function which enables a map MP, schematically illustrating the whole player field, to be displayed at a lower central portion of the display screen. In this display, the player characters of the alliance and enemy teams are displayed in different colors, so that the game player or players can always recognize the positions of the player characters P1 and P2, as well as positions of other characters, relative to the entire area of the play field, even when the main part of the display area shows only part of the play field F.

A description will now be given of the game program executed by the CPU 1.

Figure 8A:
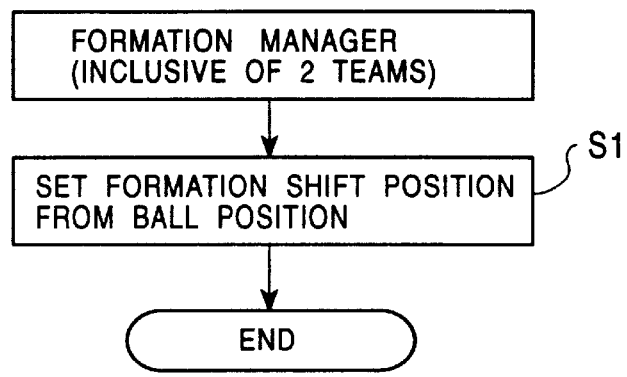
Figure 8B:
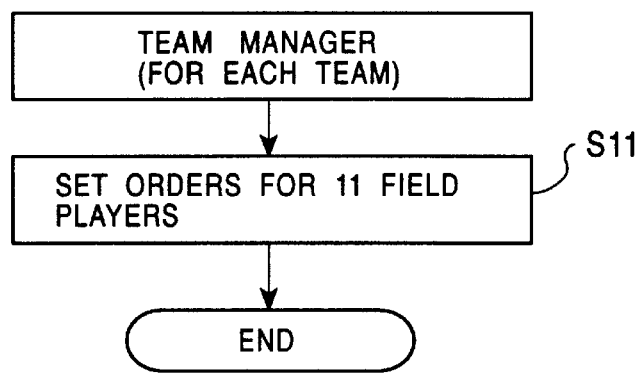
Figure 8C:
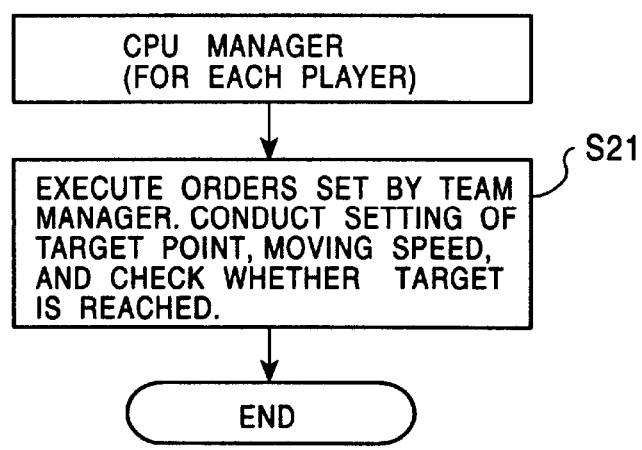

FIGS. 8A to 8C show processes for setting commands by the CPU 1. More specifically, FIG. 9A is a flow chart illustrating the formation manager, FIG. 8B is a flow chart showing the team manager, and FIG. 8C is a flow chart illustrative of a CPU manager. Referring first to FIG. 8A, the CPU 1 sets a formation shift position program with respect to the position of the ball, inclusively for both teams (Step S1). In the flow shown in FIG. 8B, commands are set on 11 field player characters for each team, as will be described later (Step S11). In the flow shown in FIG. 8C, commands set by the team manager on the respective player characters are executed, and setting of the destination, setting of the moving speed and checking as to whether the destination has been reached are performed (Step S21), whereby the game can proceed without trouble.

Figure 9:
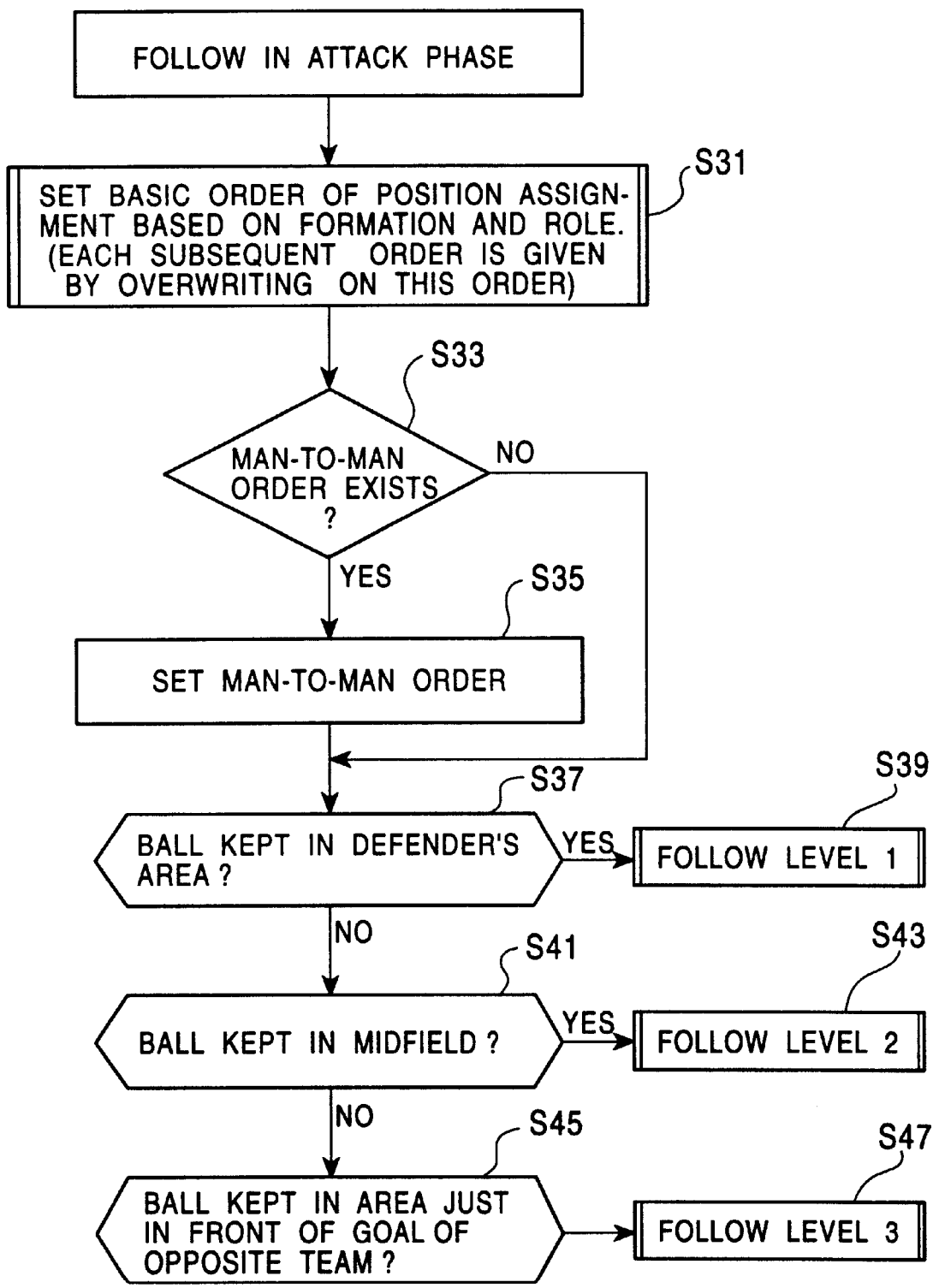
FIG. 9 is a flow chart of a "follow" operation to be performed during attacking.

FIG. 9 is a flow chart illustrative of the follow play during attacking.

First of all, basic commands are set for positioning of the player characters on the play field, in accordance with the formation and the roles (Step S31). Thus, the positions of the player characters are set as the basic positions in the formation, on the play field which simulates an actual soccer play field, in accordance with the roles of the player characters. Then, a determination is conducted as to whether a man-to-man order has been given (Step S33). If there is a man-to-man order, a man-to-man command is set (Step S35), otherwise the process advances to Step S37 skipping the Step S35. In Step S37, a determination is conducted as to whether the ball is kept in the defender's area. If the ball is kept in the defender's area, "follow level 1" is set in Step S39, otherwise the process advances to Step S41 which determines whether the ball is kept in midfield. If the ball is kept in the midfield, the process advances to Step S43 which sets a "follow level 2", otherwise the process advances to Step S45 and then to Step S47 which sets a "follow level 3".

Figure 10:
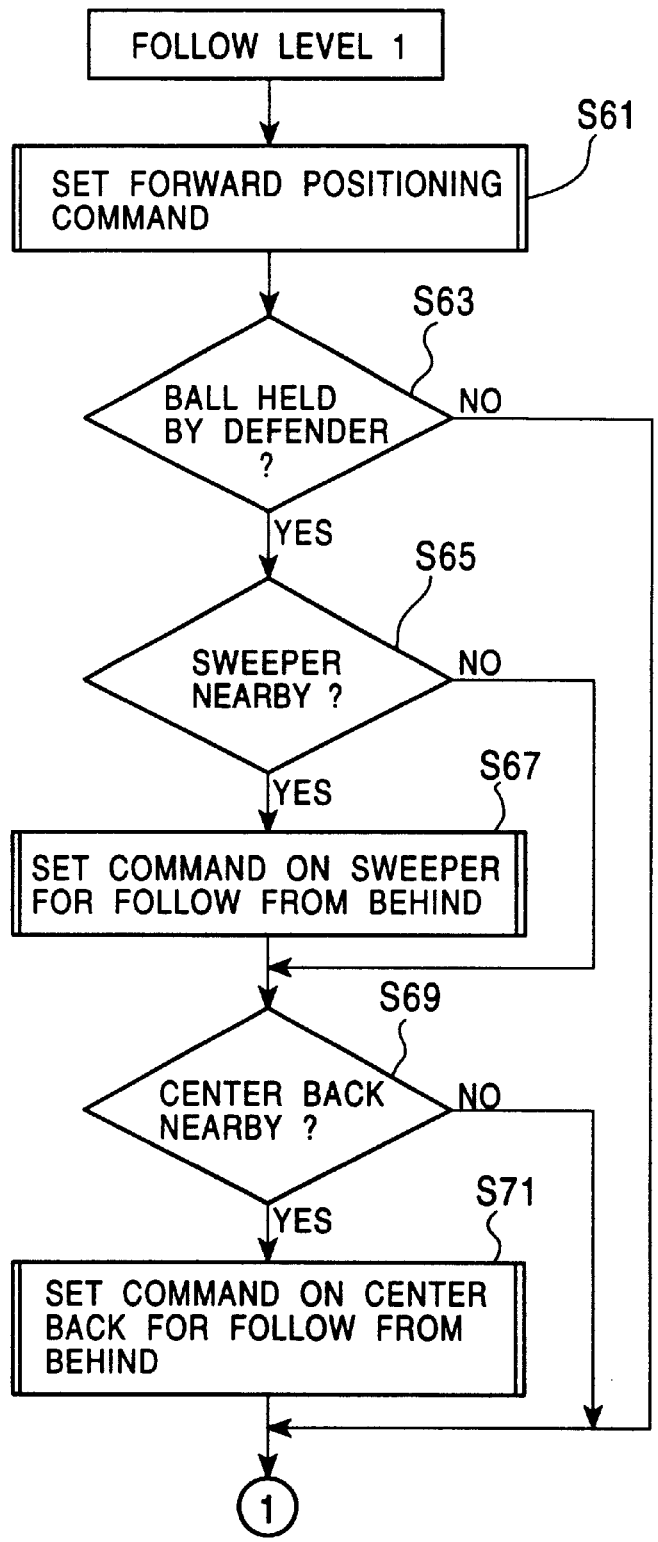
FIG. 10 is a flow chart showing part of a sub-routine of a "follow level 1" shown in the flow chart of FIG. 9.
Figure 11:
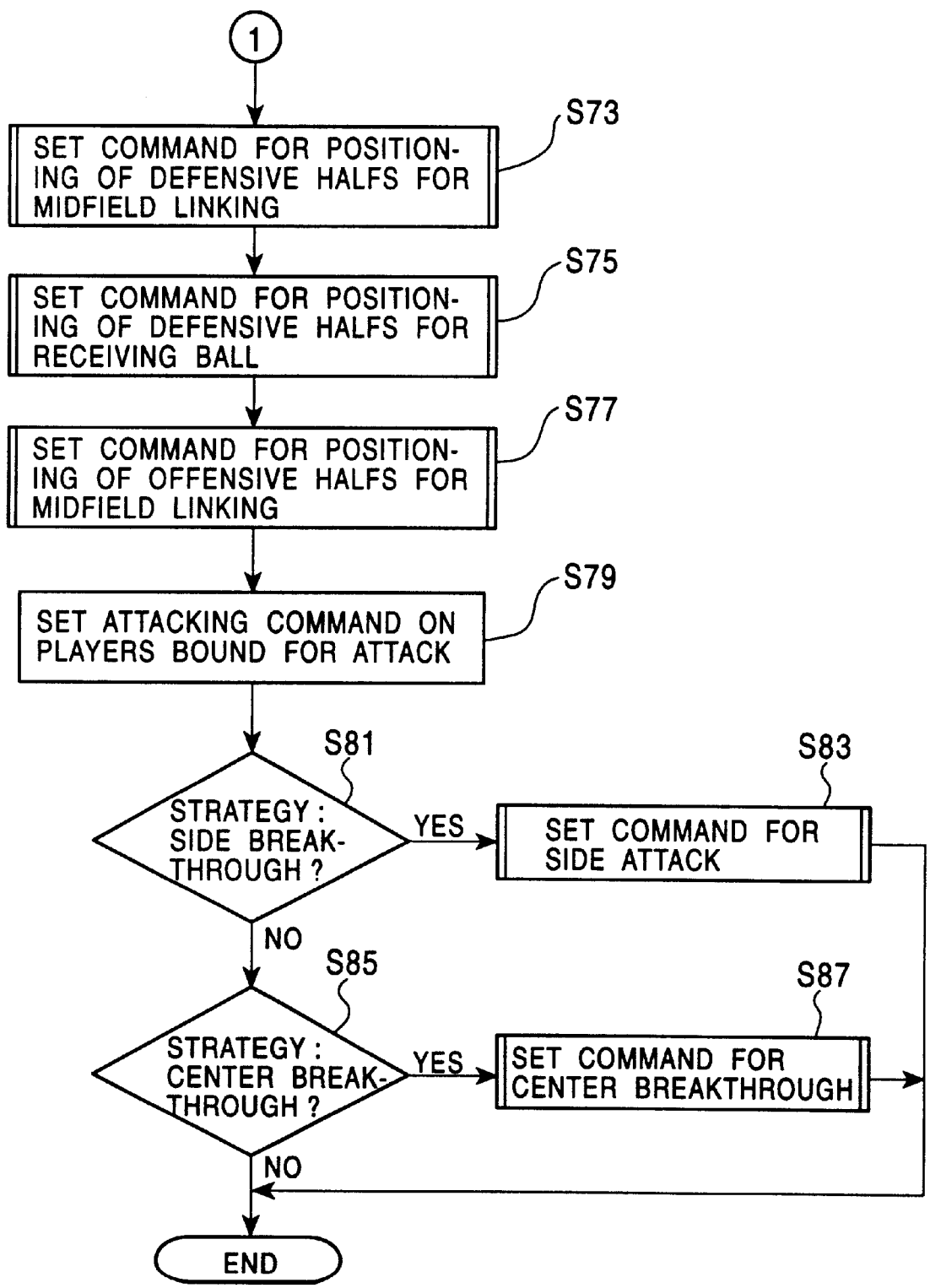
FIG. 11 is a flow chart showing another part of a sub-routine of a "follow level 1" shown in the flow chart of FIG. 9.

FIGS. 10 and 11 are flow charts showing the sub-routine for the "follow level 1" shown in FIG. 9.

This sub-routine begins with Step S61 which sets a "forward positioning" command. The forward positions are set near the defence line of the enemy team as viewed in the goal direction and, in the left to right directions, at random positions when it is expected that the ball will not reach the forwards immediately. The forward positioning is conducted also in such a manner that, when the ball has approached the goal of the enemy team, forward positions are set in any locations in the penalty area, whereas, if the ball is far from the goal, the forward positions are shifted to positions closer to the formation positions.

Then, a determination is conducted as to whether the defender keeps the ball (Step S63). If the ball is not kept by the defender, the process skips to Step S73, otherwise the process proceeds to Step S65 which determines whether or not there is a sweeper nearby. If a nearby sweeper exists, a "follow from behind sweeper" command is set (Step S67). The "follow from behind sweeper" is set at a position which is on the same side of the ball as the alliance goal and such that the follow is done at a position closer to the goal, depending on whether the ball is at the left side or the right side relative to the goal.

Then, a determination is conducted in Step S69 as to whether the center back exists nearby (within a predetermined distance). If the center back does not exists nearby, the process skips to Step S37, whereas, if the center back exists nearby, Step S71 is executed to set the "FOLLOW FROM BEHIND CENTER BACK" command. As is the case of the "follow from behind sweeper" stated above, the "follow from behind the center back" is set at a position which is on the same side of the ball as the alliance goal and such that the follow is done at a position closer to the goal, depending on whether the ball is at the left side or the right side relative to the goal.

Then, Step S73 is executed to set a command for "POSITIONING OF DEFENSIVE HALFS FOR MIDFIELD LINKING". In accordance with this "MIDFIELD LINKING" command, the positions of the defensive halfs are set in relation to the position of the ball such that the defensive halfs progressively approach the ball when the ball is within the alliance area.

Subsequently, Step S75 is executed to set a command for "POSITIONING OF DEFENSIVE HALFS FOR RECEIVING BALL". In response to this command, positions of the defensive halfs are set in relation to the position of the ball such that the defensive halfs progressively approach the ball in the goal direction and, in the side directions, such that the defensive halfs are positioned closer to the goal.

Step S77 sets a command for "POSITIONING OF OFFENSIVE HALFS FOR MIDFIELD LINKING". The positioning of offensive halfs in midfield is conducted first in the alliance area in accordance with the ball position and the position of the field.

Then, an "ATTACKING COMMAND ON PLAYERS BOUND FOR ATTACKING" is set in Step S79. Step S81 determines whether the strategy is "SIDE BREAKTHROUGH", while Step S85 determines whether the strategy is "CENTER BREAKTHROUGH". If the strategy is the "SIDE BREAKTHROUGH", Step S83 is executed to set a command for "SIDE ATTACK", in Step S83, whereas, if the strategy is "CENTER BREAKTHROUGH", a command for "CENTER BREAKTHROUGH" is set in Step S87.

Figure 12:
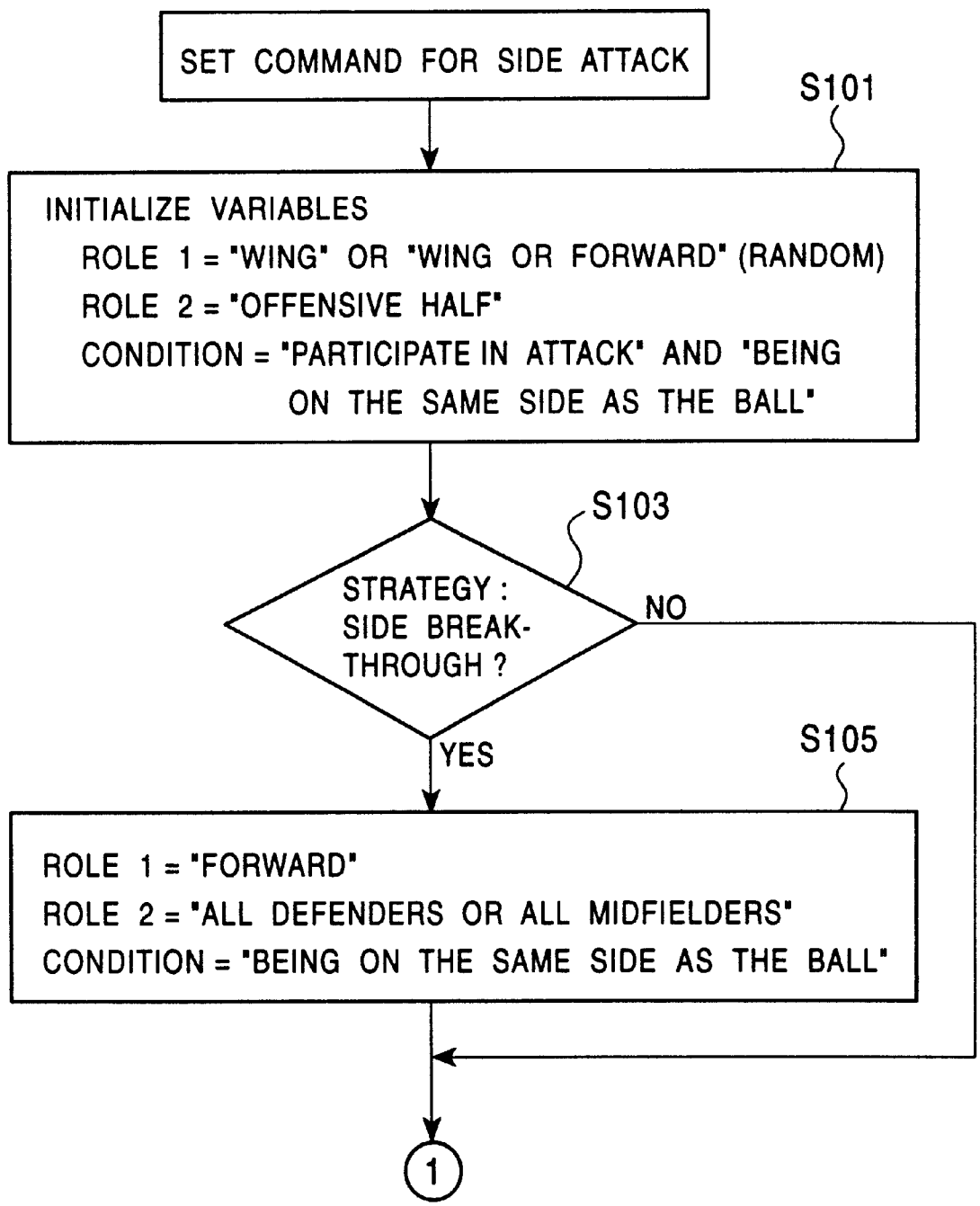
FIG. 12 is a flow chart showing part of a subroutine for setting "side attack command"
Figure 13:
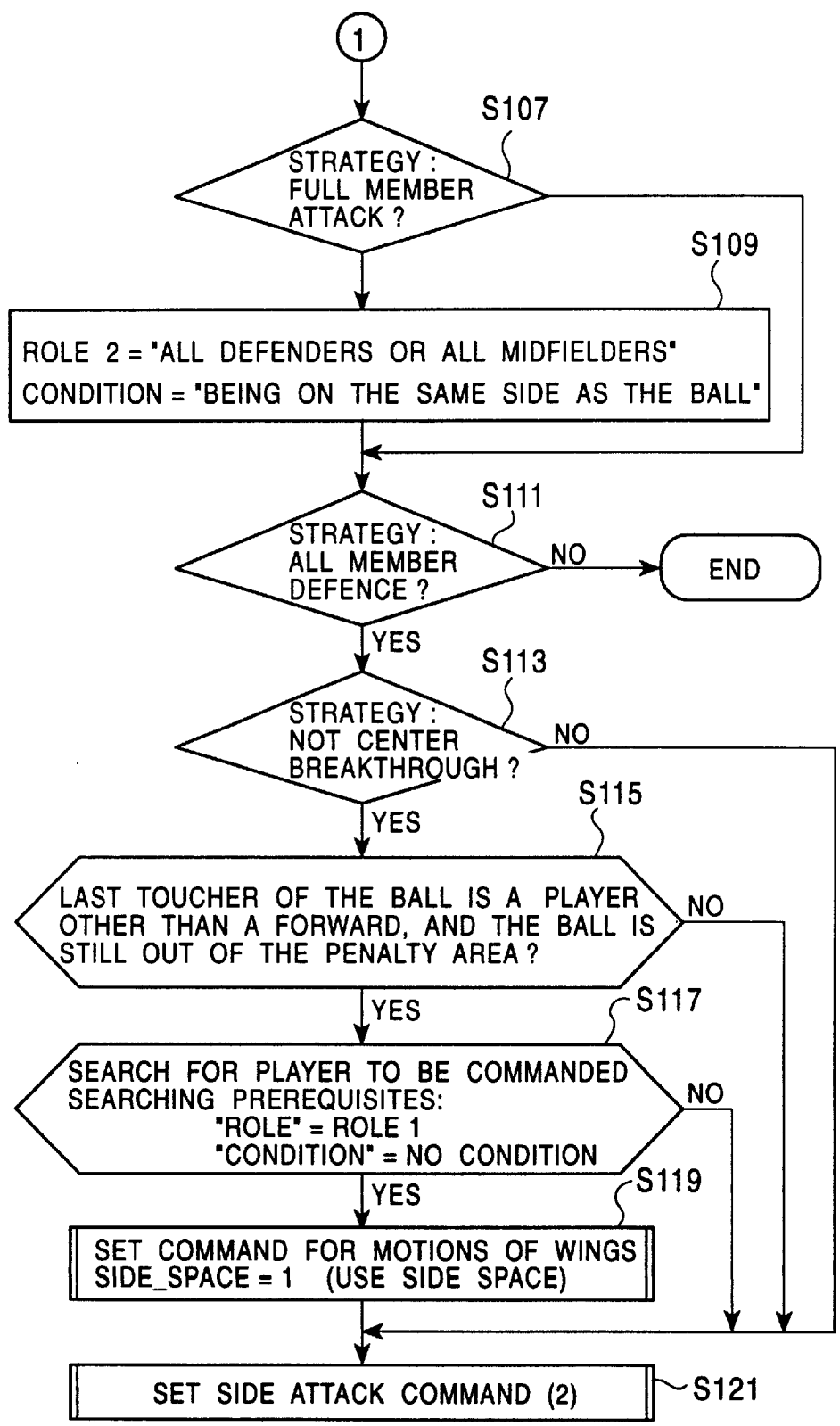
FIG. 13 is a flow chart showing another part of subroutine for setting "side attack command"

FIGS. 12 and 13 are flow charts showing the sub-routine for setting the "SIDE ATTACK" command. The "ROLE 1" as a variable for searching indicates "ROLE " 1 which identifies the role of the player character on which the command is to be set, while "ROLE 2" as another variable indicates "ROLE " 2 indicative of the role of the player on which the command is to be set. These roles are selectively used as the prerequisite for the searching. The "CONDITION" indicates the condition under which the command is to be set. The "SIDE_SPACE" shows a flag indicative of whether or not the side space is used.

Referring to FIG. 12, for the purpose of setting the "SIDE ATTACK" command, Step S101 is executed in which ROLE 1 is set in a random manner to "ROLE 1="WING" or "WING OR FORWARD"", while ROLE 2is set to "ROLE 2="OFFENSIVE HALF"". The CONDITION is set as "CONDITION="PARTICIPATE IN ATTACK" and "BEING ON THE SAME SIDE AS THE BALL". Then, whether the strategy is the "SIDE BREAKTHROUGH" is determined in Step S103. If the strategy is "SIDE BREAKTHROUGH", Step S105 is executed in which the ROLE 1 is set as "ROLE 1="FORWARD" (RANDOM)", while the ROLE 2 is set as "ROLE 2="ALL DEFENDERS OR ALL MIDFIELDERS"". At the same time, the CONDITION is set to be "CONDITION="BEING ON THE SAME SIDE AS THE BALL"". If the strategy is not the "SIDE BREAKTHROUGH", the process proceeds to Step S107, skipping Step S105.

Step S107 determines whether or not the strategy is "FULL MEMBER ATTACK". If so, the process advances to Step S109 in which an operation is executed to set "ROLE 2="ALL DEFENDERS OR ALL MIDFIELDERS" and "CONDITION=BEING ON THE SAME SIDE AS THE BALL".

Step S111 determines whether or not the strategy is "ALL MEMBER DEFENCE". If the strategy is not the "FULL MEMBER DEFENCE", a determination is conducted in Step S115 as to whether the last toucher of the ball is a player other than a forward and the ball is still out of the penalty area, on condition that the strategy is not "CENTER BREAKTHROUGH"(Step S113). If the answer to the question in Step S115 is YES, Step S117 is executed which sets only a "ROLE=ROLE 1", as the sole pre-requisite for the searching of the player on which the command is to be set. If there is any player character which meets such a pre-requisite, the process proceeds to Step S119 in which "SIDE_SPACE=1" is set as the command for motions of wings (Step S119). If there is no player character which meets the above-mentioned pre-requisite, the process advances to Step S121 skipping over Step S119. In accordance with the command for "MOTIONS OF WINGS", positions of the wings are set starting from the alliance area and the positions set by the formation, and are determined rather close to the touch line.

The "SIDE ATTACK COMMAND SET 2" is then executed.

Figure 14:
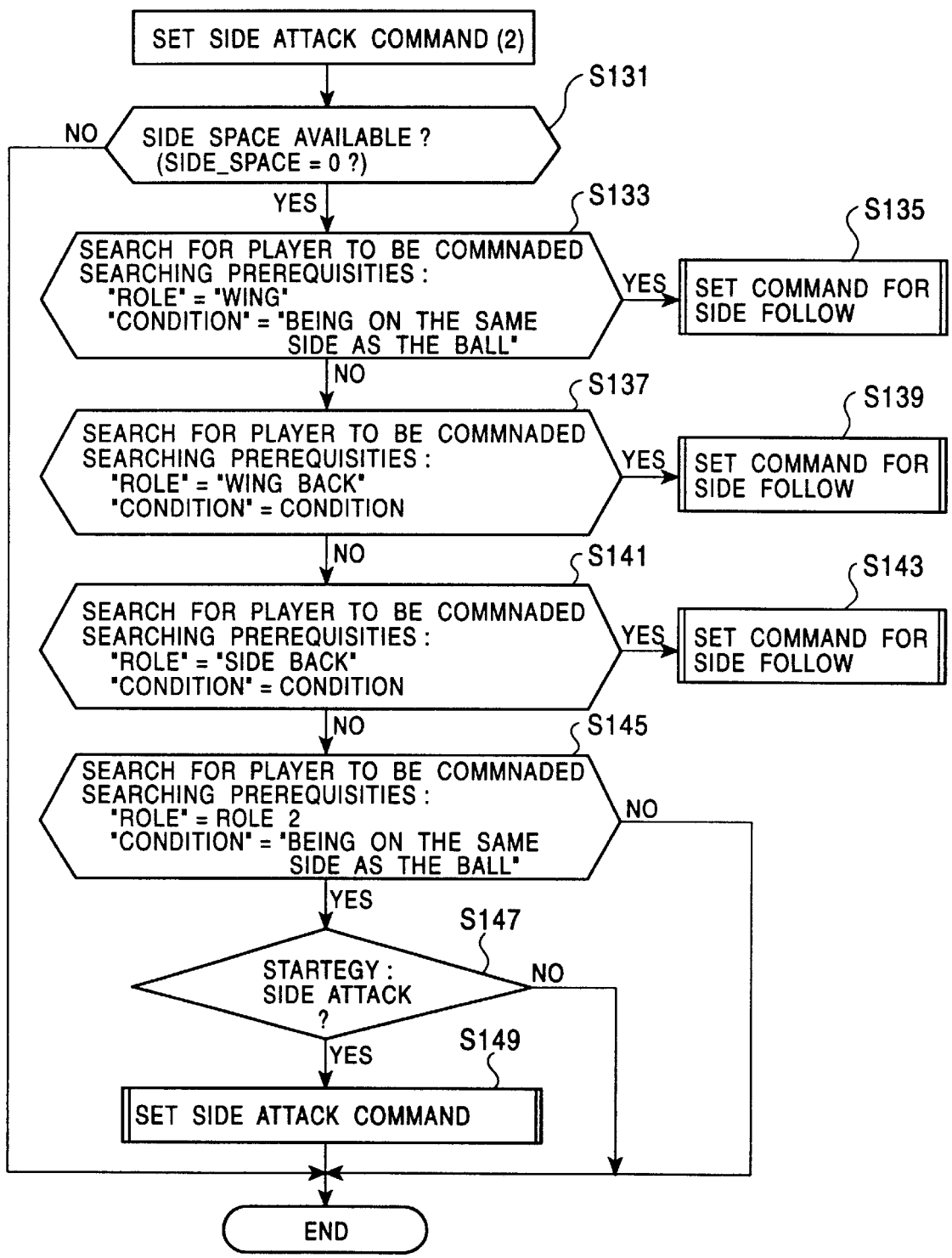
FIG. 14 is a flow chart showing still another part of subroutine "set side attack command 2"

FIG. 14 is a flow chart illustrative of the sub-routine of the "SIDE ATTACK COMMAND SET 2". First of all, in Step S131, a determination is conducted as to whether any side space exists, i.e., whether the condition SIDE_SPACE=0 is met. If there is any side space, the process proceeds to Step S133 which searches for a player on which the command is to be set, in which "ROLE=WING" and "CONDITION=BEING ON THE SAME SIDE AS THE BALL" are set as the searching pre-requisites. If there is any player character which meets such re-pre-requisites, the process proceeds to Step S135 in which "SET COMMAND FOR SIDE FOLLOW" is executed. In the event that there is no player character which would meet the pre-requisites, the process advances from Step S133 to S137 skipping over the Step S135. In Step S137, "ROLE=WING BACK" and "CONDITION=CONDITION" are set as the pre-requisites. If there is any player character which meet these pre-requisites, the process advances to Step S143 which executes the SIDE FOLLOW COMMAND SET", whereas, if there is no player character which would meet such pre-requisites, the process advances to Step S145 which sets, as the searching pre-requisites, "ROLE=ROLE 2" and "CONDITION=BEING ON THE SAME SIDE AS THE BALL". If there is any player character which meets such pre-requisites, the process advances to Step S147 which determines whether or not the strategy is "SIDE ATTACK". If the strategy is "SIDE ATTACK", Step S149 is executed to set a SIDE ATTACK COMMAND. The SIDE ATTACK COMMAND is executed in such a manner that the player character, when it is behind the ball, runs outside the player character who keeps the ball, whereas, when on the front side of the ball, the player character runs forward along the touch line.

Figure 15:
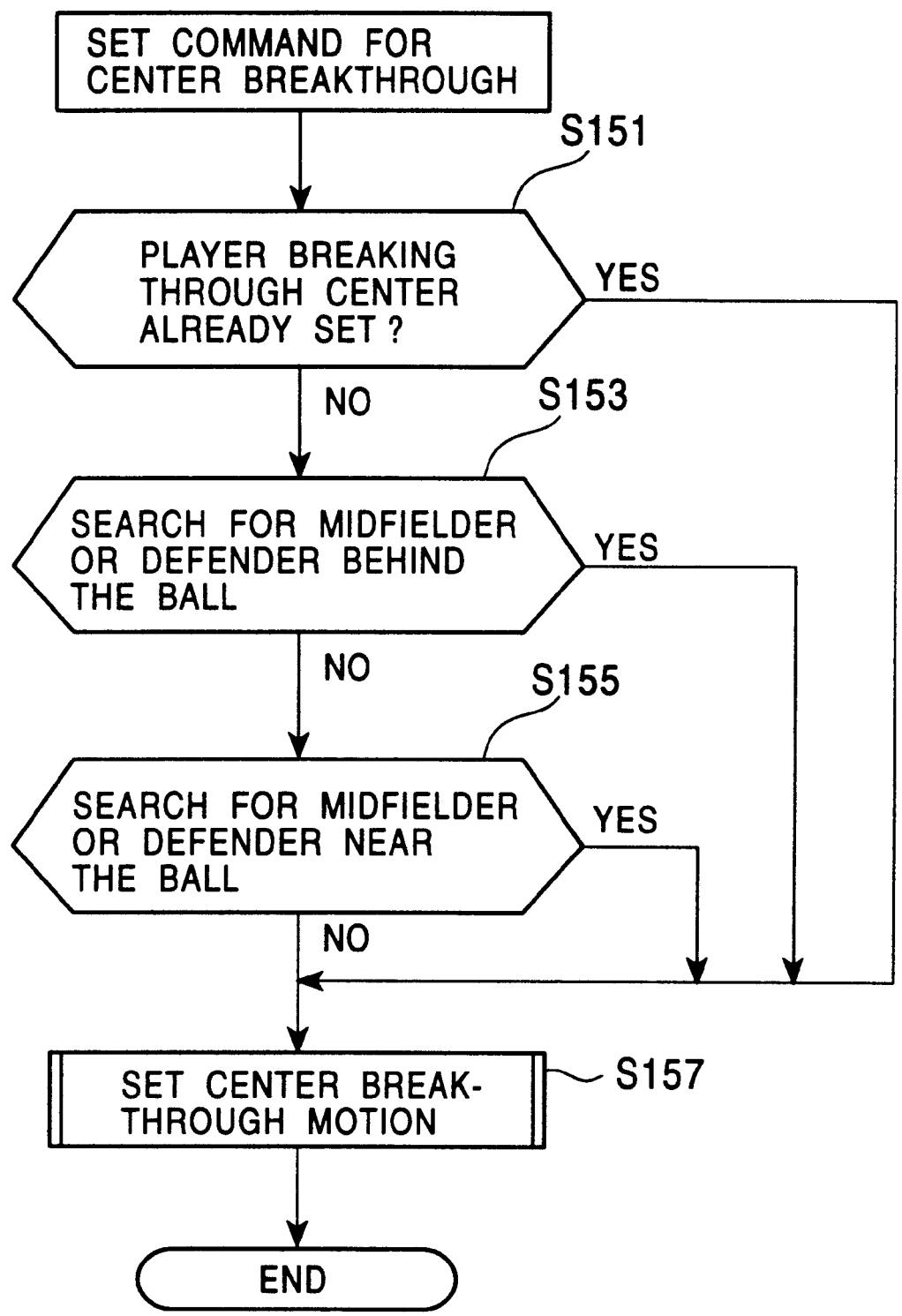
FIG. 15 is a flow chart showing a sub routine for setting a "center breakthrough command"

FIG. 15 is a flow chart illustrative of the "CENTER BREAKTHROUGH COMMAND SET" sub-routine. Referring to this Figure, Step S151 determines whether a player character who is bound to breakthrough the center has been set already. If no such a player character has been set, Step S153 is executed to search for a player character from among the midfielders or defenders who are behind the ball. If there is no such midfielder or defender, the process advances to Step S155 which searches for a midfielder or a defender near the ball. If no such midfielder nor defender is found, the process advances to Step S157. If an answer YES is given in Steps S151, S153 or S155, the process advances to Step S157 which executes "CENTER BREAKTHROUGH MOTION SET". The "CENTER BREAKTHROUGH MOTION" is set at a position which is determined in relation to the defence line of the enemy team in the direction towards the goal and, in the left and right directions, at a random position. More specifically, when the ball is in front of the enemy's goal, the "CENTER BREAKTHROUGH MOTION" is set at a random position in the penalty area, otherwise the motion position is set such as to breakthrough the defence line of the enemy team.

Figure 16:
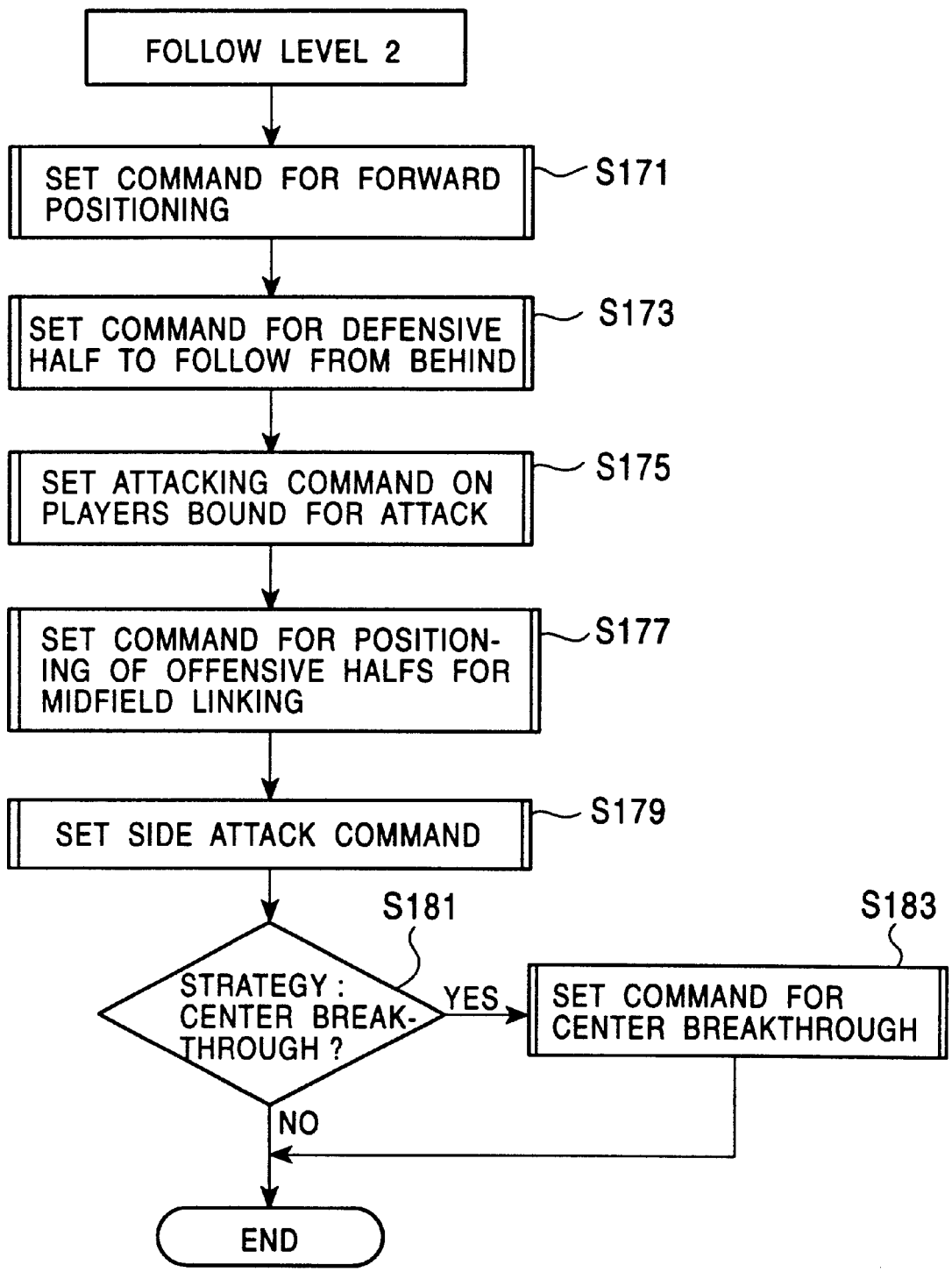
FIG. 16 is a flow chart showing a subroutine of the "follow level 2" shown in the flow chart of FIG. 9.

FIG. 16 is a flowchart illustrative of the sub-routine for the "FOLLOW LEVEL 2" shown in FIG. 9.

Step S171 executes "FORWARD POSITIONING COMMAND SET", followed by Step S173 which sets a "COMMAND FOR DEFENSIVE HALFS TO FOLLOW FROM BEHIND". In response to this command, the positions of the defensive halfs are set at basic defensive half positions and then moved progressively to approach the goal in accordance with the position of the ball.

Then, setting of "ATTACKING COMMAND ON PLAYERS BOUND FOR ATTACK" is executed in Step S175. In response to this command, the positions of the player characters bound for the attacking are set in relation to the deference line of the enemy team in the direction towards the goal and, in the left and right directions, the positions of these player characters are set in a random manner. More specifically, if the ball is in front of the enemy's goal, the positions are set in a random manner within the penalty area, otherwise, the player characters are set to positions which are somewhat retracted from the frontier.

Referring back to FIG. 16, "COMMAND FOR POSITIONING OF OFFENSIVE HALFS FOR MIDFIELD LINKING" is set in Step S177, followed by setting of "SIDE ATTACK COMMAND" executed in Step S179.

Then, Step S181 is executed to determine whether or not the strategy is "CENTER BREAKTHROUGH". If so, "CENTER BREAKTHROUGH COMMAND SET" shown in FIG. 15 is executed in Step S183.

Figure 17:
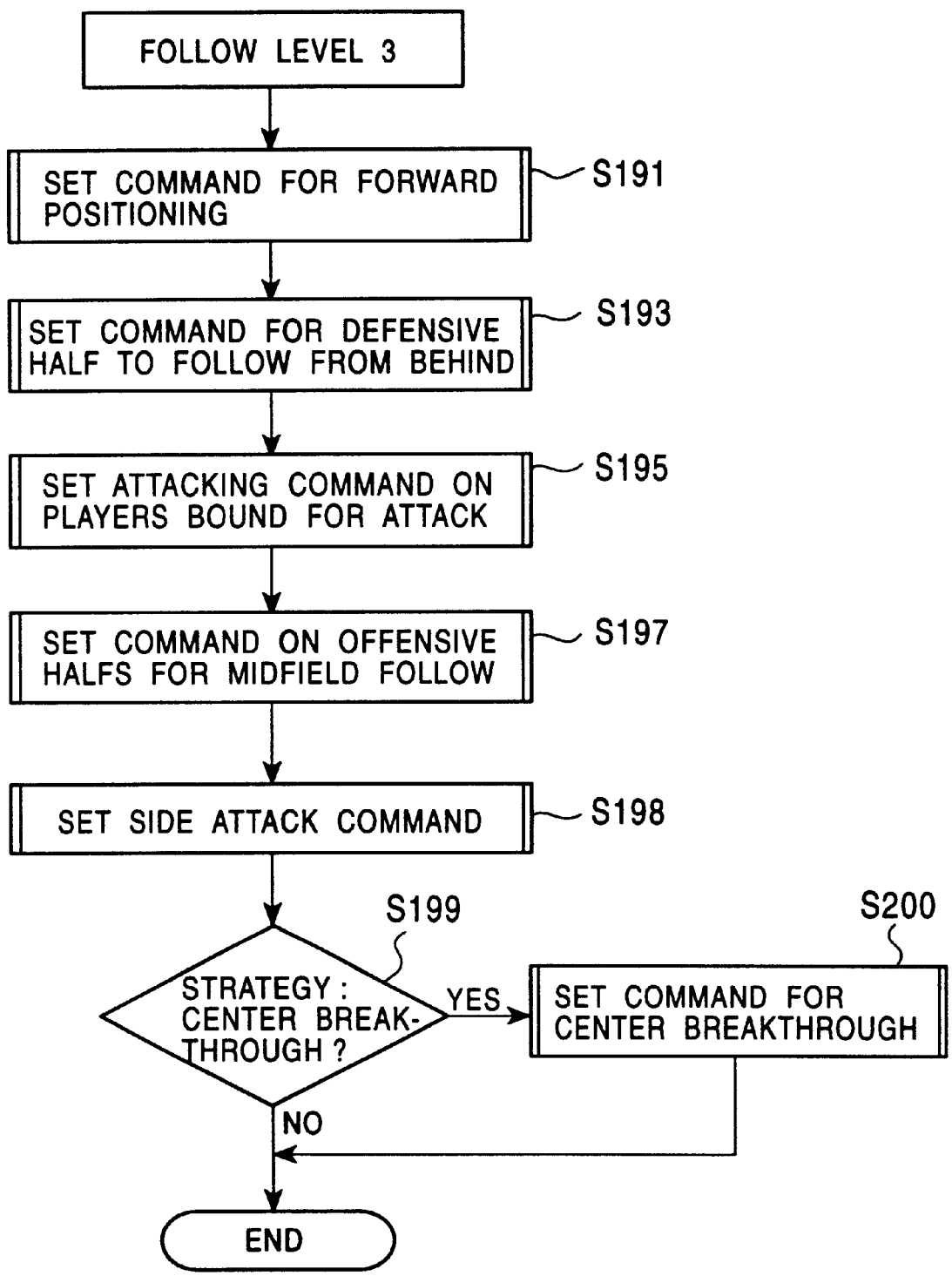
FIG. 17 is a flow chart showing a subroutine of the "follow level 3" shown in the flow chart of FIG. 9.

FIG. 17 is a flowchart showing the sub-routine for the "FOLLOW LEVEL 3" shown in FIG. 9.

First of all, "COMMAND FOR FORWARD POSITIONING" is set in Step S191 and, thereafter, "COMMAND FOR DEFENSIVE HALFS TO FOLLOW FROM BEHIND" is set in Step S193. Further, "ATTACKING COMMAND ON PLAYERS BOUND FOR ATTACK" is set in Step S195. Subsequently, Step S197 is executed which sets "COMMAND ON OFFENSIVE HALFS FOR MIDFIELD FOLLOW". In response to the setting of this command, positions of the offensive halfs are set in relation to the position of the ball, i.e., the position of the defence line of the enemy team. Then, the positions are set in the left and right directions in accordance with the ball position.

Then, setting of the "SIDE ATTACK COMMAND" shown in FIG. 12 is executed in Step S198. Subsequently, whether the strategy is "CENTER BREAKTHROUGH" or not is determined in Step S199. If the strategy is "CENTER BREAKTHROUGH", Step S200 is executed to set a "CENTER BREAKTHROUGH COMMAND".

A description will now be given of a "replay" operation. FIGS. 18 to 21 show a player character immediately after a shoot, as viewed from different camera angles.

In the video game of this embodiment, successive images appearing on the display screen during the playing are recorded and held for a predetermined time, and can be reproduced in response to pressing of the start button 8c by the game player, so as to enable a "replay" as required. The demand for reproduction of the display image is particularly high when a shoot has been made successfully to score. Therefore, a replay operation is automatically conducted once so as to play back the display image covering a predetermined period of time starting from a moment which is prior to hitting of the goal by the shot ball, whenever a shoot has been successfully made to score.

Figure 18:
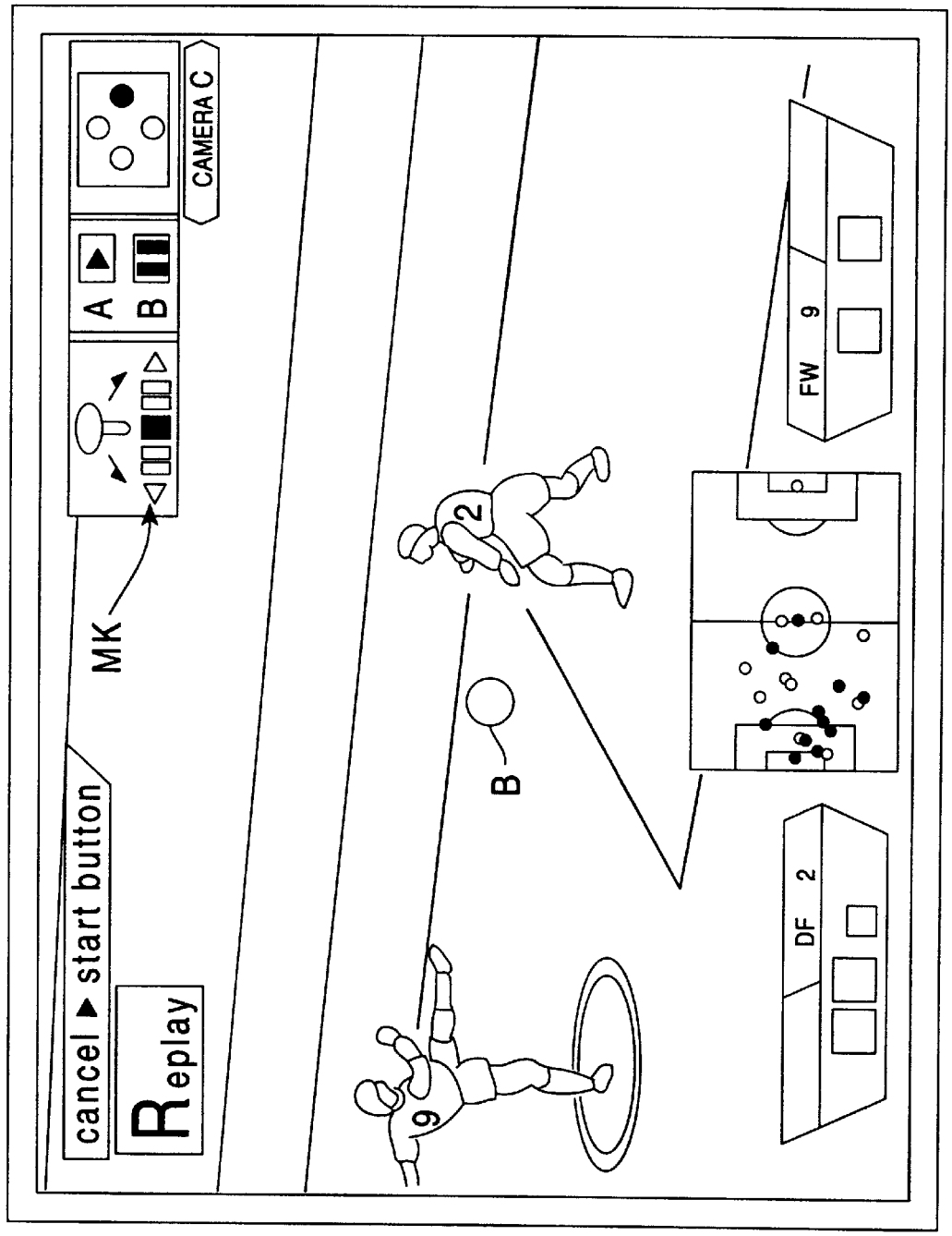
FIG. 18 is an illustration of the content displayed on the screen in a "replay" mode, showing the players as viewed at a certain camera angle at a timing immediately after a shoot.

Referring to FIG. 18, a sign reading "Replay" is displayed on the left upper corner of the display area, indicating that the game is now in the replay mode, together with a guiding message indicating that the game player can get back to the normal game operation by pressing the start button 8c. A map MP of the whole soccer play field is shown at a lower part of the display area so that the game player can confirm, at a glance, the positions of other player characters at the moment of the shooting.

Simulation images of the stick-type controller 8e, "A" button 8a, "B" button 8b and "C" buttons 8h, hi, 8j and 8k are displayed on right upper part of the display area of the screen. The "A" button is used for giving replay instructions, while "B" button is used for giving instructions for pause. A mark MK indicative of the time axis is shown immediately below the image of the stick-type controller 8e. The portion of the mark MK, which is right below the stick of the image of the stick-type controller 8e, represents a neutral position. The portion of the mark MK on the right side of the neutral position indicates the "normal replay", while the portion on the left side indicates "reverse replay". The arrangement is such that the display is replayed over a predetermined time either in the normal replay mode or reverse replay mode at replay speeds which depend on the direction and angle of the tilt of the stick, so that the game player can enjoy the scenery of the shooting at any desired speed of the replay.

Figure 19:
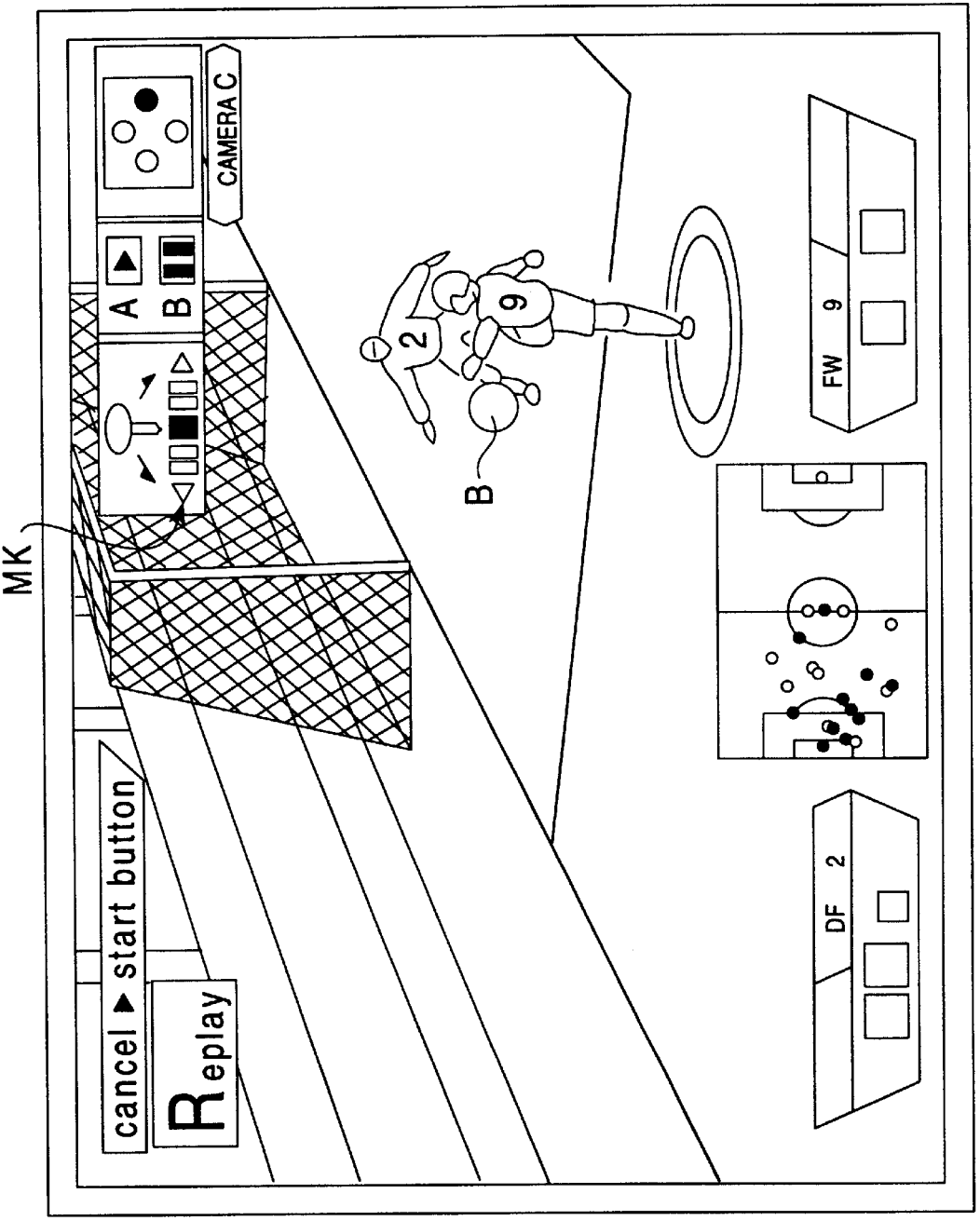
FIG. 19 is an illustration of the content displayed on the screen in a "replay" mode, showing the players as viewed at another camera angle at a timing immediately after a shoot.
Figure 20:
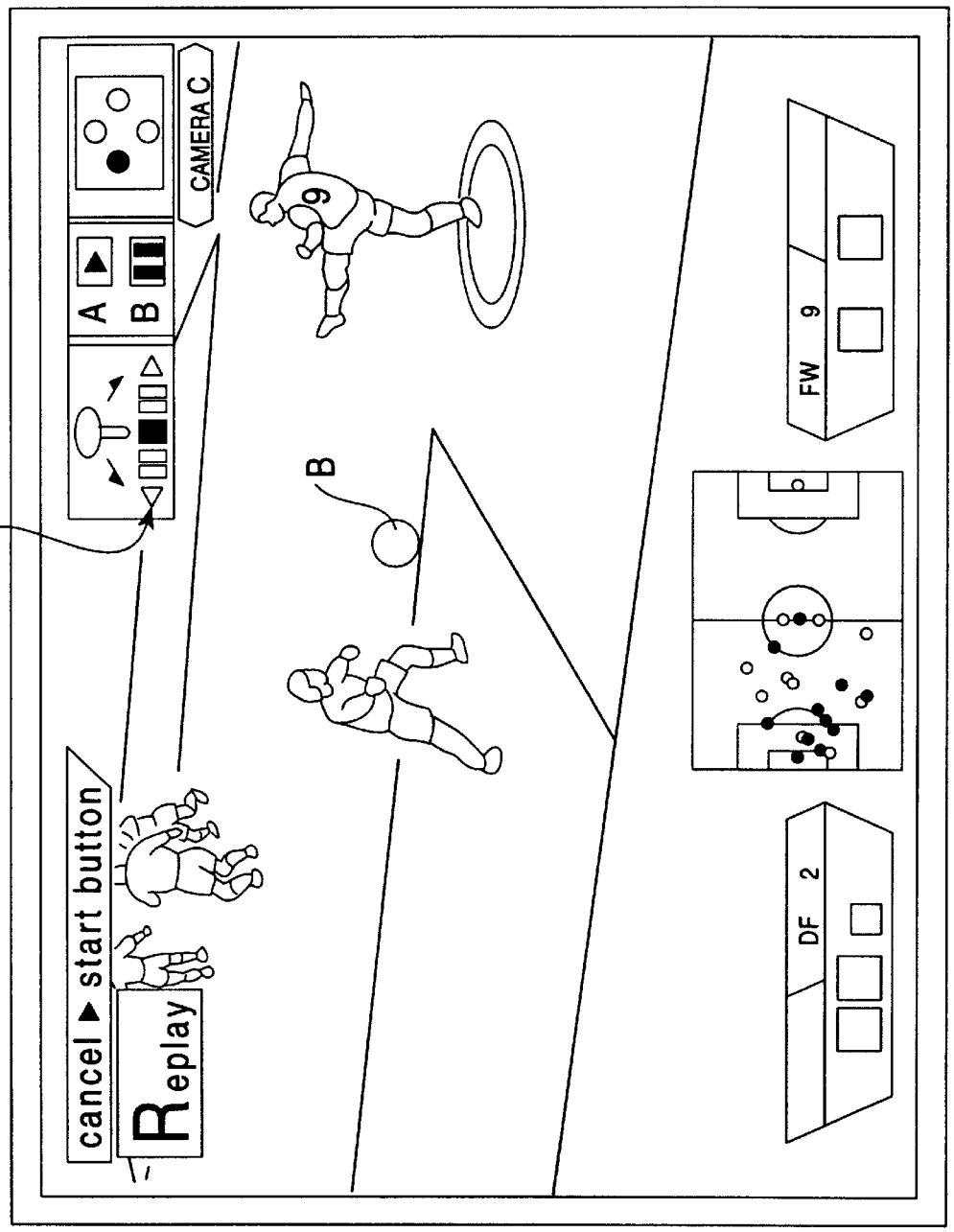
FIG. 20 is an illustration of the content displayed on the screen in a "replay" mode, showing the players as viewed at still another camera angle at a timing immediately after a shoot.
Figure 21:
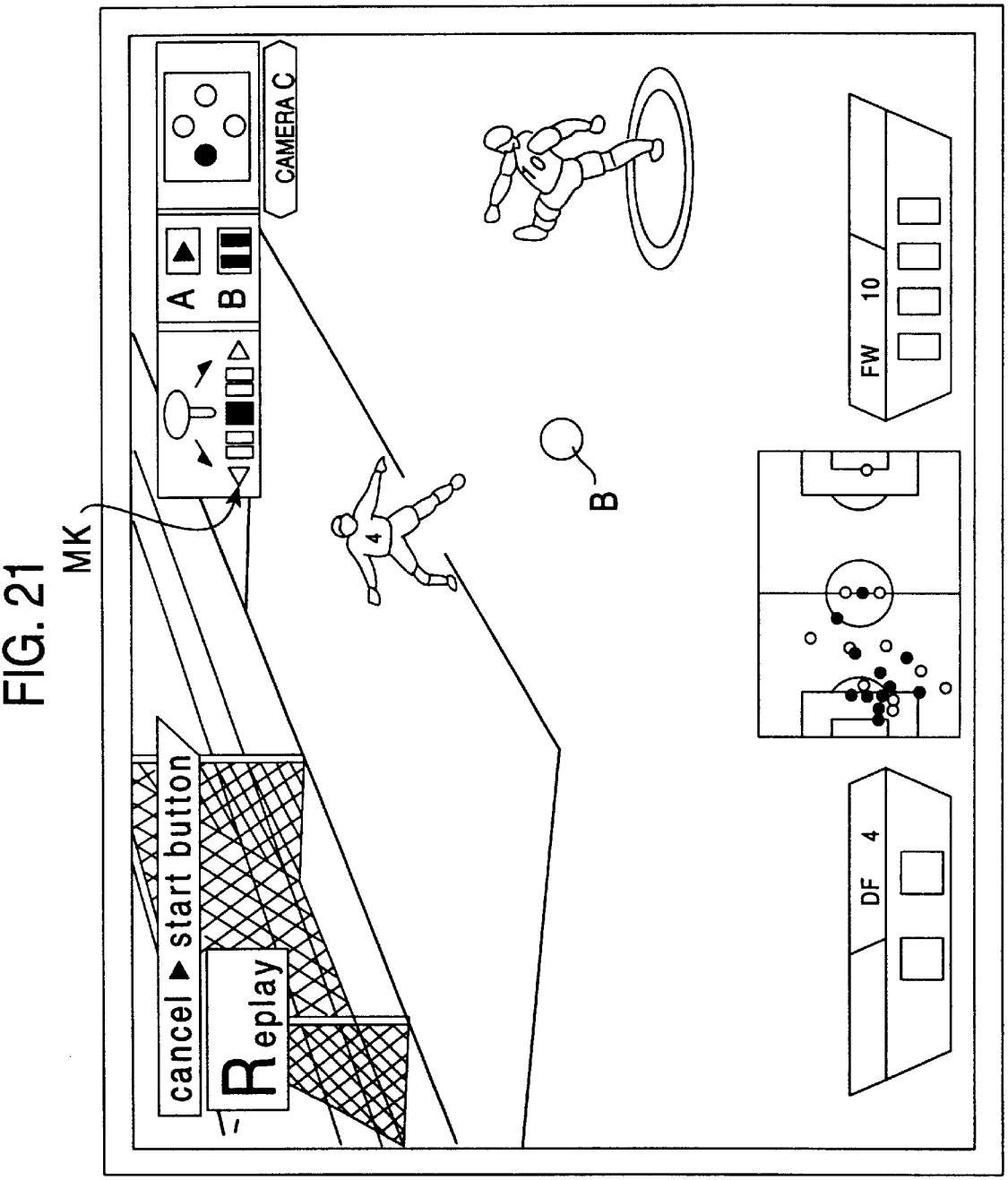
FIG. 21 is an illustration of the content displayed on the screen in a "replay" mode, showing the players as viewed at a different camera angle at a timing immediately after a shoot.

Once the display mode has been changed to "pause" as a result of pressing of the "B" button 8b, the game player can adjust the angles and the size of the image replayed on the screen, by zooming in and out and turning the camera to provide different viewing positions, through operation of the "C" buttons (8h, 8i, 8j and 8k). More specifically, zooming control can be performed through operation of the C1 and C2 buttons 8h and 8i, while the C3 and C4 buttons permit camera height adjustment. Thus, the game player can review the dynamic image stored in the RAM 3 and covering a predetermined period of time, as viewed from different viewing positions, i.e., at different camera angles and image sizes, as in the case of ordinary images displayed during the playing. To this end, the signal processor 4 operates in accordance with the instructions given by the CPU 1 so as to perform the image computation based on the newly selected viewing position and to enable such an image as viewed from the new viewing position to be displayed. More specifically, FIG. 19 shows a replayed scenery as viewed from a position turned 90 clockwise from the viewing position corresponding to the image shown in FIG. 18. A further 90 clockwise turning from the viewing position of the image shown in FIG. 19 provides a replay image as shown in FIG. 20. FIG. 21 illustrates an image which is being replayed, as viewed at a different camera angle from that of the image shown in FIG. 18.

Figure 22:
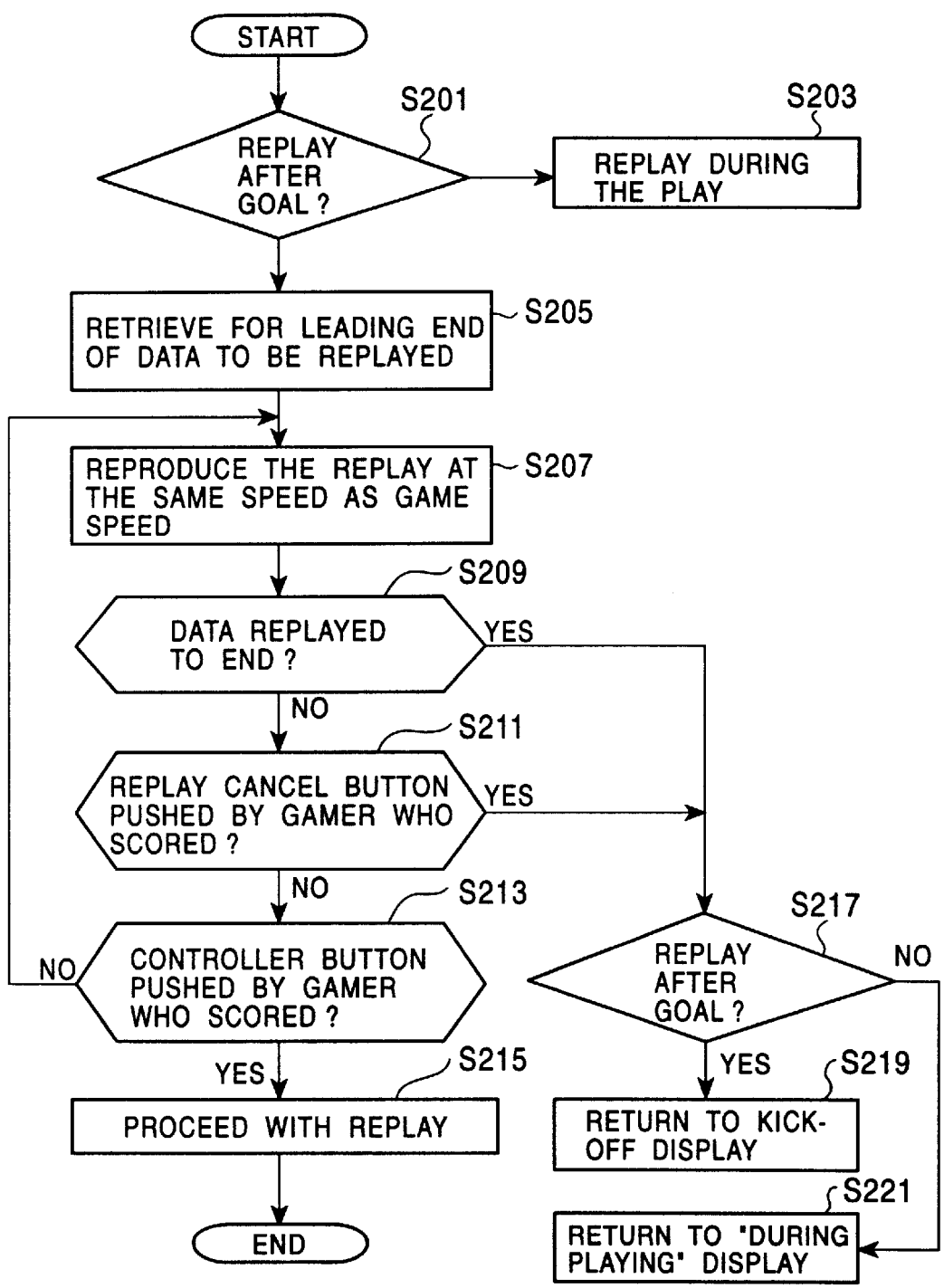
FIG. 22 is a flow chart illustrative of the "replay" operation.
Figure 23:
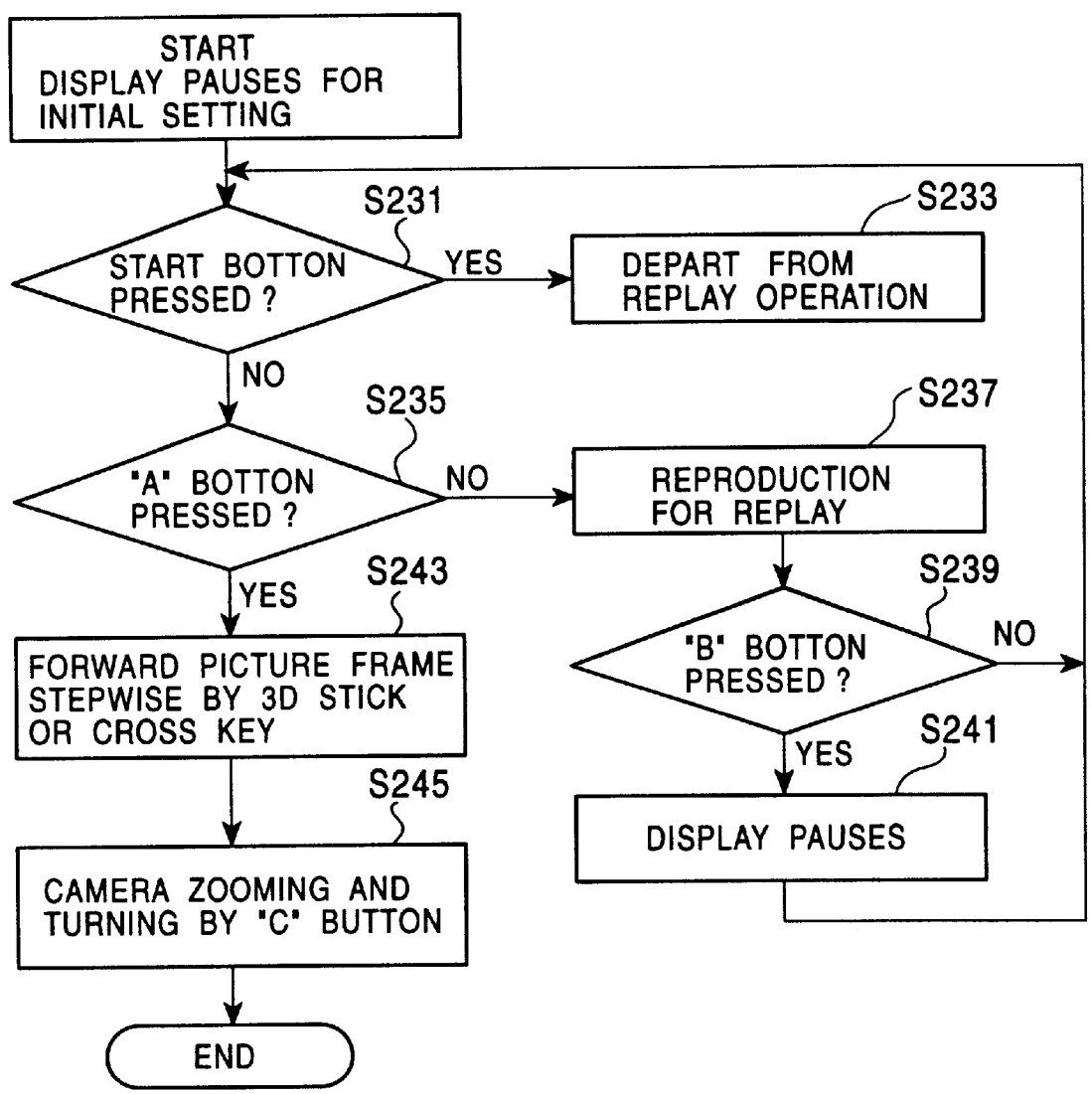
FIG. 23 is a flowchart showing the subroutine of "operation for replay" which is conducted in Step S215 of the flowchart shown in FIG. 22.
Figure 24:
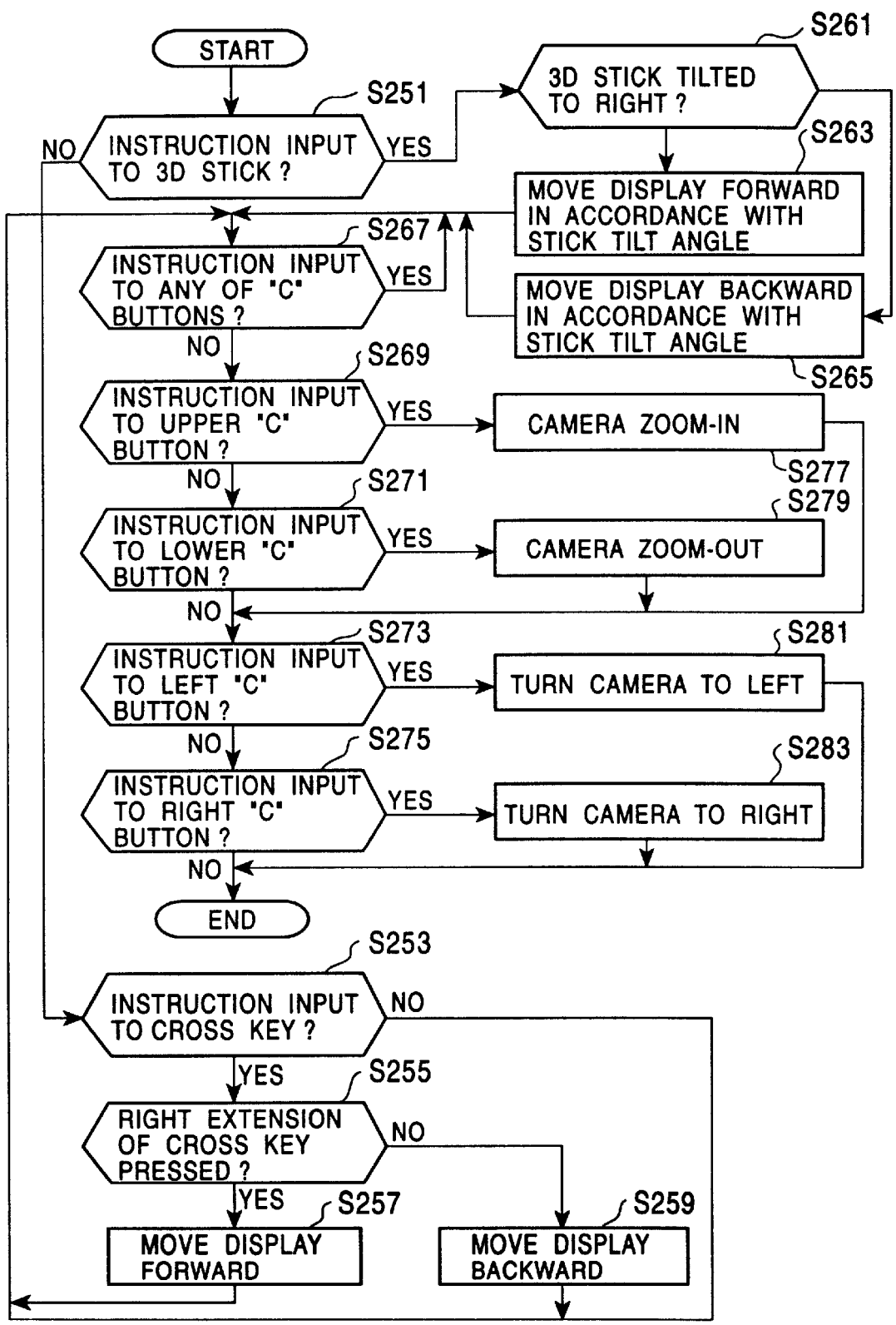
FIG. 24 is a flowchart of a subroutine of "frame forwarding by 3D stick or cross key" executed in Step S243 of the flowchart shown in FIG. 23.

FIGS. 22 to 24 are flow charts illustrative of the "replay" operation.

Referring to FIG. 22, the flow for the "replay" operation is started manually by the game player through pressing of the start button 8c or automatically in response to a replay command which is generated when a shoot has been made successfully to score. First of all, whether the replay to be executed is an automatic replay triggering by a successful shooting is determined in Step S201. If the replay is not the one which is automatically triggered by a successful shoot, i.e., when the replay is executed arbitrarily in the course of the soccer play in response to manual input of replay instructions by the game player, a "REPLAY DURING PLAYING" processing is executed in Step S203.

Conversely, if the replay command has been given automatically in response to a successful shoot, Step S205 executes "RETRIEVE FOR LEADING END OF DATA TO BE REPLAYED". More specifically, the CPU 1 always stores the kinematic image data covering a predetermined period of time during proceeding of the soccer play going back from the instant moment. The CPU 1 performs retrieval of the stored image data to find the leading end of the stored image data, going back the predetermined period of time. Then, a replay is performed in Step S207 to reproduce the kinematic image at the same speed as that of the game, starting from the searched out leading end of the image data. In Step S209, a determination is conducted as to whether the shoot scene has been replayed in the form of kinematic images down to the last of the replayed image data. An answer NO given to the question posed in Step s209 means that the replaying operation is still in its course. In such a case, the process proceeds to Step S211 which determines whether a replay cancel button, i.e., the button 8c, has been pressed. This determination is conducted only for the game player who scored. If the replay cancel button has not been pressed by the game player who scored, the process proceeds to Step S213 which determines whether or not a button, e.g., "B" button, has been pressed. This determination also is conducted only on the game player who scored. If the button has not been pressed, the process returns to Step S207 so that the replay is continued until the remaining replay time lapses. However, if the determination in Step S213 has proved that the button has been pressed, the process advances to Step S215 which sets a command "PROCEED WITH REPLAY" so that the game player who scored is awarded a replay.

When an answer YES is given in Step S209 or Step S521, the process advances to Step S217 which determines whether the replay is the one which is automatically triggered by a successful shoot. If the replay is the one automatically triggered by a successful shoot, the process advances to Step S219 in which the display is returned to the scenery of the kick-off, whereas, if not, the process proceeds to Step S221 which sets the display back to the scenery of the playing of the soccer game.

FIG. 23 is a flow chart illustrative of the sub-routine for the "PROCEED WITH REPLAY" command set in Step S215 of the flow shown in FIG. 22.

The sub-routine shown in FIG. 23 starts in response to a temporary pause of the display which is caused by pressing of the button 8b. Step S231 determines whether or not the start button 8c has been pressed. If the button 8c has been pressed, the operation mode exits from the replay operation (Step S233). Conversely, if the start button 8c has not been pressed, the process proceeds to Step S235 which determines whether or not the "A" button has been pressed. The replay operation is executed if the "A" button 8a has not been pressed. In this case, the process proceeds to Step S239 which determines whether or not the "B" button 8b has been pressed. If the "B" button 8b has not been pressed, the process returns to Step S231, otherwise the replaying display is made to pause in Step S241. The process then returns to Step S231.

If it has been determined in Step S235 that the "A" button 8a has been pressed, the process advances to Step S243 which performs "FORWARDING OF PICTURE FRAME STEPWISE BY STICK-TYPE CONTROLLER 8e (expressed as "3D stick" in the flow chart) OR CROSS KEY 8*d*". Zooming in and out of the camera, as well as turning of the same, is conducted in response to this operation, in Step S245.

FIG. 24 is a flow chart showing the sub-routine for the "FORWARDING OF PICTURE FRAME STEPWISE BY STICK-TYPE CONTROLLER OR CROSS KEY" command given in Step 243 of the flow shown in FIG. 23.

Referring to FIG. 24, Step S251 is executed to confirm whether or not an input has been given to the stick-type controller 8*e*, i.e., whether the stick-type controller 8*e* has been tilted by the game player. If no input has been made to the stick-type controller 8*e*, the process proceeds to Step S253 which determines whether or not an input has been given to the cross key 8*d*, i.e., whether or not the game player has operated the cross key 8*d*. If no input to the cross key 8*d* is confirmed, the process skips to Step S267, whereas, if an input to the cross key 8*d* is confirmed, the process advances to Step S255 which determines whether or not the right extension of the cross key has been pressed. If the answer is YES, the picture frame of the display is forwarded (Step S257), otherwise the display is moved backward (Step S259), followed by execution of Step S267.

If it has been confirmed in Step S251 that the stick-type controller 8*e* has been operated, the process advances to Step S261 which determines whether the stick is tilted to the right, i.e., whether the game player has tilted the stick to the right. If the stick has been tilted to the right, the display is moved forward in accordance with the angle of tilt of the stick (Step S263), whereas, if the stick has been tilted to the left, the display is moved backward in accordance with the angle of tilt of the stick (Step S263).

Then, a determination is made in Step S267 as to whether there is any input to a "C" button, i.e., whether or not one of the "C" button has been pressed. Then, Steps S269, S271, S273 and S275 are executed to determine, respectively, whether there is any input to the upper "C" button (C1 button 8*h*), lower "C" button (C2 button 8*i*), left "C" button (C3 button 8*j*) and right "C" button (C4 button 8*k*). The flow is terminated when none of these buttons has been pressed.

Pressing of the upper "C" button (C1 button 8*h*) causes a zoom-in operation of the camera: namely, the sizes of the displayed objects are enlarged as if these objects are zoomed up by an imaginary television camera (Step S277), whereas pressing of the lower "C" button (C2 button 8*i*) causes a zoom-out operation of the camera: namely, the sizes of the objects on the display are reduced as if the television camera has been retracted (Step S279). Pressing of the left "C" button (C3 button 8*j*) causes the imaginary television camera to turn to the left (Step S281), whereas pressing of the right "C" button (C4 button 8*k*) causes the camera to turn to the right (Step S283).

Figure 25:
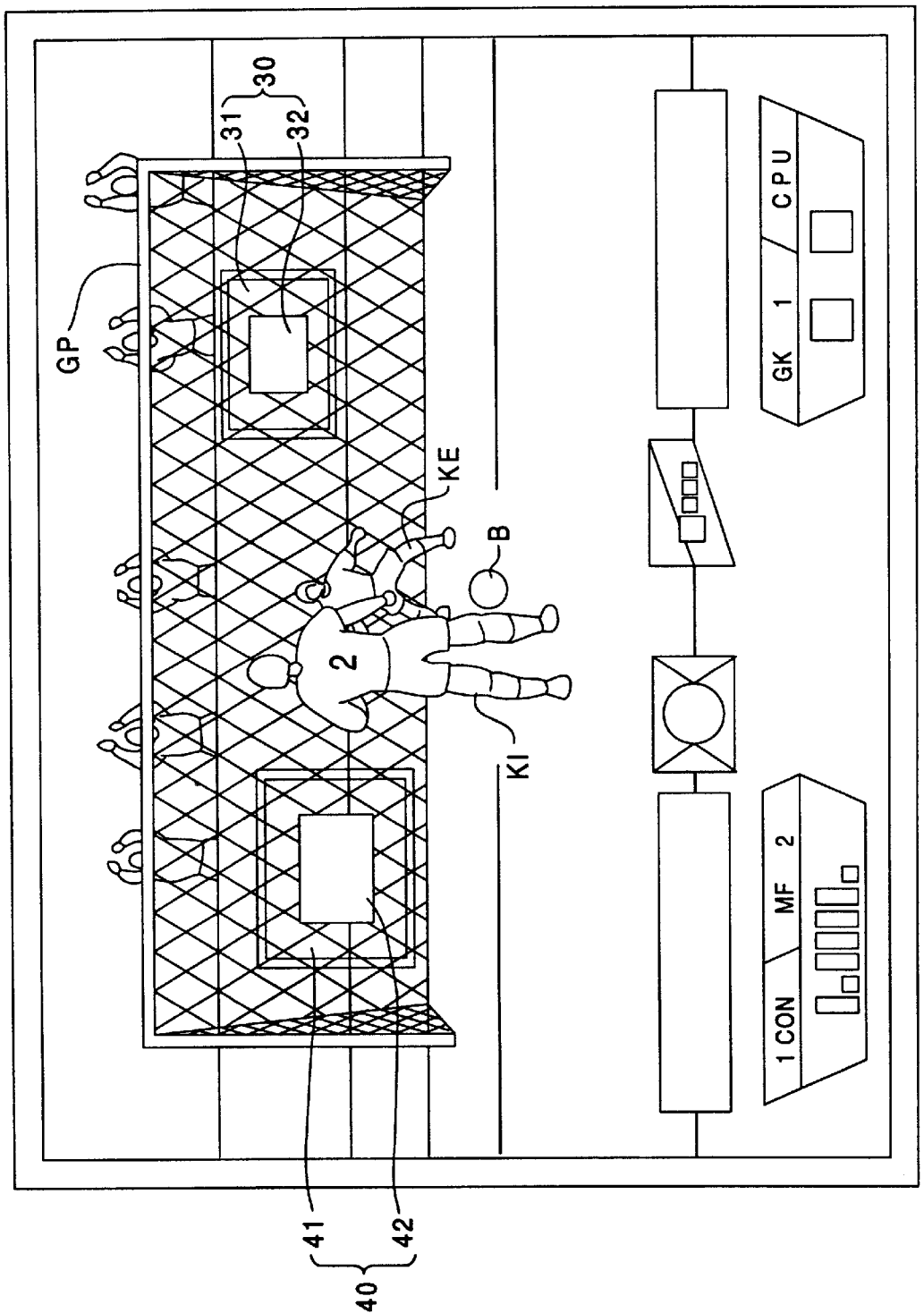
FIG. 25 is an illustration of the content displayed in a "PK match" mode, showing a player who is just going to kick a ball.
Figure 26:
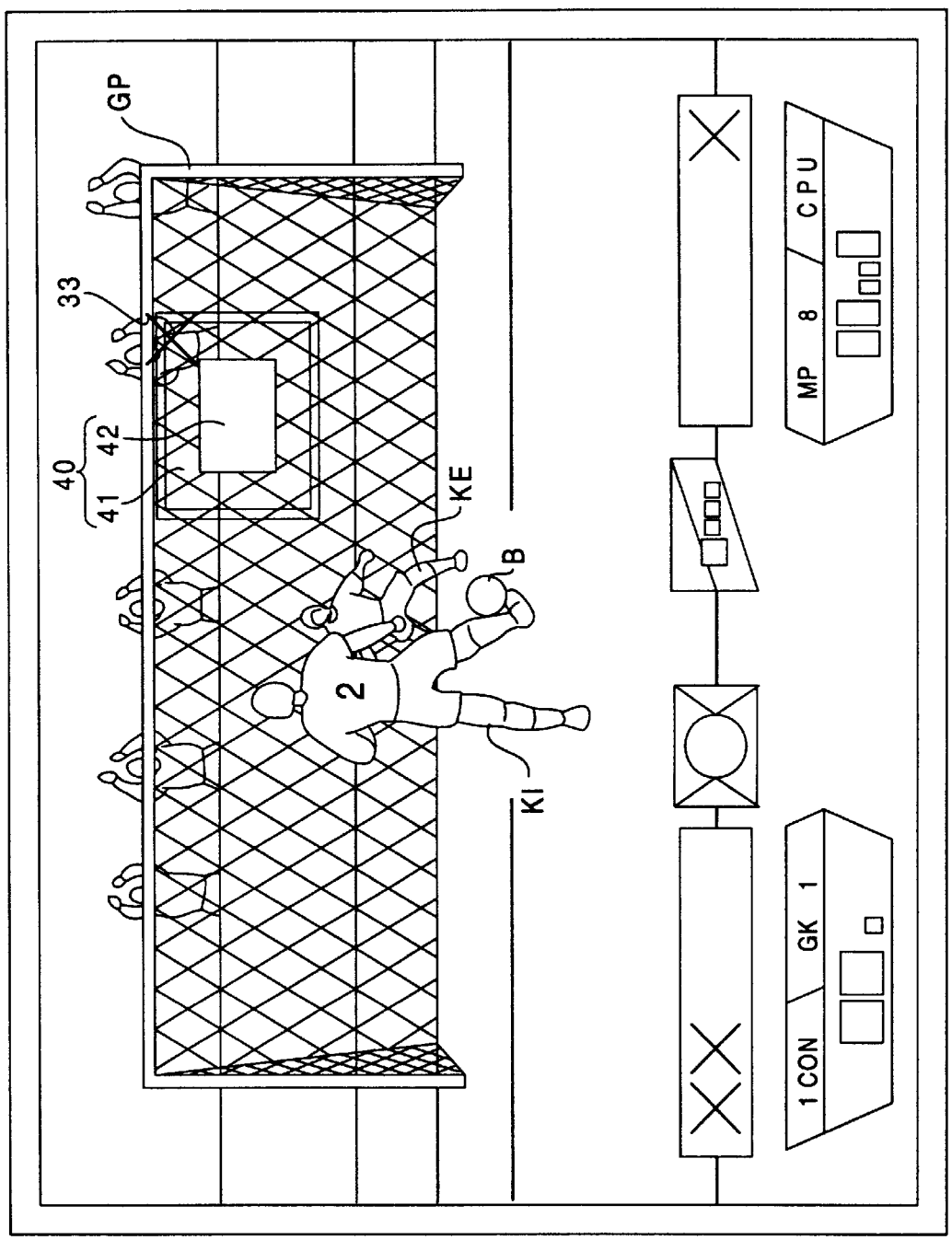
FIG. 26 is an illustration of the content displayed in a "PK match" mode, showing the player at the very moment of kicking.
Figure 27:
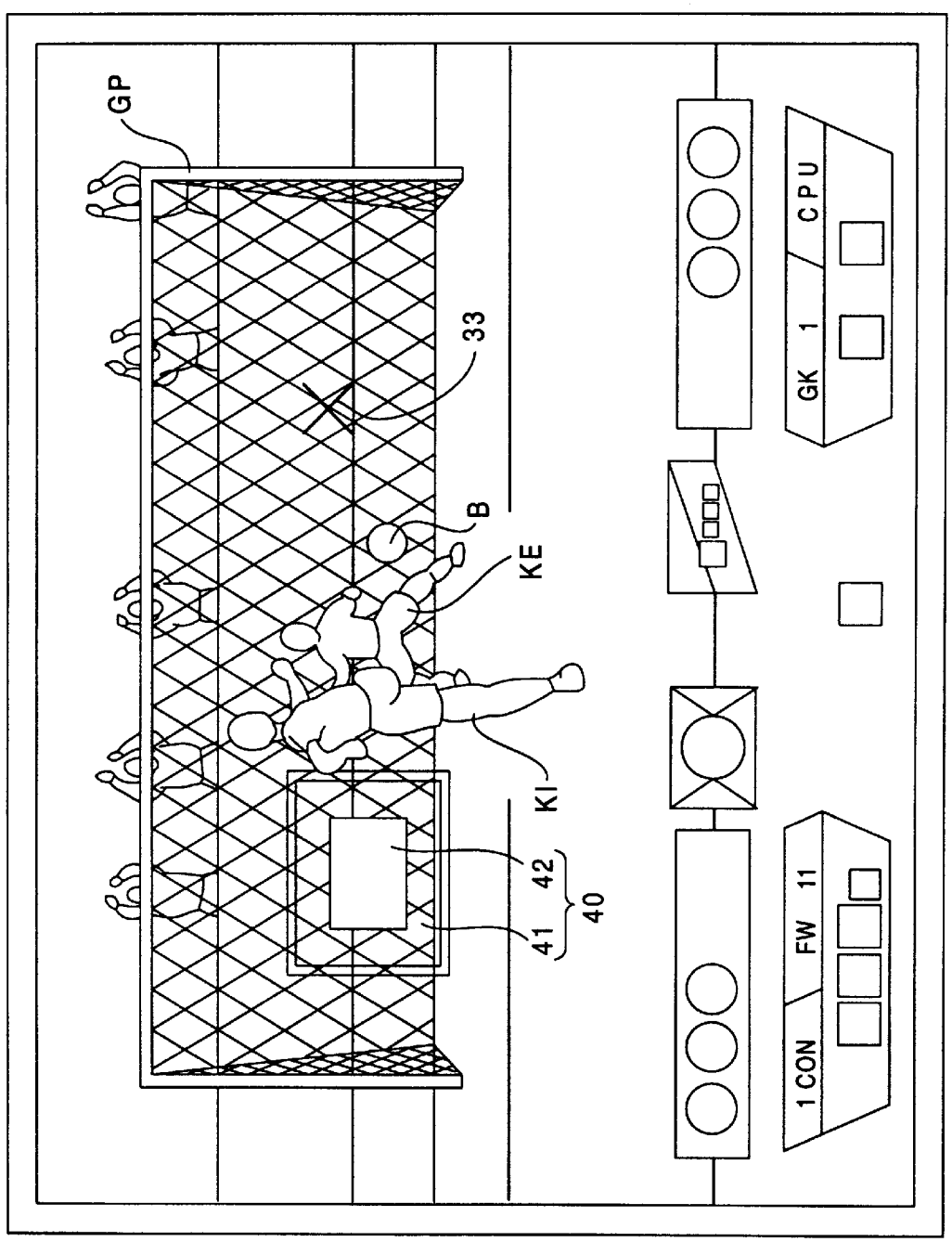
FIG. 27 is an illustration of the content displayed in a "PK match" mode, showing the player who has just kicked a ball.
Figure 28:
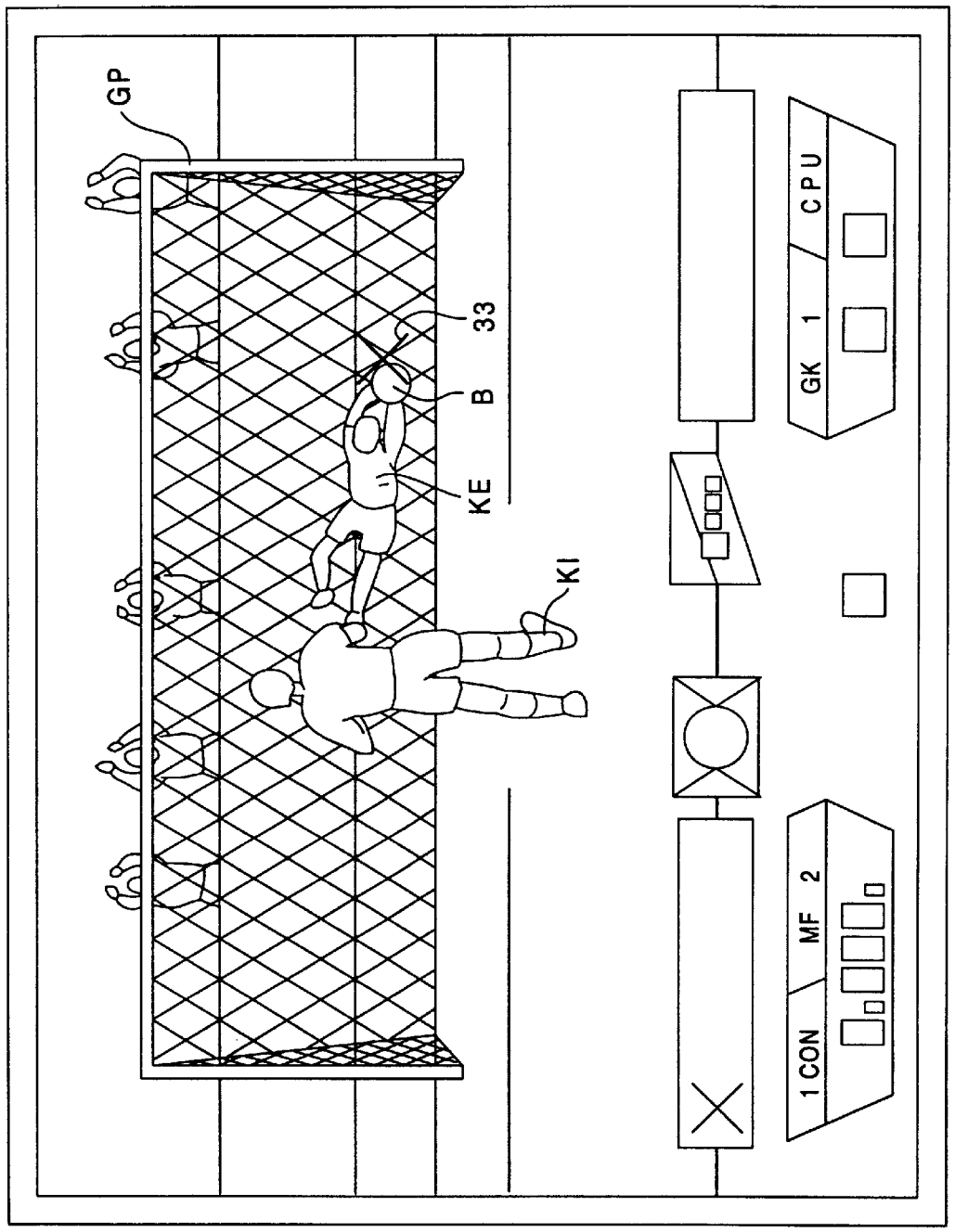
FIG. 28 is an illustration of the content displayed in a "PK match" mode, showing a goalkeeper which has just caught the ball.
Figure 29:
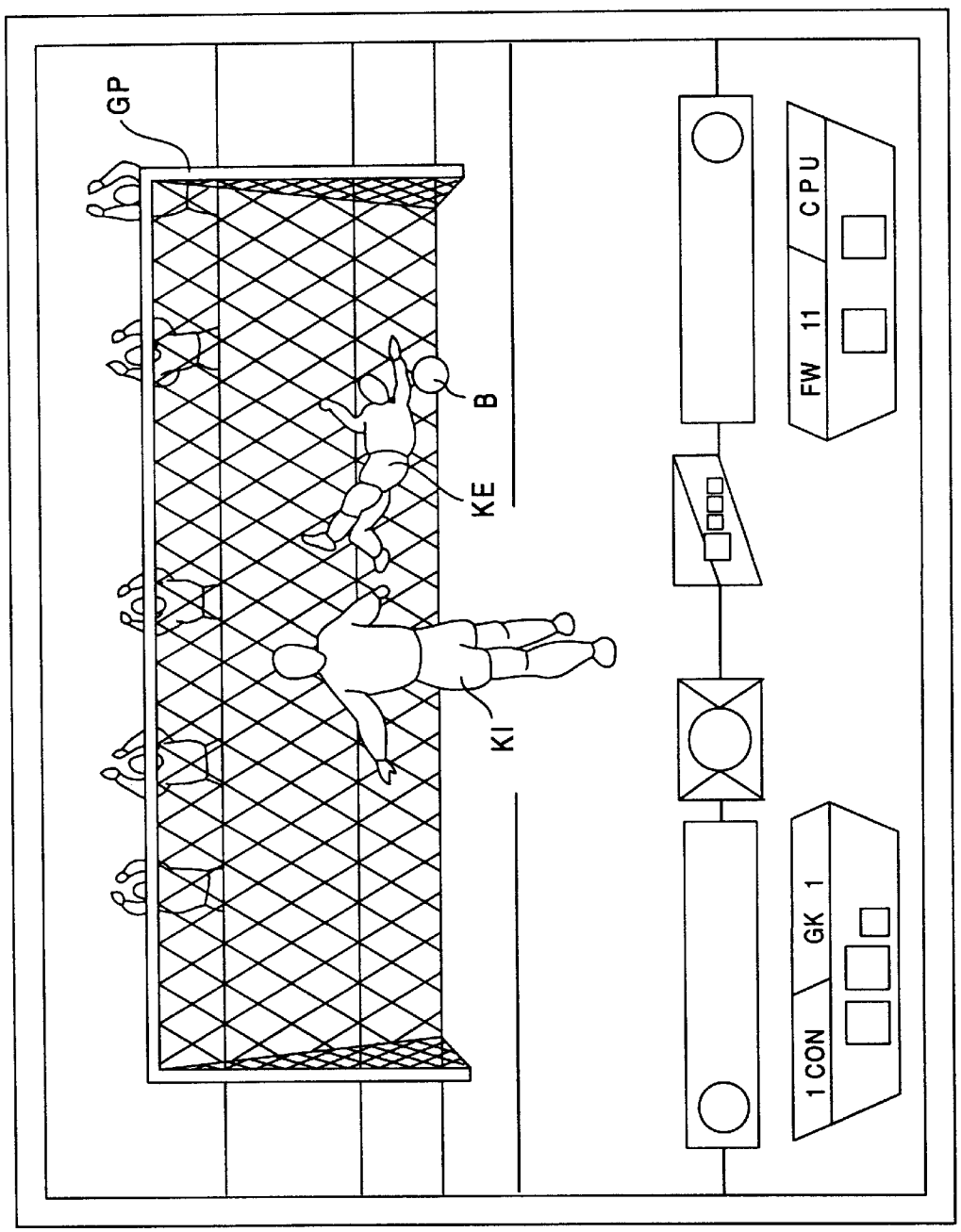
FIG. 29 is an illustration of the content displayed in a "PK match" mode, showing the ball which has reached the goal.

FIGS. 25 to 29 are illustrations of the contents displayed in a "PK MATCH" mode of the soccer game, i.e., a mode in which a penalty kick match is carried out. More specifically, FIG. 25 shows the state of a player character immediately before kicking the ball, FIG. 26 shows the player character just kicking the ball, FIG. 27 shows a state immediately after the kick, FIG. 28 shows a state in which the kicked ball has ben caught by the goalkeeper, and FIG. 29 shows a state in which the kicked ball has hit the goal. The "PK MATCH" mode is selectable on the game mode selection display.

Referring to FIG. 25, a player character as a kicker KI is displayed at a position which is closer to the viewer as viewed on the three-dimensional display. At the same time, the ball "B" to be kicked is displayed at a position which is just in front of a foot of the kicker KI. Goal posts GP with a net is displayed at the background portion of the three-dimensional display. A player character as the goalkeeper KE is displayed in front of the goal post GP. Many spectators are displayed in the stadium stand behind the goal post GP, so as to create a feel of presence.

A kicker cursor 30 and a keeper cursor 40 are displayed so as to be superposed on the goal post GP (position corresponding to the goal line), by a cursor display function of the CPU 1. These cursors are displayed in different colors so as to be easily distinguishable from each other.

The kicker cursor 30 has a square or a somewhat rectangular strong kick guide 31 having a width and a height which are fractions of the width and height of the goal post GP and a weak kick guide 32 having a shape similar to that of the guide 31 and defined in the central region of the kick guide 31. The strong kick guide 31 and the weal kick guide 32 are shown in different colors for easy discrimination. The strong kick guide indicates that the ball B kicked by the kicker tends to go wide of the target shoot area, although the ball is kicked strongly, whereas the weak kick guide indicates that the kicked ball hits the target shoot area without fail, although the risk of catching or punching by the goalkeeper is enhanced due to the kick being weak. The results of the shoot is controlled by a shoot control function of the CPU 1. The game player can set a command for the strong kick or a command for the weak kick, by pressing the "B" button 8*b* or the "A" button 8*a*.

As will be described later, the kicker cursor 30 is movable to the left and right and up and down in accordance with the operation of the stick-type controller 8*e*. As will be seen from FIG. 27, kicker KI kicks the ball B, the kicker cursor 30 is extinguished and, instead, a shoot point guide 33 indicative of the target of the kicked ball is displayed, so that the game player can know in what direction the ball B has been kicked with respect to the kicker cursor 30.

As shown in FIG. 25, the keeper cursor 40 is shaped and sized almost equally to the kicker cursor 30, and includes a punch guide 41 and catch guide 42 which has a shape similar to that of the punch guide 41 and which is disposed in the central region of the punch guide 41. The punch guide 41 and the catch guide 42 are displayed in different colors for easier discrimination from each other. The punch guide 41 indicates an area in which the kicked ball is punched or, if not, likely to be punched out of the goal area by the goalkeeper. The catch guide 42 shows the area in which the kicked ball can be caught by the goalkeeper with a high degree of credibility. The keeper cursor 40 can be moved on the display area to the left and right and up and down by means of the stick-type controller 8*e* as will be described later. In order to enable the keeper KE to catch or punch the ball B, the game player moves the goalkeeper KE towards the position where the shoot point guide 33 is displayed, by means of the stick-type controller 8*e*, and presses the "A" button 8*a* or the "B" button 8*b* so as to give instructions for catching or punching.

In the single-player game mode, either one of the kicker cursor 30 for the kicker player character and the keeper cursor for the goalkeeper player character is controlled by the game player by means of the stick-type controller 8*e*, while the other is moved and controlled in accordance with a predetermined program under the control of the CPU 1. In the couple-player game mode, one of the game player controls the kicker cursor 30 through the controller 8 of his station, while the other game player controls the keeper cursor 40 through the controller 8 of his station.

FIGS. 30 to 35 are flow charts showing a series of operations performed in the "PK-MATCH" mode of the game.

Figure 30:
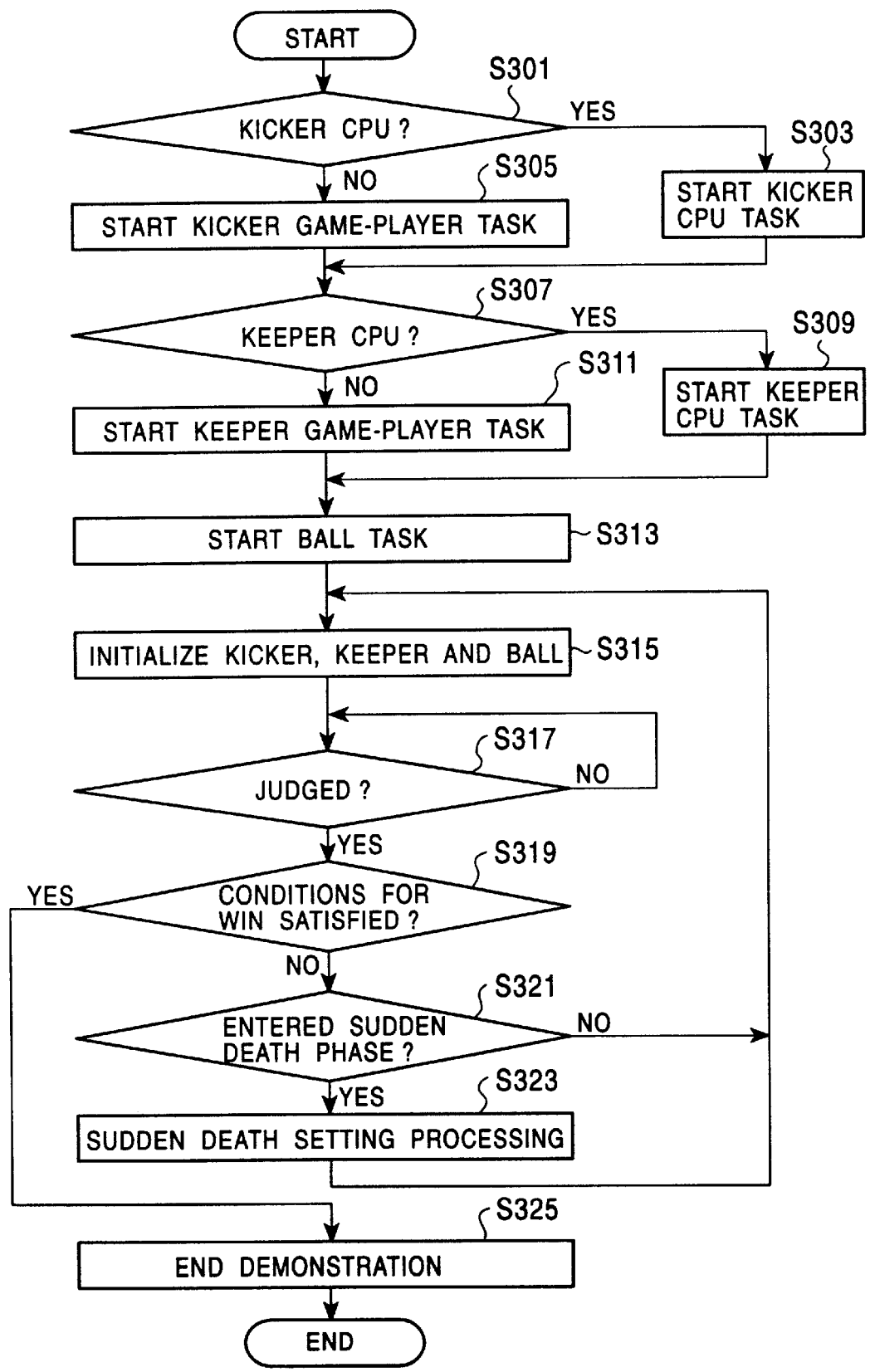
FIG. 30 is a flowchart illustrative of the "PK match" operation.

Referring first to FIG. 30, a determination is conducted as to whether the kicker is the CPU 1, i.e., whether the kicker player character is under the control of the CPU rather than the game player (Step S301). If the kicker is the CPU 1, the CPU 1 starts a "KICKER CPU TASK" which is a task for the CPU 1 to control the kicker (Step S303), otherwise, the CPU 1 starts a "KICKER GAME-PLAYER TASK" which is a task for enabling the game player to control the kicker (S305), since in this case the kicker is the game player rather than the CPU 1. The process then proceeds to Step S307 which determines whether or not the goalkeeper is the CPU 1. If the goalkeeper is the CPU 1, the CPU 1 starts a "KEEPER CPU TASK" which is the task for the CPU 1 to control the goalkeeper (S309), otherwise the CPU starts a "KEEPER GAME-PLAYER TASK" which is a task for enabling the game player to control the goalkeeper (S311). Thus, when the game is in the couple-player game mode, tasks are started in Steps S305 and S311. The CPU 1 then starts a "BALL TASK" in Step S313.

Then, the process proceeds to Step S315 in which the contents of the processings for the kicker, goalkeeper and the ball are initialized. Then, whether a judgement has been made is determined in Step S317. When a judgement has been made, the process advances to Step S319 which determines whether or not the conditions for "WIN" have been satisfied. Satisfaction of the conditions for the "WIN" means that the "PK MATCH" is over, so that the process proceeds to Step S325 which performs "END DEMONSTRATION" informing that the game has ended. If the conditions for the "WIN" has not been satisfied, the process proceeds to Step S321 which determines whether the "PK MATCH" has entered so-called "SUDDEN DEATH" phase in which each kick determines win or defeat. If the game has entered the "SUDDEN DEATH" phase, a sudden death processing is executed, and the process returns to Step S315, otherwise the process returns directly to Step S315 since in this case the CPU 1 determines that the conditions for "WIN" have not yet been satisfied.

Figure 31:
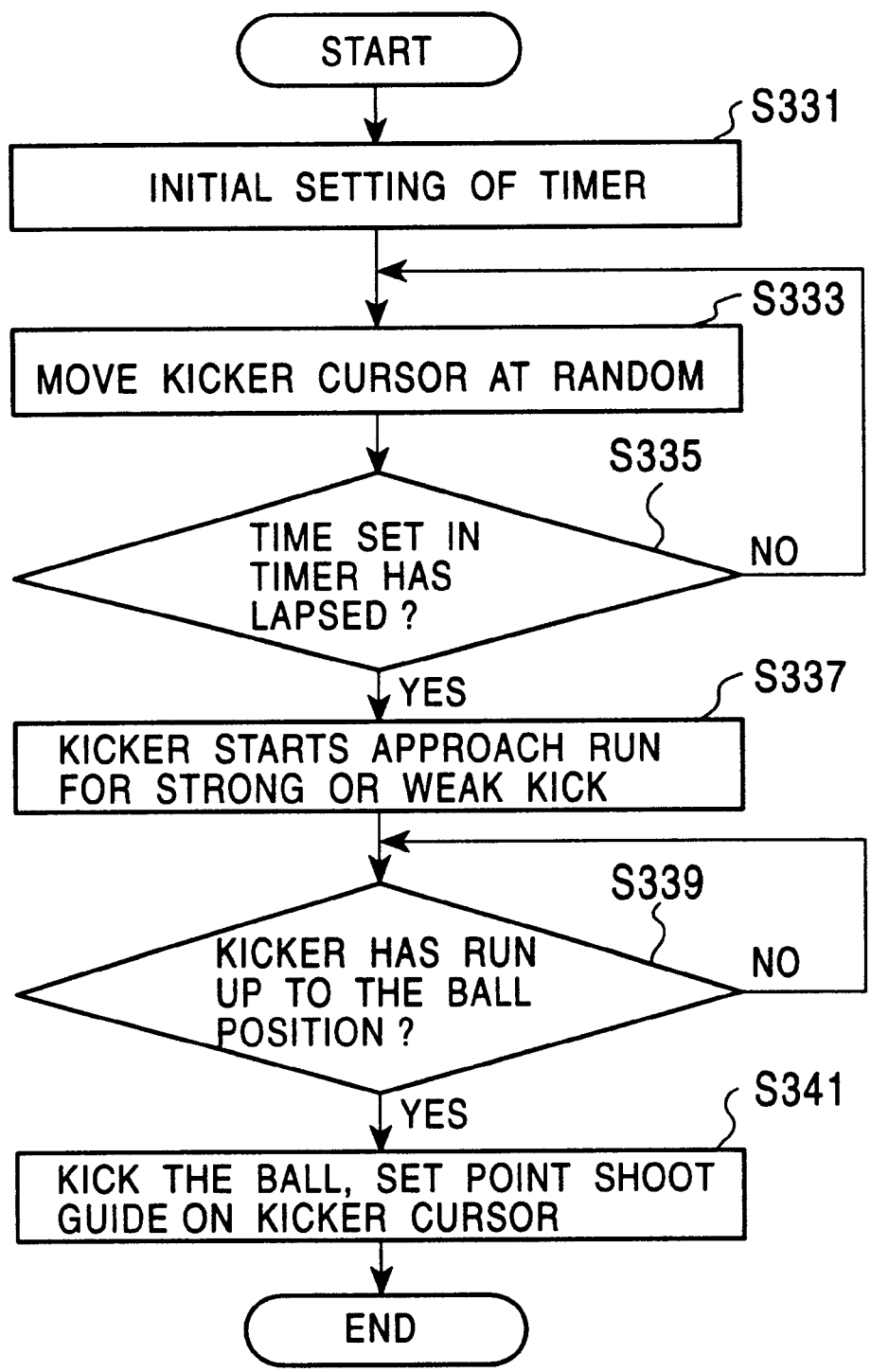
FIG. 31 is a flowchart showing a kicker CPU task.

FIG. 31 is a flow chart illustrative of the "KICKER CPU TASK".

This flow begins with initial setting of a timer conducted in Step S331. Then, the process proceeds to Step S333 in which the kicker cursor 30 is moved in a random manner to the left and right and up and down within the area of the goal post GP. For instance, a two-dimensional coordinate system is assumed on the goal post GP and the position of the kicker cursor 30 is expressed in terms of values along the axes of ordinate and abscissa. The unit coordinate values are irregularly added and subtracted to provide a variety of coordinate positions, whereby the kicker cursor 30 is moved in a random manner to the left and right, up and down and obliquely. This random movement of the kicker cursor 30 is continued until Step S335 determines that the time set in the timer has expired. When the time set in the timer has expired, the process proceeds to Step S337 in which an operation is performed to cause the kicker KI to start an approach run towards the ball B for a strong kick or a weak kick. In Step S399, a determination is conducted as to whether the kicker has run up to the ball position. If the kicker has run up to the ball position, the process advances to Step S341 in which a ball kicking action is displayed and the shoot point guide 33 is aligned with the kicker cursor 30.

Figure 32:
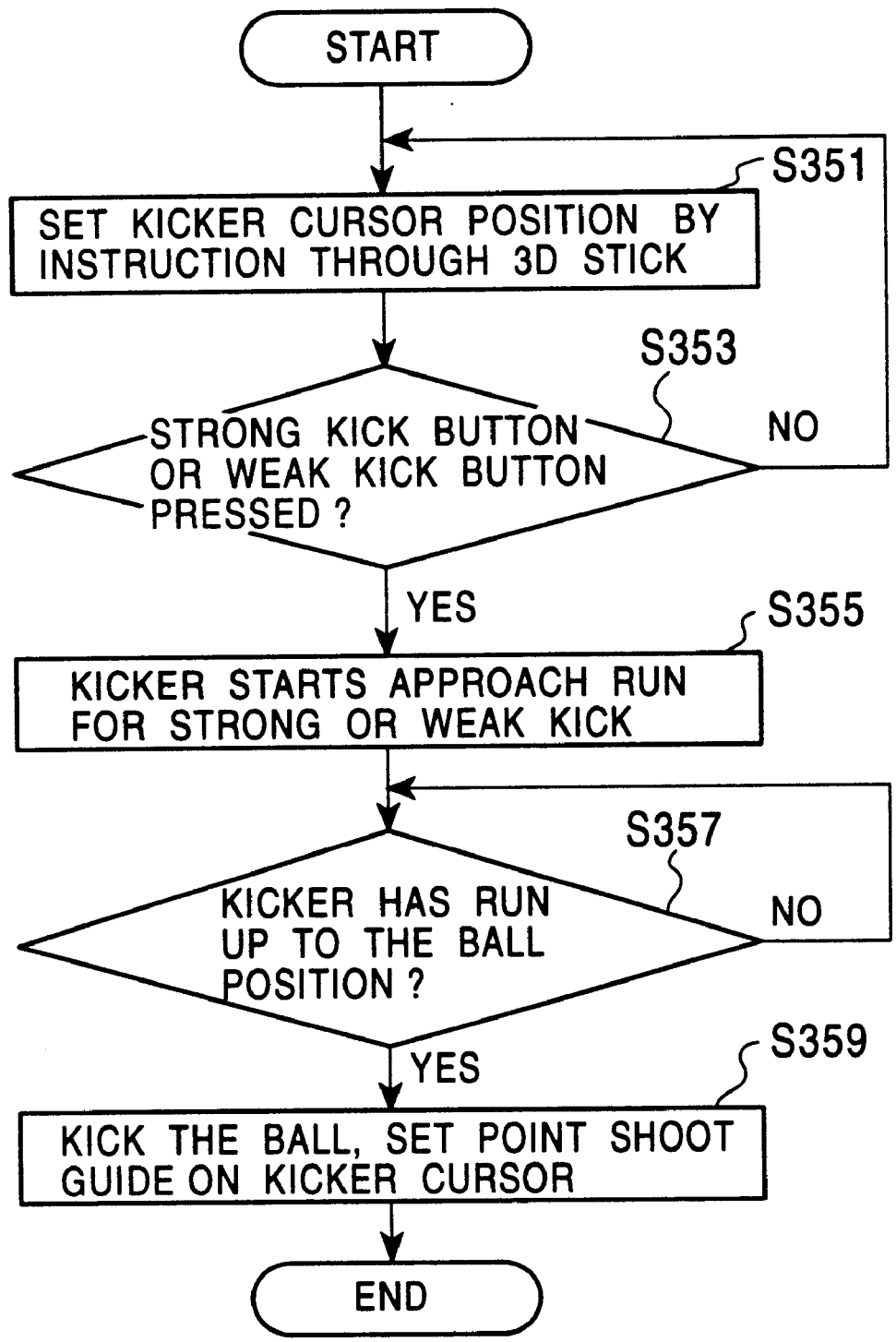
FIG. 32 is a flowchart showing a kicker game player task.

FIG. 32 is a flowchart indicative of the "KICKER GAME-PLAYER TASK".

In this flow, the position of the kicker cursor 30 is set by means of the stick-type controller 8e (Step S351). More specifically, an electrical signals of levels corresponding to the amounts of tilt of the stick-type controller 8e to the left and right and up and down are generated, and the kicker cursor 30 is moved to a coordinate position which corresponds to the levels of the electrical signals. The process then advances to Step S353 which determines whether the strong kick button or the weak kick button has been pressed. Then, Step S355 is executed to cause the kicker KI to start running at a speed corresponding to the strong kick or the weal kick. Subsequently, a determination is conducted in Step S357 as to whether the kicker KI has run up to the ball position. If the kicker has run up to the ball position, the process advances to Step S359 in which a ball kicking action is displayed and the shoot point guide 33 is aligned with the kicker cursor 30.

Figure 33:
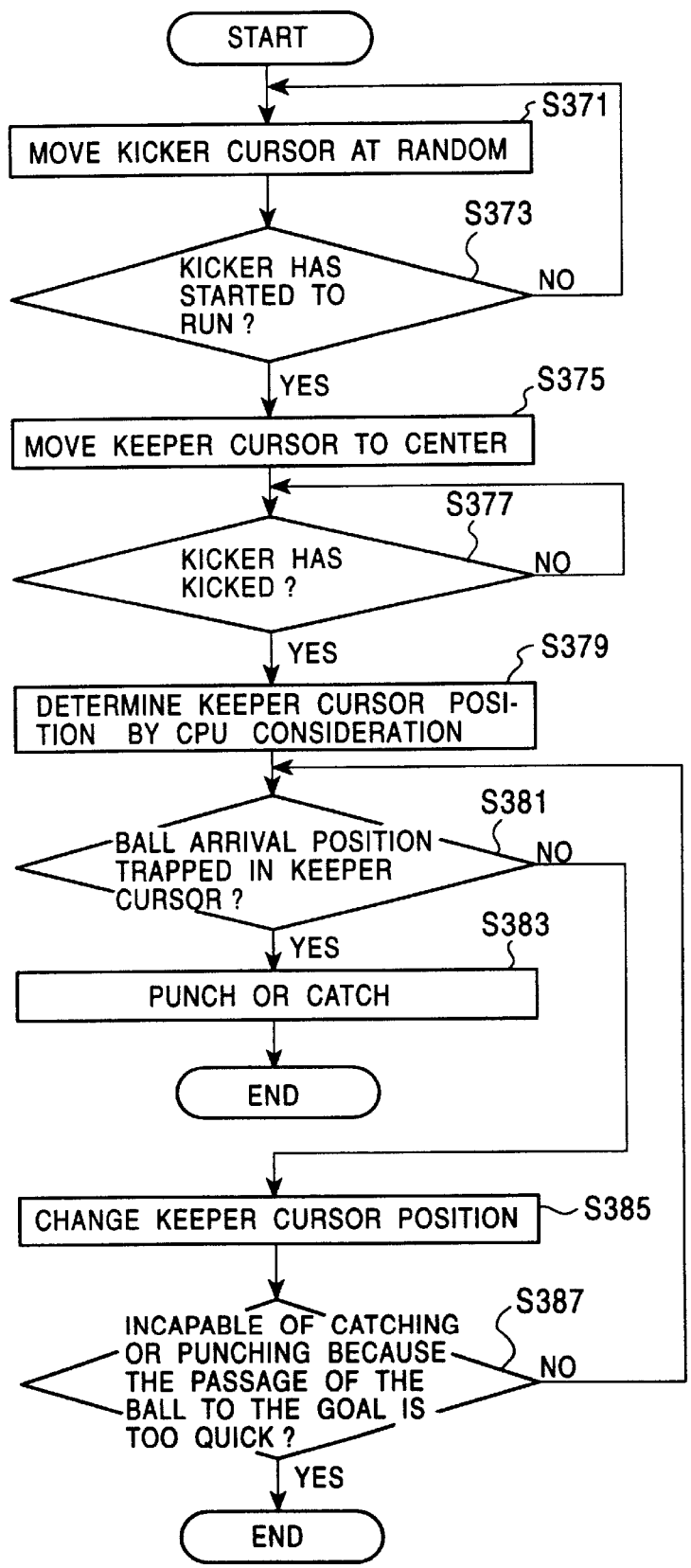
FIG. 33 is a flowchart showing a keeper CPU task.

FIG. 33 is a flow chart showing the "KEEPER CPU TASK".

This flow begins with Step S371 in which the keeper cursor 40 is moved in a random manner to the left and right and up and down within the area of the goal post GP. The movement of the keeper cursor 40 is may be effected in the same manner as that for the random movement of the kicker cursor described before in connection with FIG. 31.

A determination is then made as to whether the kicker has started to run (Step S373). If the kicker has started to run, the process advances to Step S375 which moves the keeper cursor 40 towards the center, i.e., towards the position of the keeper KE. The process then advances to Step S377 which determines whether or not the kicker KI has kicked the ball B. If the ball has been kicked, the position of the keeper cursor 40 is determined by CPU consideration (Step S379). Then, the process proceeds to Step S381 which determines whether or not the ball arrival position has been trapped, i.e., whether the keeper cursor 40 has trapped the shoot point guide 33 within its area. If the shoot point guide 33 has been trapped in the area of the keeper cursor 40, the process advances to Step S383 which implements a punching motion of the goalkeeper KE when the shoot point guide 33 is within the area of the punch guide 41 and a catching motion of the goalkeeper KE when the shoot point guide is within the area of the catch guide 42. Conversely, when the answer to the question posed in Step S381 is NO, the process skips to Step S385 in which the position of the keeper cursor 40 is adjusted to approach the shoot point guide 33. The process then advances to Step S387 which determines whether the goalkeeper is incapable of both punching and catching despite the operation of the controller 8 due to too quick access of the ball to the goal. If the answer is YES, i.e., in case of failure of both the punching and catching, the CPU 1 terminates this flow as it determines that the shoot was successfully done to score, otherwise it operates to return the process to Step S381. Practically, the determination made in Step S387 is performed by determining whether or not the time set for the strong or weak kick has expired before the shoot point guide 33 is trapped by the keeper cursor 40.

Figure 34:
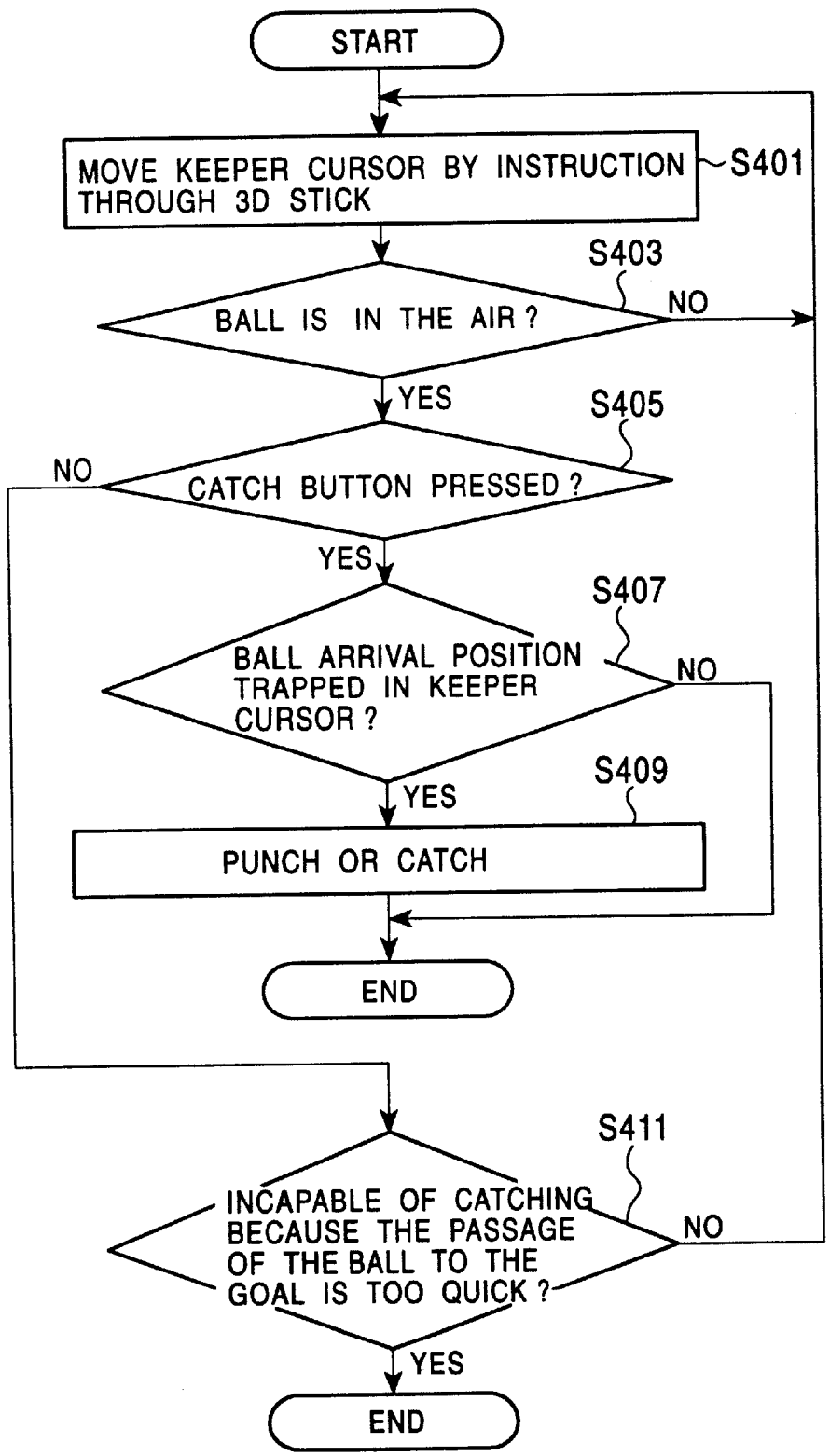
FIG. 34 is a flowchart showing a keeper game player task.

FIG. 34 is a flowchart showing the "KEEPER GAME-PLAYER TASK".

This flow begins with Step S401 in which the game player operates the stick-type controller 8e so as to move the keeper cursor. Step S403 determines whether the ball B is in the air. If the ball B is in the air, the process proceeds to Step S405 which determines whether or not the catch button, i.e., the "A" button 8a (or the "B" button 8b) has been pressed. If the "A" button 8a has been pressed, the process proceeds to Step S407 which determines whether or not the arrival position of the ball B has been trapped by the keeper cursor 40. If the ball arriving position has been trapped, the process proceeds to Step S409 in which a motion processing and display processing are executed so that the goalkeeper on the display performs a catching action when the ball arrival position is within the area of the catch cursor 42 and a punching action when the ball arrival position is within the area of the punch cursor 41. Conversely, when the answer to the question posed in Step S405 is NO, the process skips to Step S411 which determines whether the goalkeeper is incapable of punching and catching due to too quick access of the ball to the goal despite the operation of the controller 8.

Figure 35:
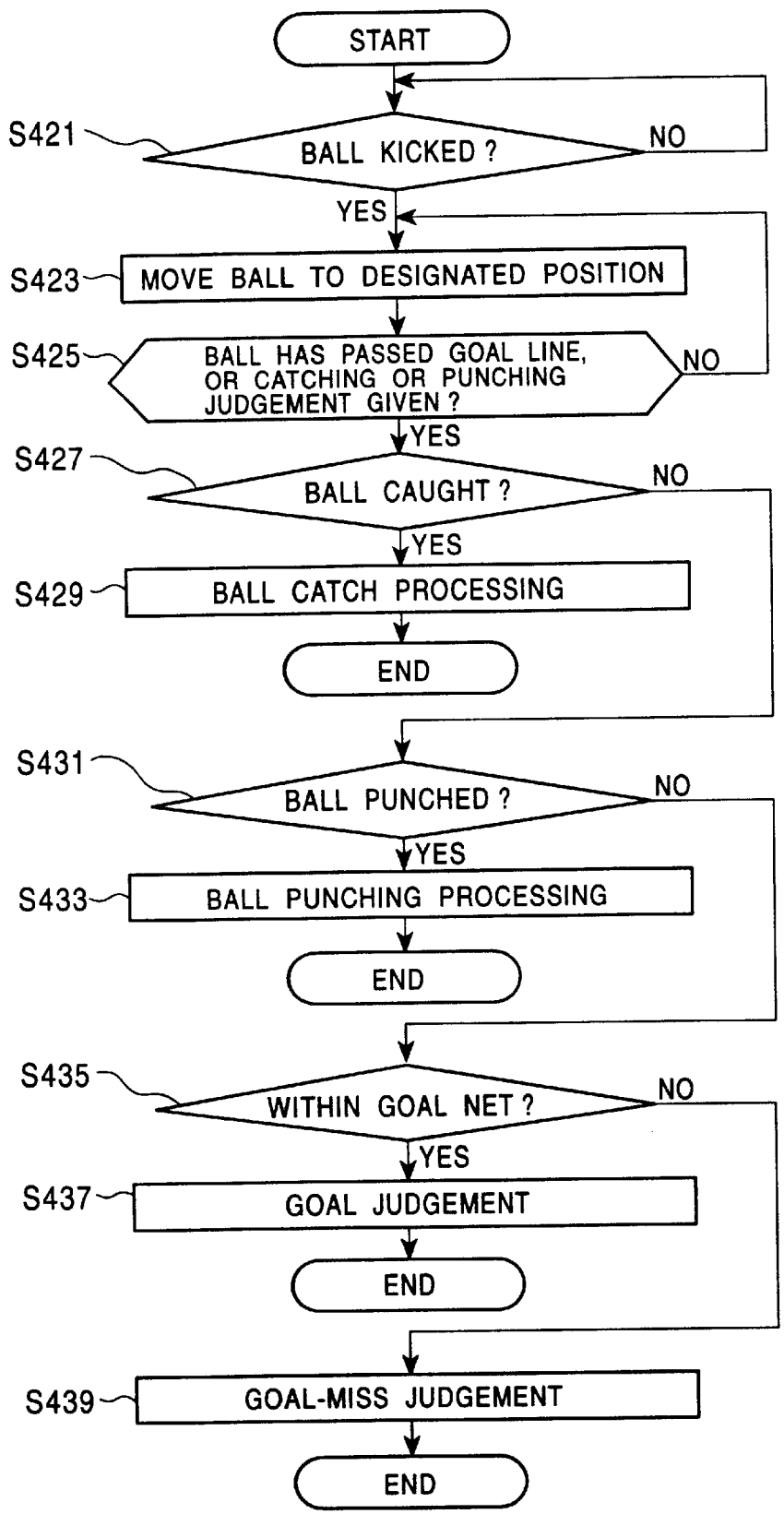
FIG. 35 is a flowchart showing a ball task.

FIG. 35 is a flowchart illustrative of the "BALL TASK".

Step S421 determines whether or not the ball B has been kicked. After waiting for the kicking, a determination is conducted in Step S423 as to whether the ball B is moving towards the designated position. The process then proceeds to Step S425 which determines whether the ball has passed the goal line or whether a judgement has been made that the ball has been caught or punched (Step S425). If the answer to the question posed in Step S425 is NO, the process returns to Step S423.

A determination is then conducted in Step S427 as to whether the ball B has been caught. If so, the process proceeds to Step S429 to execute a ball catch processing. For instance, the ball B on the display stands still at the position where the goalkeeper KE is displayed, as a result of this processing. If the ball has not been caught, the process proceeds to Step S431 which determines whether or not the ball has been punched. If the ball has been punched, the process proceeds to Step S433 which executes a ball punching processing. For example, the image of the ball B is punched out of the area of the goal post GP from the position where the goalkeeper KE is displayed.

If the ball has not been caught nor punched, the process proceeds to Step S435 in which a determination is conducted as to whether the ball B is within the area of the goal net. If the ball B is within the area of the goal net, the process advances to Step S437 which executes a goal judging processing. If the ball B is not within the area of the goal net, the CPU determines that the shoot failed to hit the goal, so that a goal-miss processing is performed in Step S439.

Although the invention has been described through its preferred forms, it is to be understood that the described embodiments are only illustrative and are not intended to restrict the scope of the invention. Thus, various changes and modifications are possible, as shown below.

(1) Although a soccer game has been specifically mentioned, guide indication on the player characters may be made in different types of games in which a couple of teams each having a plurality of player characters compete with each other using a game medium, such as, for example, basketball, handball, water polo, rugby, American football, hickey, ice hickey and so forth. In particular, an image simulating a puck is displayed as the game medium. The player characters need not always be human being but may be animal characters or even imaginary or deformed characters. The player characters also may be on the backs of horses. In the case of a game in which two teams compete with each other on a field, the guide marks are displayed on the surface of the field displayed on the screen, so that the guide marks are not hidden behind the player characters. In case of water polo, the guide marks cannot be displayed on a field surface. The guide marks are therefore displayed on the water surface.

The guide marks G1 to G4 given to the player characters may have wide variety of forms. For instance, the arrow mark of the guide G2 alone may be used to function both as the guide G1 and guide G2 of the illustrated embodiment. Although the guide G3 is given to a single nearby player character in the illustrated embodiment, it is possible to employ two or more such guides G3 so that not only the nearby player character but also a player character or characters to which the ball can be passed are indicated by the guides G3 in such a way that these guides G3 are distinguishable from one another. It is also possible to arrange such that the guides G3 are selectively extinguished depending on the difficulty of the game.

The replay mode can be employed not only in the described soccer game but also in any game which employs scoring action in the course of the progress of the game. Thus, the replay operation can be implemented not only video games listed in the foregoing item (1) above but also in other games in which player characters score midst the game.

The square or rectangular shapes of the kicker cursor 30 and the keeper cursor 40 used in the PK match are only illustrative and these cursors may have ring-like shapes. It is also to be noted that the use of all of the strong kick guide 31, weak kick guide 32, catch cursor 41 and the punch cursor 42 is not essential: namely, the game can run with a single kick guide, e.g., the strong kick guide 31, and a single cursor, e.g., the punch cursor 42. Furthermore, two or more keeper cursors 40 may be used, or the shape and size of the keeper cursor 40 may be set to be variable, depending on the level of the game player's skill required. It is also possible to design such that the keeper cursor 40 can be moved more quickly or non-linear manner, i.e., to instantaneously skip from one to another position.

What is claimed is:

1. A device for displaying penalty kick match cursors in a video soccer game in which a monitor screen displays, at least, characters representing the goal, a player acting as a kicker, a ball, and a player acting as the goalkeeper, so that a penalty kick match is simulated by said characters in accordance with kicking instructions and checking instructions given by a game player through a controller, said device comprising:

kicker cursor displaying means for displaying a kicker cursor on said monitor screen, said kicker cursor being indicative of a shoot position to which the ball is to be kicked by the kicker character;

kicker cursor movement commanding means for moving the position of said kicker cursor displayed on said monitor screen;

keeper cursor displaying means for displaying a keeper cursor on said monitor screen, said keeper cursor being movable on said monitor screen independently from the character representing the goalkeeper and being indicative of an area covered by the character representing the goalkeeper for checking the ball; and keeper cursor movement commanding means for moving the position of said keeper cursor displayed on said monitor screen.

2. A device according to claim 1, wherein at least one of said kicker cursor movement commanding means and said keeper cursor movement commanding means is controllable by the game player through the associated controller.

3. A device according to claim 1, further comprising goal control means which conduct judgement between success and failure of goal depending on the positions of said kicker cursor and keeper cursor relative to each other.

4. A device according to claim 1, further comprising strong kick instructing means for giving strong kick instructions and weak kick instructing means for giving weak kick instructions, wherein said kicker cursor is displayed on the monitor screen in a form of an enclosing space having an outer peripheral strong kick guide region and an inner weak kick guide region, and wherein the ball when kicked in accordance with the strong kick instructions hits a point within said strong kick guide region, whereas, when kicked in accordance with the weak kick instructions, the ball hits a point within said weak kick guide region.

5. A device according to claim 1, wherein said kicker cursor displaying means displays, after the kick, a shoot position guide indicative of the shoot position, and wherein said keeper cursor has an outer peripheral punch cursor region for checking the ball by punching and an inner catch cursor region for checking the ball by catching, so that, when the position of said shoot position guide falls within said punch cursor region, a judgement is made that the ball has been checked by punching, whereas, when the position of said shoot position guide falls within said catch cursor region, a judgement is made that the ball has been checked by catching.

6. A method for displaying penalty kick match cursors in a video soccer game in which a monitor screen displays, at least, characters representing the goal, a player acting as a kicker, a ball, and a player acting as the goalkeeper, so that a penalty kick match is simulated by said characters in accordance with kicking instructions and checking instructions given by a game player through a controller, said method comprising:

movably displaying a kicker cursor on said monitor screen, said kicker cursor being indicative of a shoot position to which the ball is to be kicked by the kicker character; and movably displaying a keeper cursor on said monitor screen, said keeper cursor being movable on said monitor screen independently from the character representing the goalkeeper and being indicative of an area covered by the character representing the goalkeeper for checking the ball.

7. A method according to claim 6, wherein judgement between success and failure of goal is made depending on the positions of said kicker cursor and keeper cursor relative to each other.

8. A method according to claim 6, wherein said kicker cursor is displayed on the monitor screen in a form of an enclosing space having an outer peripheral strong kick guide region and an inner weak kick guide region, and wherein the ball when kicked in accordance with strong kick instructions hits a point within said strong kick guide region, whereas, when kicked in accordance with the weak kick instructions, the ball hits a point within said weak kick guide region.

9. A method according to claim 6, wherein said kicker cursor is changed, after the kick, into a shoot position guide indicative of the shoot position, and wherein said keeper cursor has an outer peripheral punch cursor region for checking the ball by punching and an inner catch cursor region for checking the ball by catching, so that, when the position of said shoot position guide falls within said punch cursor region, a judgement is made that the ball has been checked by punching, whereas, when the position of said shoot position guide falls within said catch cursor region, a judgement is made that the ball has been checked by catching.

10. A storage medium storing a program for displaying penalty kick match cursors in a video soccer game in which a monitor screen displays, at least, characters representing the goal, a player acting as a kicker, a ball, and a player acting as the goalkeeper, so that a penalty kick match is simulated by said characters in accordance with kicking instructions and checking instructions given by a game player through a controller, wherein said program comprises executable code for execution by a processor for performing the steps of:

movably displaying a kicker cursor on said monitor screen, said kicker cursor being indicative of a shoot position to which the ball is to be kicked by the kicker character; and movably displaying a keeper cursor on said monitor screen, said keeper cursor being movable on said monitor screen independently from the character representing the goalkeeper and being indicative of an area covered by the character representing the goalkeeper for checking the ball.

11. A storage medium according to claim 10, wherein judgement between success and failure of goal is made depending on the positions of said kicker cursor and keeper cursor relative to each other.

12. A storage medium according to claim 10, wherein said kicker cursor is displayed on the monitor screen in a form of an enclosing space having an outer peripheral strong kick guide region and an inner weak kick guide region, and wherein the ball when kicked in accordance with strong kick instructions hits a point within said strong kick guide region, whereas, when kicked in accordance with the weak kick structions, the ball hits a point within said weak kick guide region.

13. A storage medium according to claim 10, wherein said kicker cursor is changed, after the kick, into a shoot position guide indicative of the shoot position, and wherein said keeper cursor has an outer peripheral punch cursor region for checking the ball by punching and an inner catch cursor region for checking the ball by catching, so that, when the position of said shoot position guide falls within said punch cursor region, a judgement is made that the ball has been checked by punching, whereas, when the position of said shoot position guide falls within said catch cursor region, a judgement is made that the ball has been checked by catching.

\* \* \* \* \*